United States Patent
Long

(10) Patent No.: US 12,435,095 B2
(45) Date of Patent: Oct. 7, 2025

(54) SUBSTITUTED MORPHOLINES AS ATR KINASE INHIBITORS

(71) Applicant: Shanghai Annova Biotechnology Co., Ltd., Shanghai (CN)

(72) Inventor: Kai Long, Shanghai (CN)

(73) Assignee: Shanghai Annova Biotechnology Co., Ltd., Shanghai (CN)

( * ) Notice: Subject to any disclaimer, the term of this patent is extended or adjusted under 35 U.S.C. 154(b) by 0 days.

(21) Appl. No.: 18/723,033

(22) PCT Filed: Dec. 19, 2022

(86) PCT No.: PCT/CN2022/139864
§ 371 (c)(1),
(2) Date: Aug. 29, 2024

(87) PCT Pub. No.: WO2023/116594
PCT Pub. Date: Jun. 29, 2023

(65) Prior Publication Data
US 2025/0051362 A1    Feb. 13, 2025

(30) Foreign Application Priority Data
Dec. 21, 2021    (CN) .......................... 202111571407.6

(51) Int. Cl.
| | | |
|---|---|---|
| *A61K 31/5377* | (2006.01) | |
| *A61P 35/00* | (2006.01) | |
| *C07D 265/30* | (2006.01) | |
| *C07D 471/04* | (2006.01) | |
| *C07D 487/04* | (2006.01) | |
| *C07D 519/00* | (2006.01) | |

(52) U.S. Cl.
CPC ........ *C07D 519/00* (2013.01); *A61K 31/5377* (2013.01); *A61P 35/00* (2018.01); *C07D 471/04* (2013.01); *C07D 487/04* (2013.01)

(58) Field of Classification Search
CPC .......................... A61K 31/5377; C07D 265/30
USPC ........................................ 514/235.2; 544/106
See application file for complete search history.

(56) References Cited

U.S. PATENT DOCUMENTS

| 9,421,213 B2 | 8/2016 | Foote et al. |
| 2011/0257170 A1 | 10/2011 | Pomel et al. |
| 2011/0306613 A1 | 12/2011 | Foote et al. |

FOREIGN PATENT DOCUMENTS

| CN | 102850355 A | 1/2013 |
| CN | 103068391 A | 4/2013 |
| CN | 111205310 A | 5/2020 |
| CN | 2021-11287759 | * 11/2021 |
| WO | 2011154737 A1 | 12/2011 |
| WO | 2013061305 A1 | 5/2013 |
| WO | 2014089379 A1 | 6/2014 |
| WO | 2016020320 A1 | 2/2016 |
| WO | WO-2023020604 A1 * | 2/2023 |

OTHER PUBLICATIONS

Barsanti, P. A et al. "Structure-Based Drug Design of Novel, Potent, and Selective Azabenzimidazoles (ABI) as ATR Inhibitors" ACS Med Chem Lett. Oct. 30, 2014;6(1):42-6. doi: 10.1021/ml500352s. eCollection Jan. 8, 2015. (49 pages).
International Search Report and Written Opinion issued for counterpart Chinese Patent Application No. PCT/CN2022/139864 mailed Mar. 13, 2023 (7 pages).
ACS Med. Chem. Lett. 2015, 6, pp. 42-46 (5 pages).
Barsanti, P.A., et al., "Structure-Based Drug Design of Novel, Potent, and Selective Azabenzimidazoles (ABI) as ATR Inhibitors," ACS Med, Chem. Lett., vol. 6, Oct. 30, 2014 (44 pages).
International search report issued for counterpart Chinese patent application No. PCT/CN2022/139864 mailed on Mar. 13, 2023 (3 pages).
Lecona, E. et al, 2018, Nat. Rev. Cancer 18, pp. 586-595 (10 pages).
Pilié. P. G. et al, 2019, Nat. Rev. Clin. Oncol. 16, pp. 81-104 (24 pages).
Saldivar J. C. et al., 2017, Nat. Rev. Mol. Cell Biol. 18, 622-636 (16 pages).
Japanese Patent Office, Notice for grant issued for corresponding Japanese Patent Application 2024-538338 mailed on Mar. 18, 2025 (6 pages).
European Patent Office, Extended European Search Report for U.S. Appl. No. 22/909,907, dated Jul. 7, 2025 (7 pages).

\* cited by examiner

*Primary Examiner* — Douglas M Willis
(74) *Attorney, Agent, or Firm* — Nutter McClennen & Fish LLP

(57) ABSTRACT

A substituted fused heterocyclic compound, and a preparation method therefor and the use thereof. Provided is a compound having the structure of formula I or a pharmaceutically acceptable salt thereof. The compound or the pharmaceutically acceptable salt thereof can be used as an ATR inhibitor, which has a high activity.

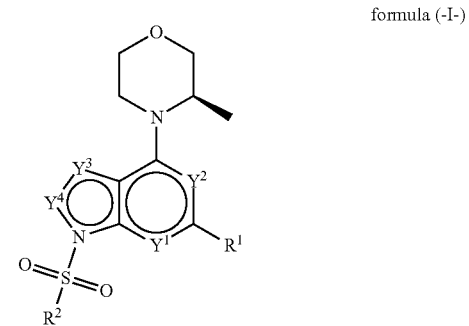

formula (-I-)

5 Claims, No Drawings

SUBSTITUTED MORPHOLINES AS ATR KINASE INHIBITORS

CROSS-REFERENCE TO RELATED APPLICATIONS

This application is a National Stage of International Application No. PCT/CN2022/139864, filed Dec. 19, 2022, which claims priority to Chinese Patent Application No. 202111571407.6, filed Dec. 21, 2021, both of which are hereby incorporated by reference in their entireties.

BACKGROUND OF THE INVENTION

Field of the Invention

The present invention relates to a substituted fused heterocyclic compound and preparation method and use thereof.

Description of Related Art During each cell cycle, human cells must replicate their entire genome accurately and efficiently. This is an extremely challenging and complex project, as it implies the replication of more than 6 billion DNA fragments (bases) and requires a high degree of accuracy and efficiency. Inevitably, there are many obstacles preventing or interfering with the normal replication of DNA in this process. Therefore, normal human cells have robust response mechanisms to ensure that the entire genome is replicated exactly once per cell cycle (Saldivar J. C. et al, 2017, *Nat. Rev. Mol. Cell Biol.* 18, 622-636).

There are many regulatory molecules in human cells that are involved in maintaining genome stability and integrity, an important member of which is the ataxia telangiectasia mutated gene and the Rad3-related (ATR) protein kinase. When DNA damage or replication stress occurs within a cell, ATR is recruited to the appropriate site and then activated. Activated ATR plays important regulatory roles in a number of ways, including blocking the cell cycle, inhibiting the origin of replication, promoting deoxyribonucleotide synthesis, initiating replication forks, and the like. Unlike normal cells, cancer cells have genomic instability due to defective DNA damage response and/or increased replication stress, which is a key hallmark of cancer. These characteristics of cancer cells that distinguish them from normal cells make it easier for events such as mutation, rearrangements, and copy number changes of genes to accumulate during the division of cancer cells, which in turn has the potential to promote the clonal evolution of cancer cells; however, at the same time, these characteristics are also defects that lead to cancer cell-specific vulnerabilities. By taking full advantage of these vulnerabilities, it is expected to enhance the efficacy of anticancer therapies and thus improve the prognosis of cancer patients (Pilie. P. G. et al, 2019, *Nat. Rev. Clin. Oncol.* 16, 81-104).

Cancer cells are more dependent on ATR compared to normal cells, which is one of the vulnerabilities mentioned above. Given that oncogene-induced replication stress is a major source of instability in cancer genomes, cancer cells become highly dependent on a delicate replication stress response for their survival, and therefore are vulnerable to ATR inhibitors. Early works on cell lines and mouse models have provided preclinical support for this idea. There is also evidence that mice with reduced ATR levels are highly resistant to cancer development. These results highlight the potential of targeting ATR in cancer therapy. Therefore, the development of highly active ATR inhibitors with favorable druggability is expected to provide human with a new weapon in the fight against cancer (Lecona, E. et al, 2018, *Nat. Rev. Cancer* 18, 586-595).

Prior art WO2014089379A1, WO2011154737A1, WO2016020320A1, and the like, disclose compounds having ATR kinase inhibitory activity, respectively, and several ATR kinase inhibitors have entered in clinical trials, including:

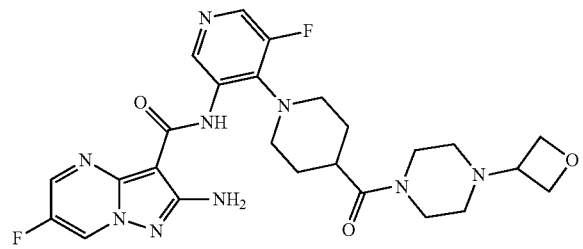

VX-803/M4344

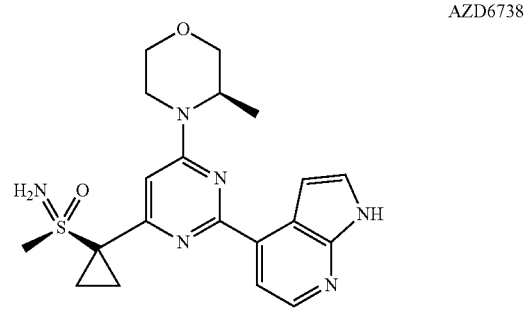

AZD6738

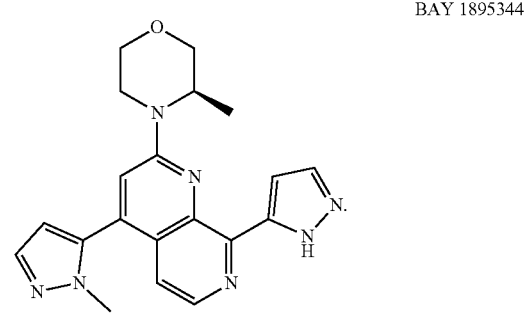

BAY 1895344

In addition, the following compounds having ATR kinase inhibitory activity are disclosed in the prior art (*ACS Med. Chem. Lett.* 2015, 6, 42-46):

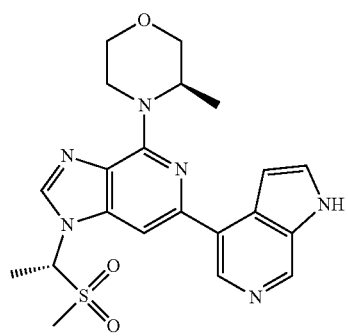

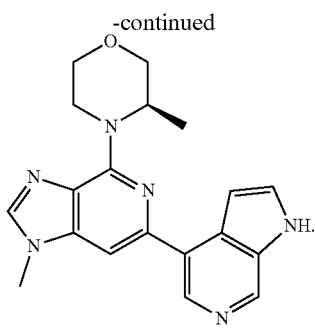

However, no ATR kinase inhibitors have been marketed to date, and thus there is still an urgent need for new ATR inhibitors in this field, especially those with high activity as well as good druggability.

BRIEF SUMMARY OF THE INVENTION An object of the present invention is to provide a new compound as an ATR inhibitor.

Another object of the present invention is to provide a method for preparing the compound.

Another object of the present invention is to provide the use of the compound.

Another object of the present invention is to provide a pharmaceutical composition comprising the compound and the use thereof.

Another object of the present invention is to provide an intermediate for the preparation of the compound.

Another object of the present invention is to provide a method for preparing the intermediate.

In an aspect, the present invention provides a compound having a structure of formula I, or a pharmaceutically acceptable salt thereof, formula I

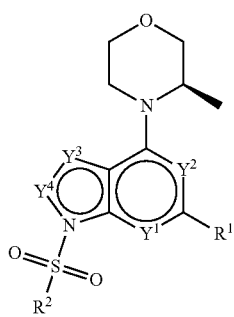

wherein,
$Y^1$, $Y^2$, $Y^3$ and $Y^4$ are each independently CH or N, and, at least one of $Y^1$ and $Y^2$ is N and at least one of $Y^3$ and $Y^4$ is CH;

$R^1$ is a 5:6 ring-fused heteroaromatic cyclic group or a 6:6 ring-fused heteroaromatic cyclic group containing n heteroatoms, or a 5-membered or 6-membered aromatic cyclic group containing m heteroatoms, wherein n is an integer selected from 1 to 4, m is an integer selected from 0 to 3, and the heteroatoms are selected from one or two of O, N, and S; the 5:6 ring-fused heteroaromatic cyclic group or 6:6 ring-fused heteroaromatic cyclic group containing n heteroatoms is optionally substituted with one or more substituents selected from halogen, —OH, —OMe, —NH$_2$, —NHMe, —NMe$_2$, —CN, —CONH$_2$, and -Me; the 5-membered or 6-membered aromatic cyclic group containing m heteroatoms is optionally substituted with one or more substituent(s) selected from a 4- to 6-membered heterocycloalkyl, halogen, —OH, —OMe, —NH$_2$, —NHMe, —NMe$_2$, —CN, —CONH$_2$, and -Me;

when the aromatic cyclic group is substituted with a 4- to 6-membered heterocyclic alkyl group, they may be connected via a single bond or may be joined together to share one or more member atoms;

$R^2$ is —OH, a $C_{1-6}$ alkoxy, —NR$^3$R$^4$, —CN, a $C_{1-6}$ alkyl, a $C_{2-6}$ alkenyl, a $C_{2-6}$ alkynyl, a $C_{3-6}$ a cycloalkyl, or a 4- to 6-membered heterocycloalkyl, wherein the heteroatom is selected from one of O and N; the $C_{1-6}$ alkyl, $C_{2-6}$ alkenyl, $C_{2-6}$ alkynyl, $C_{3-6}$ cycloalkyl, or the 4- to 6-membered heterocycloalkyl is optionally substituted with one or more substituents selected from halogen, —OH, a $C_{1-6}$ alkoxy, —NR$^5$R$^6$, and —CN;

$R^3$ and $R^4$ are each independently hydrogen or a $C_{1-6}$ alkyl; and $R^5$ and $R^6$ are each independently hydrogen or a $C_{1-6}$ alkyl, or, —NR$^5$R$^6$ as a whole represents azetidinyl, tetrahydropyrrolyl, piperidinyl, morpholinyl, or 4-methylpiperazinyl.

According to some particular embodiments of the invention, in the compound of formula I or a pharmaceutically acceptable salt thereof according to the present invention, $Y^3$ and $Y^4$ are each CH; $Y^1$ and $Y^2$ are each independently CH or N, and at least one of $Y^1$ and $Y^2$ is N. That is, these particular embodiments of the present invention provide a compound having a structure represented by Formula I-1 below:

formula I-1

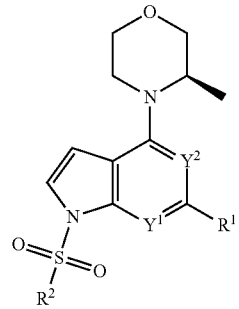

In formula I-1, $Y^1$, $Y^2$, $R^1$ and $R^2$ are each independently as defined previously.

According to some particular embodiments of the invention, in the compound of formula I or a pharmaceutically acceptable salt thereof according to the present invention, $Y^1$ and $Y^2$ are each N.

According to some particular embodiments of the invention, in the compound of formula I or a pharmaceutically acceptable salt thereof according to the present invention, $Y^1$ and $Y^2$ are each N; $Y^3$ and $Y^4$ are each CH. That is, these particular embodiments of the present invention provide a compound having a structure represented by formula I-2 below:

formula I-2

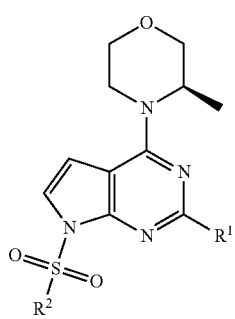

In formula I-2, $R^1$ and $R^2$ are each independently as defined previously.

According to some particular embodiments of the invention, in the compound of formula I or a pharmaceutically acceptable salt thereof according to the present invention, $R^1$ is a 5:6 ring-fused heteroaromatic cyclic group containing n heteroatoms, wherein n is an integer selected from 1 to 4, and the heteroatoms are selected from one or two of O, N, and S; the heteroaromatic cyclic group is optionally substituted with one or more substituents selected from halogen, —OH, —OMe, —NH$_2$, —NHMe, —NMe$_2$, —CN, —CONH$_2$, and -Me.

According to some particular embodiments of the invention, in the compound of formula I or a pharmaceutically acceptable salt thereof according to the present invention, $R^1$ is a group selected from:

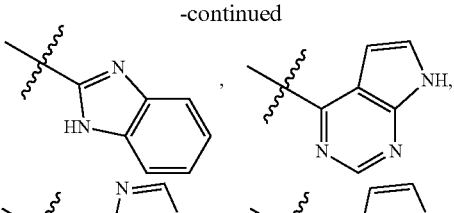

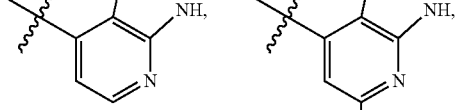

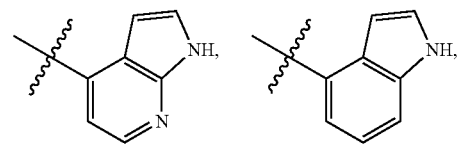

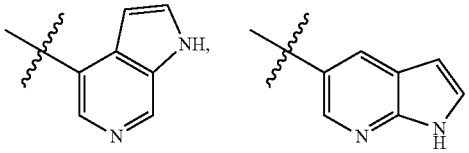

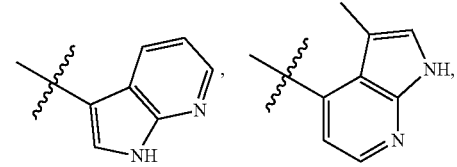

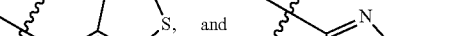

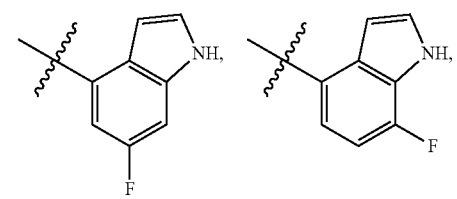

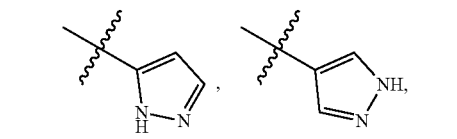

According to some particular embodiments of the invention, in the compound of formula I or a pharmaceutically acceptable salt thereof according to the present invention, $R^2$ is hydroxy, methoxy, ethoxy, amino, methylamino, dimethylamino, cyano, methyl, ethyl, propyl, isopropyl, ethenyl, propenyl, allyl, ethynyl, propynyl, propargyl, cyclopropyl, hydroxymethyl, methoxymethyl, 2-hydroxyethyl, 2-methoxyethyl, 2-dimethylaminoethyl, N-morpholino, or 4-methylpiperazinyl.

According to some particular embodiments of the invention, in the compound of formula I or a pharmaceutically acceptable salt thereof according to the present invention, the compound can be selected from the following:
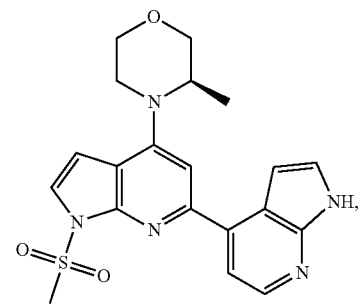
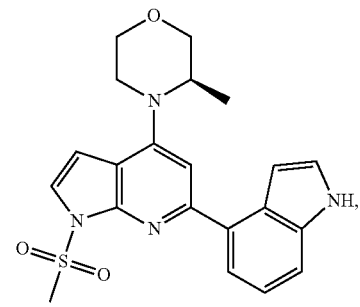
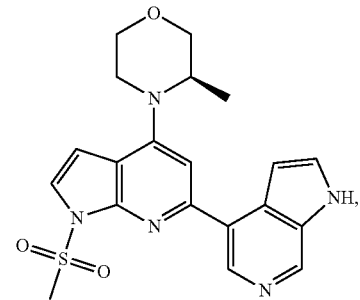
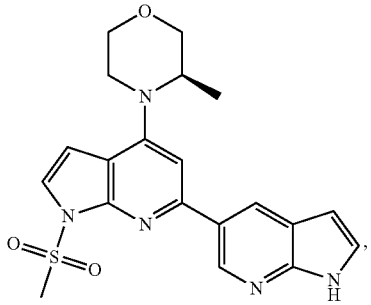
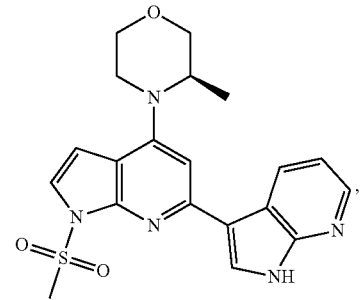
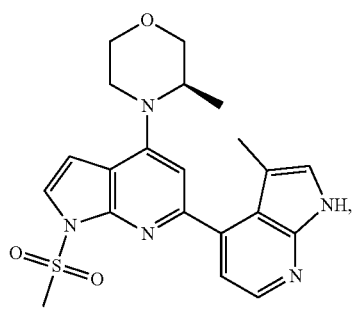
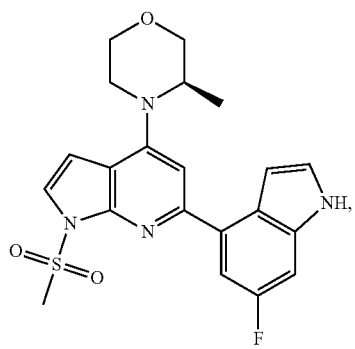
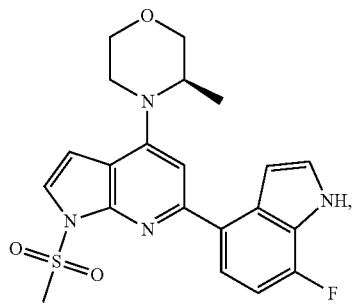
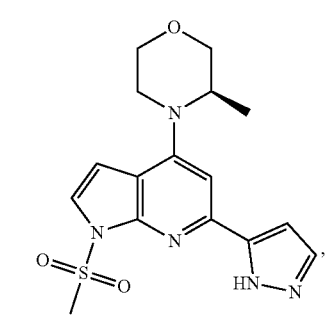
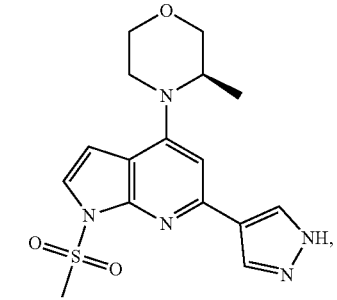

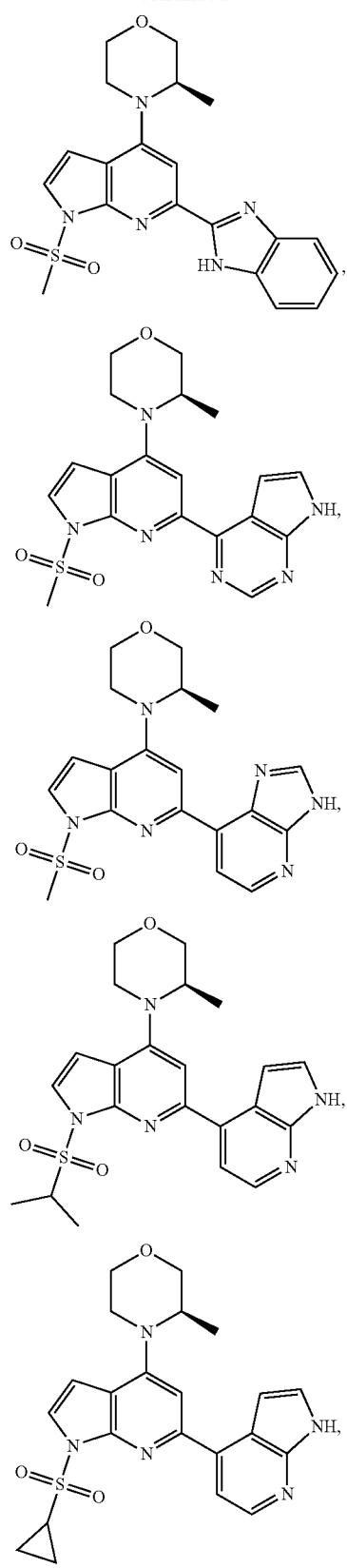 [SMILES: C[C@@H]1COCCN1c1cc(-c2nc3ccccc3[nH]2)nc2c1ccn2S(C)(=O)=O ; C[C@@H]1COCCN1c1cc(-c2ncnc3[nH]ccc23)nc2c1ccn2S(C)(=O)=O ; C[C@@H]1COCCN1c1cc(-c2ccnc3[nH]cnc23)nc2c1ccn2S(C)(=O)=O ; CC(C)S(=O)(=O)n1ccc2c(N3CCOC[C@H]3C)cc(-c3ccnc4[nH]ccc34)nc21 ; C[C@@H]1COCCN1c1cc(-c2ccnc3[nH]ccc23)nc2c1ccn2S(=O)(=O)C1CC1]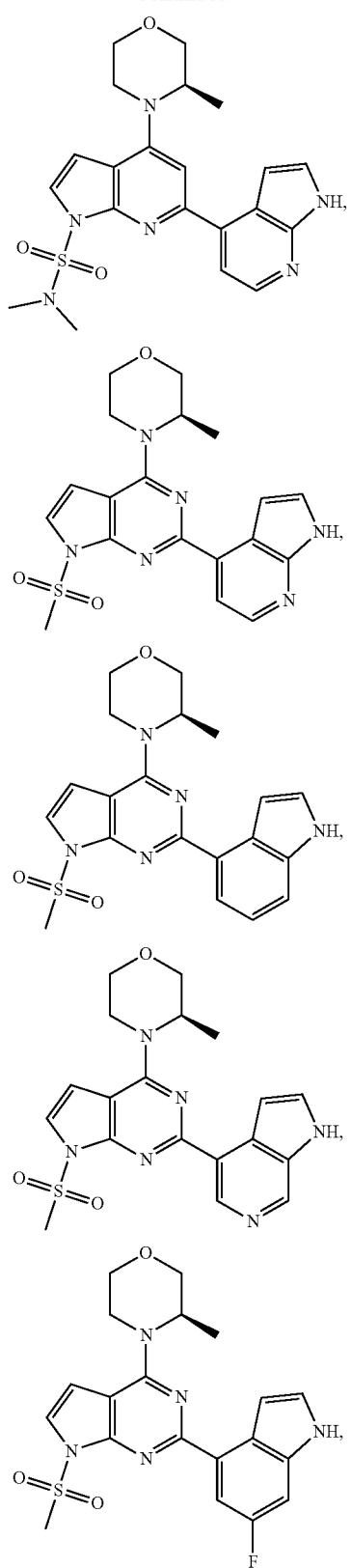

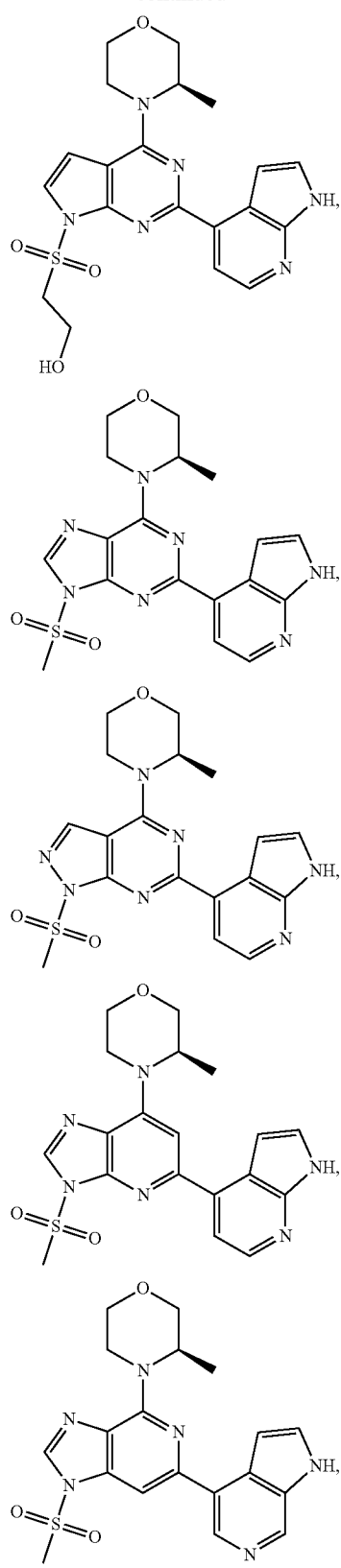 [SMILES: C[C@@H]1COCCN1c1nc(-c2ccnc3[nH]ccc23)nc2c1ccn2S(=O)(=O)CCO ; C[C@@H]1COCCN1c1nc(-c2ccnc3[nH]ccc23)nc2c1ncn2S(C)(=O)=O ; C[C@@H]1COCCN1c1nc(-c2ccnc3[nH]ccc23)nc2c1cnn2S(C)(=O)=O ; C[C@@H]1COCCN1c1cc(-c2ccnc3[nH]ccc23)nc2c1ncn2S(C)(=O)=O ; C[C@@H]1COCCN1c1nc(-c2cncc3[nH]ccc23)cc2c1ncn2S(C)(=O)=O]
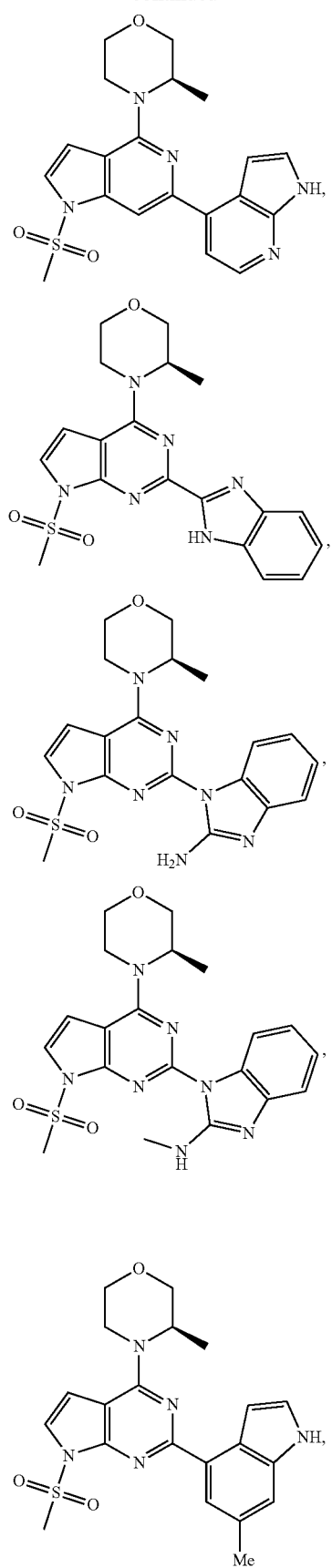

-continued
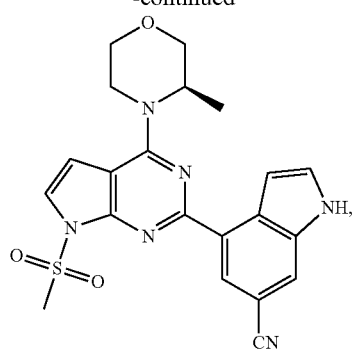
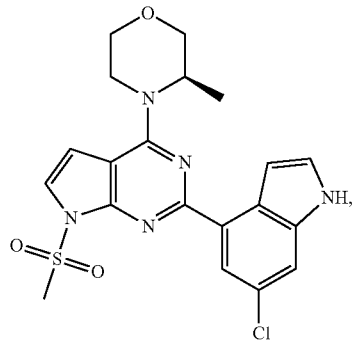
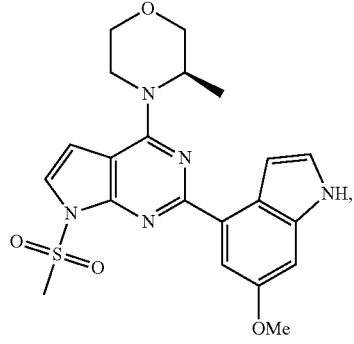
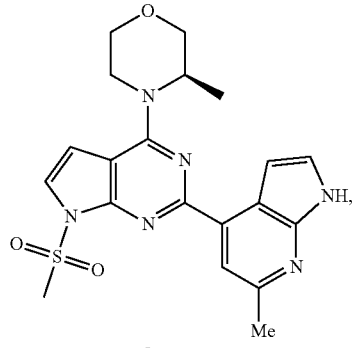
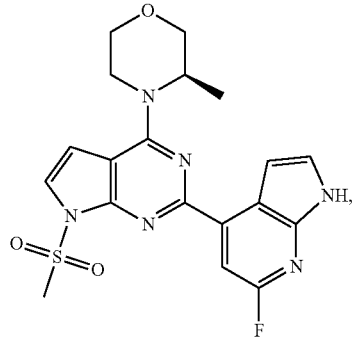
-continued
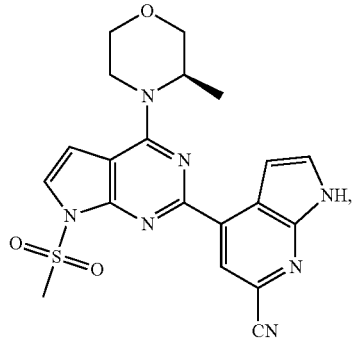
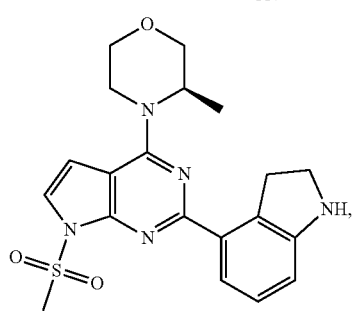
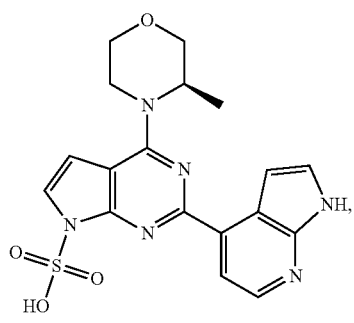
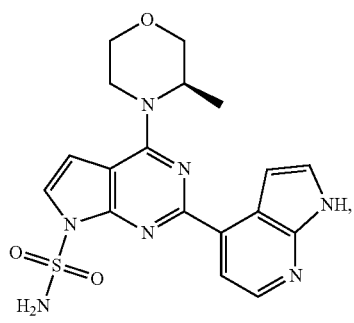
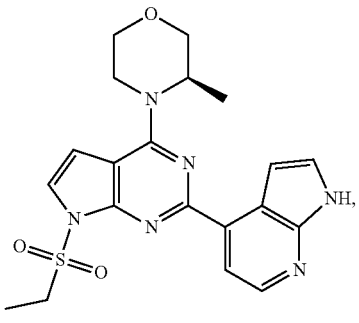

-continued
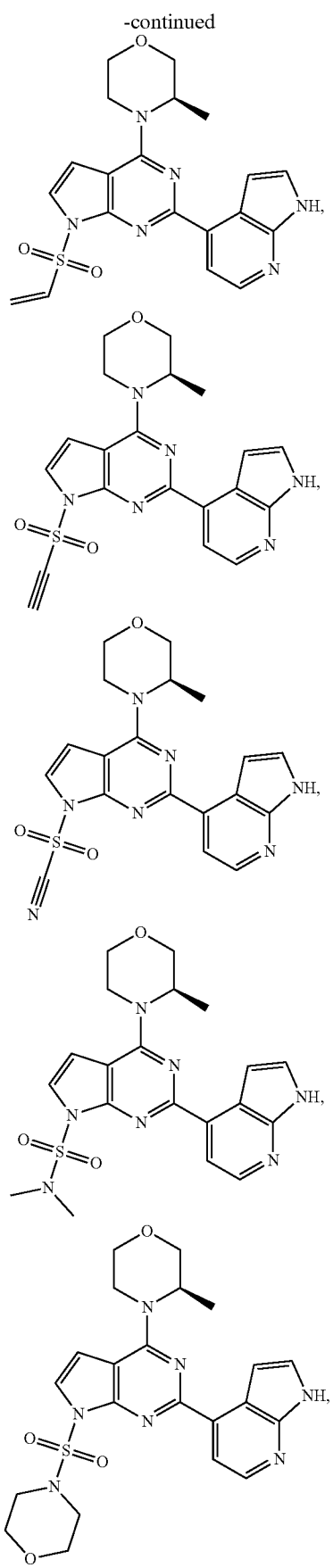
-continued
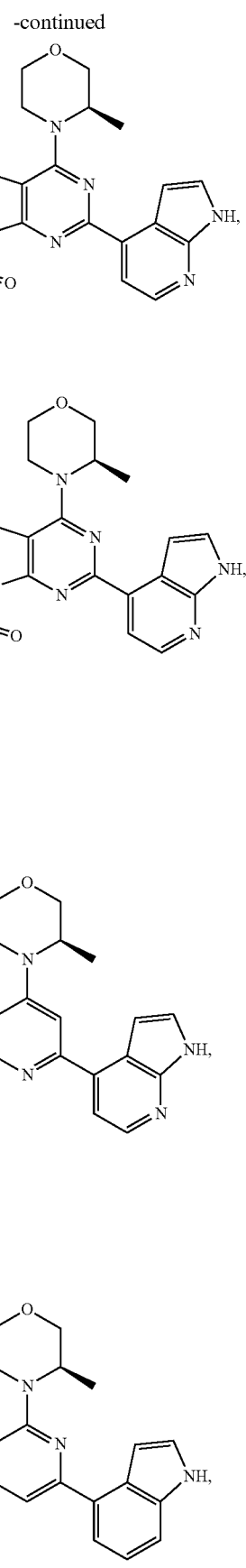

-continued
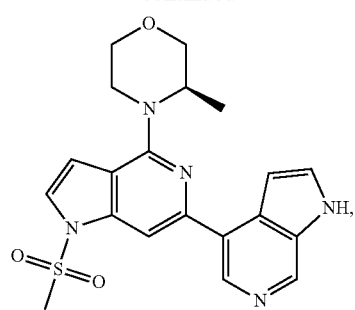
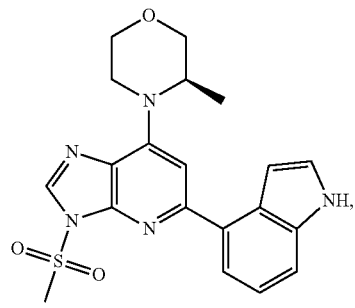
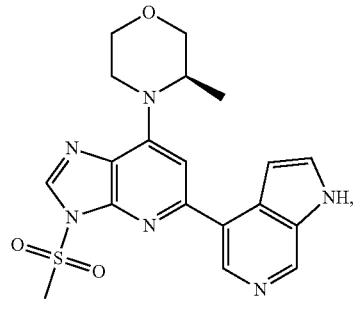
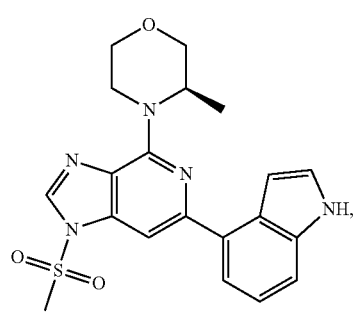
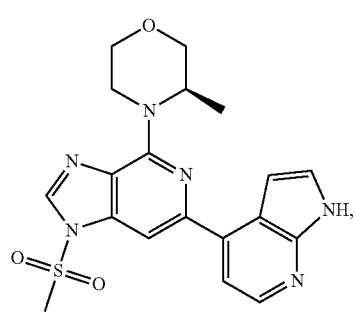
-continued
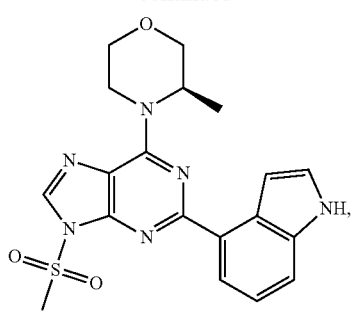
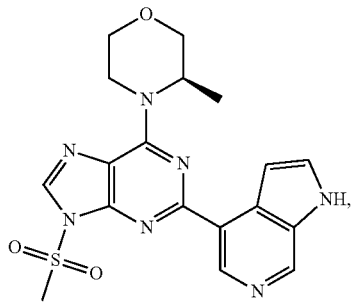
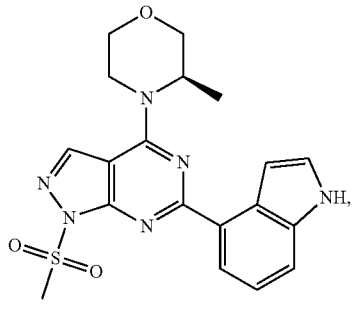
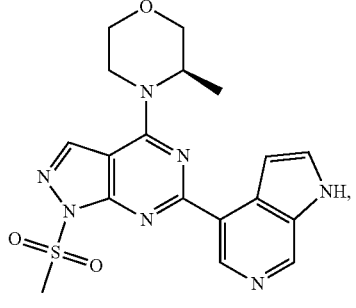
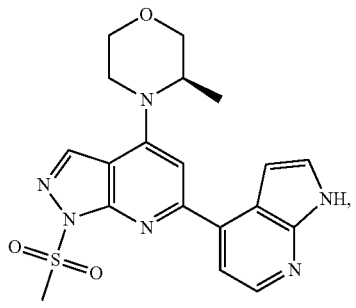

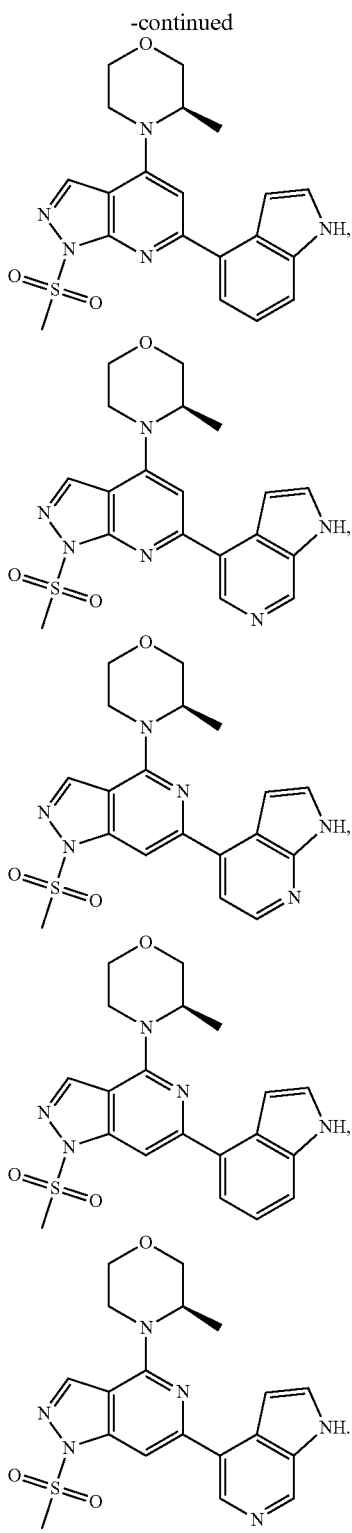

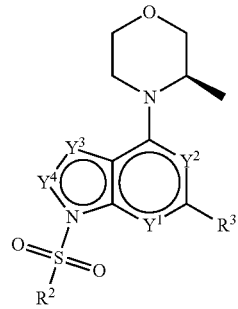

formula II in formula II, $Y^1$, $Y^2$, $Y^3$, $Y^4$ and $R^2$ are each independently as defined previously;

$R^3$ is a halogen or

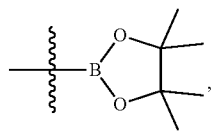 [SMILES: *B1OC(C)(C)C(C)(C)O1]

wherein the halogen is preferably chlorine.

In another aspect, the present invention further provides a method for preparing the compound having a structure represented by formula I or a pharmaceutically acceptable salt thereof, comprising:

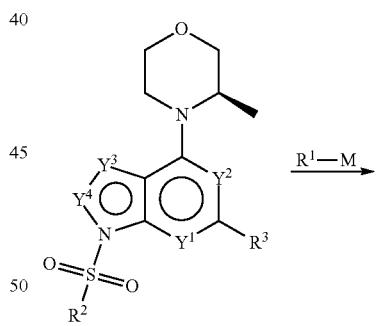

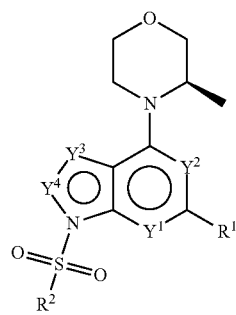

subjecting the intermediate compound represented by formula II and $R^1$-M to a coupling reaction to prepare a compound having a structure of formula I;

In another aspect, the present invention further provides an intermediate compound, the intermediate comprising, but not limited to: any of the intermediates in the synthetic route for the preparation of the above compound or a pharmaceutically acceptable salt thereof. Preferably, the intermediate has the same essential structural unit (substantially the same essential core moiety or essential ring) as the compound of formula I or a pharmaceutically acceptable salt thereof, or the essential structural unit of the intermediate is comprised in the chemical structure of the compound of formula I or a pharmaceutically acceptable salt thereof.

In some particular embodiments of the present invention, the intermediate compound has a structure represented by formula II:

wherein,
when $R^3$ is a halogen, M is

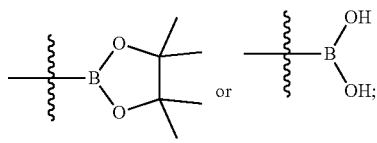

when $R^3$ is

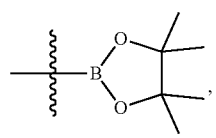 [SMILES: *B1OC(C)(C)C(C)(C)O1]

M is a halogen, preferably bromine; and
$Y^1$, $Y^2$, $Y^3$, $Y^4$, $R^1$ and $R^2$ are each independently as defined previously.

According to particular embodiments of the invention, the method for preparing the compound having a structure represented by formula I of the present invention or a pharmaceutically acceptable salt thereof further comprises a process of preparing the intermediate compound.

According to some particular embodiments of the invention, the method for preparing the compound having a structure represented by formula I of the present invention or a pharmaceutically acceptable salt thereof comprises, but is not limited to, preparing the compound of formula I or a pharmaceutically acceptable salt thereof according to any of the synthetic routes in the Preparation Examples 1 to 27, wherein the substituents of the prepared compounds are not limited to the scope of the specific compounds in the Preparation Examples 1 to 27, and the substituents may be defined with reference to the scope of the definition of the substituents of the compounds of formula I previously described.

In another aspect, the present invention further provides a pharmaceutical composition comprising: the compound of formula I of the present invention or a pharmaceutically acceptable salt thereof, and a pharmaceutically acceptable carrier.

The present invention further provides the use of the compound or a pharmaceutically acceptable salt thereof or the pharmaceutical composition as an ATR kinase inhibitor. The specific use of the compound of the present invention or a pharmaceutically acceptable salt thereof or the pharmaceutical composition can be for non-therapeutic purposes (e.g., in vitro experimental research purposes, etc.) or for therapeutic purposes. That is, the present invention provides the use of the compound or a pharmaceutically acceptable salt thereof or the pharmaceutical composition in the preparation of a medicament for inhibiting an ATR kinase.

The present invention further provides use of the compound or a pharmaceutically acceptable salt thereof or the pharmaceutical composition in the preparation of a medicament for treating a hyperproliferative disease. When the compound of the present invention or a pharmaceutically acceptable salt thereof is used as a pharmaceutically active ingredient in the treatment of a hyperproliferative disease, a step of administering the compound or a pharmaceutically acceptable salt thereof or the pharmaceutical composition to a subject in need thereof.

In the use provided by the present invention, the hyperproliferative disease comprises cancer. The cancer may comprise, for example, melanoma, brain tumor, esophageal cancer, gastric cancer, liver cancer, pancreatic cancer, colorectal cancer, lung cancer, kidney cancer, breast cancer, cervical cancer, ovarian cancer, prostate cancer, skin cancer, neuroblastoma, glioma, sarcoma, bone cancer, uterine cancer, endometrial cancer, head and neck tumor, multiple myeloma, B-cell lymphoma, polycythemia vera, leukemia, thyroid tumor, bladder cancer, gallbladder cancer, or the like.

Definition and Explanation

Unless otherwise specified, the following terms and phrases used herein are intended to have the following meanings. A particular term or phrase should not be considered indefinite or unclear without a specific definition, but should be interpreted by its ordinary meaning. When a trade name appears herein, it is intended to refer to its corresponding commercial product or its active ingredient.

As used herein, the term "pharmaceutically acceptable" refers to those compounds, materials, compositions and/or dosage forms that, within the scope of sound medical judgment, are suitable for use in contact with human and animal tissues, without excessive toxicity, irritation, allergic reactions or other problems or complications, commensurate with a reasonable benefit-risk ratio.

The term "pharmaceutically acceptable salt" refers to a salt of the compound of the invention, prepared from a compound with specific substituents discovered by the invention and a relatively non-toxic acid or base. When the compound of the invention contains a relatively acidic functional group, a base addition salt can be obtained by contacting such a compound with a sufficient amount of a base in a pure solution or in a suitable inert solvent. Pharmaceutically acceptable base addition salts include sodium, potassium, calcium, ammonium, organic amine or magnesium salts or the like. When a compound of the invention contains a relatively basic functional group, an acid addition salt can be obtained by contacting such a compound with a sufficient amount of an acid in a pure solution or in a suitable inert solvent. Examples of pharmaceutically acceptable acid addition salts include inorganic acid salts, the inorganic acid including, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, etc.; and organic acid salts, the organic acid including include, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, methanesulfonic acid and the like; and also salts of amino acids such as arginine, and salts of organic acids such as glucuronic acid. Certain specific compounds of the invention contain both basic and acidic functional groups and thus can be converted into either base or acid addition salts.

The pharmaceutically acceptable salts of the invention can be synthesized from the acid or base group-containing parent compounds by conventional chemical methods. Generally, such salts are prepared by reacting the free acid or base form of these compounds with a stoichiometric amount of an appropriate base or acid in water or an organic solvent or a mixture of both.

Unless otherwise specified, the absolute configuration of a stereocenter is represented by solid wedge bonds (✦) and dashed wedge bonds (⊥), and the relative configuration of a stereocenter is represented by solid straight bonds (/) and dashed straight bonds (/); a wavy line (~) is used to represent a solid wedge bond (/)) or a dashed wedge bond (⊥), or alternatively a wavy line (~) is used to represent a solid straight bond (/) or a dashed straight bond (/).

The term "optional" or "optionally" means that the subsequently described event or condition may be, but not necessarily, present, and this expression includes instances in which the event or condition is present and instances in which the event or condition is not present.

The term "substituted" means that any one or more of hydrogen atoms on a specific atom is replaced with a substituent, including variants of hydrogen and heavy hydrogen, provided that the valence of the specific atom is normal and the substituted compound is stable. When the substituent is oxygen (i.e., =O), it means that two hydrogen atoms are substituted, and an oxygen-substitution will not occur on an aromatic group. The term "optionally substituted" means that may or may not be a substitution, and unless otherwise specified, the species and number of substituents may be arbitrary provided that it is chemically possible.

When any variable (e.g., R) occurs more than one time in the constituent or structure of a compound, its definition is independent in each occasion. Thus, for example, if a group is substituted with 0 to 2 R, said group may be optionally substituted with up to two R, and R in each occasion has independent options. In addition, a combination of substituents and/or variation thereof is allowed only if such a combination results in a stable compound.

When one of the variables is a bond, it means that the two groups connected thereby are directly connected. For example, when L represents a bond in A-L-Z, the structure is actually A-Z.

When one of the variables is vacant, it means that the variable does not exist. For example, when $R^3$ is vacant in C—$R^3$, the structure is actually C.

When it is not indicated through which atom the listed substituent is linked to the substituted group, the substituent may be bonded through any atom thereof; for example, a phenyl group as a substituent may be bonded to the substituted group through any carbon atom on the phenyl ring.

Unless otherwise specified, the term "alkyl" is used to represent a straight or branched saturated hydrocarbon group, which may be monosubstituted (e.g., —$CH_2F$) or polysubstituted (e.g., —$CF_3$), and may be monovalent (e.g., methyl), divalent (such as methylene), or polyvalent (such as methine). Examples of an alkyl group include methyl (Me), ethyl (Et), propyl (e.g., n-propyl and isopropyl), butyl (e.g., n-butyl, isobutyl, s-butyl, t-butyl), pentyl (e.g., n-pentyl, isopentyl, neopentyl) and the like.

Unless otherwise specified, the term "cycloalkyl" includes any stable cyclic or polycyclic hydrocarbon group, any carbon atom of which is saturated, which may be monosubstituted or polysubstituted, and may be monovalent, divalent or polyvalent. Examples of such cycloalkyl groups include, but are not limited to, cyclopropyl, norbornyl, [2.2.2]bicyclooctyl, [4.4.0]bicyclodecyl, and the like.

Unless otherwise specified, the term "alkenyl" represents a straight or branched hydrocarbon group having at least one carbon-carbon double bond; "$C_{2-6}$ alkenyl" represents a hydrocarbon group having 2, 3, 4, 5 or 6 carbon atoms; "$C_{2-4}$ alkenyl" represents a hydrocarbon group having 2, 3 or 4 carbon atoms. It should be understood that in the case where the alkenyl group contains more than one carbon-carbon double bond, the double bonds may be separated from each other or conjugated to each other. Exemplary "$C_{2-6}$ alkenyl" groups include, but are not limited to, ethenyl, allyl, butenyl, pentenyl, hexenyl, butadienyl, pentadienyl, hexadienyl, and the like.

Unless otherwise specified, the term "alkynyl" represents a straight or branched hydrocarbon group having at least one carbon-carbon triple bond; "$C_{2-6}$ alkynyl" represents a hydrocarbon group having 2, 3, 4, 5 or 6 carbon atoms; "$C_{2-4}$ alkynyl" represents a hydrocarbon group having 2, 3 or 4 carbon atoms. Exemplary "$C_{2-6}$ alkynyl" groups include, but are not limited to, ethynyl, propynyl, butynyl, pentynyl, hexynyl, methylpropynyl, 4-methyl-1-butynyl, and the like.

Unless otherwise specified, the term "halogen" per se or as part of another substituent represents a fluorine (F), chlorine (Cl), bromine (Br) or iodine (I) atom.

Unless otherwise specified, the term "alkoxy" represents an alkyl group connected to the rest of the molecule through an oxygen atom, wherein the alkyl group has the meaning as described in the present invention. Unless otherwise specified, $C_{1-5}$ alkoxy includes C1, C2, C3, C4 and C5 alkoxy groups. Examples of alkoxy groups include, but are not limited to, methoxy, ethoxy, n-propoxy, isopropoxy, n-butoxy, sec-butoxy, tert-butoxy, n-pentyloxy and s-pentyloxy. The alkoxy group may optionally be substituted with one or more of the substituents described herein.

Unless otherwise specified, the term "amine (amino)" means-$NH_2$, —NH (alkyl) or—N(alkyl)(alkyl).

Unless otherwise specified, the term "aromatic ring" represents a polyunsaturated aromatic alkane monocyclic ring, which may be mono- or poly-substituted.

Unless otherwise specified, the term "4- to 6-membered heterocycloalkyl" represents a saturated monovalent monocyclic hydrocarbon ring containing 3, 4 or 5 carbon atoms and one or more groups of heteroatomic groups selected from O, $NR^a$, wherein Ra represents a hydrogen atom or $C_{1-6}$ alkyl; the "4- to 6-membered heterocycloalkyl" may be attached to the rest of the molecule through any carbon atom or, if present, a nitrogen atom.

Unless otherwise specified, the term "heteroaromatic ring" represents an aromatic ring containing 1 to 4 heteroatoms selected from one or more of N, O and S.

Unless otherwise specified, the term "fused heteroaromatic ring" represents a fused heterocyclic ring containing more than two aromatic moieties.

Unless otherwise specified, the term "5:6 ring-fused heteroaromatic ring" represents a fused heteroaromatic ring with a 5-membered ring fused to a 6-membered ring, wherein at least one of the two fused rings contain more than one heteroatom (including, but not limited to, O, S, or N), and the entire group is aromatic. Non-limiting examples include a benzo 5-membered heteroaryl, a 6-membered heteroaromatic ring fused to a 5-membered heteroaromatic ring.

Unless otherwise specified, the term "6:6 ring-fused heteroaromatic ring" represents a fused heteroaromatic ring with a 6-membered ring fused to a 6-membered ring, wherein at least one of the two parallel rings contain more than one heteroatom (including, but not limited to, O, S, or N), and the entire group is aromatic. Non-limiting examples comprise a benzo 6-membered heteroaryl, a 6-membered heteroaromatic ring+6-membered heteroaromatic ring.

Unless otherwise specified, the term "pharmaceutically acceptable salt" or "pharmaceutically acceptable salt thereof" means that with a compound of the present invention maintaining the bioavailability and properties of a free acid or a free base, a salt is obtained by reacting the free acid with a non-toxic inorganic base or organic base, or reacting the free base with a non-toxic inorganic acid or organic acid.

Unless otherwise specified, the term "pharmaceutical composition" means a mixture of one or more of the compounds or pharmaceutically acceptable salts described herein with other chemical components, wherein "other chemical components" means pharmaceutically acceptable carriers, excipients and/or one or more other therapeutic agents. A "carrier" refers to a material that does not cause significant irritation to an organism and does not abolish the biological activity and properties of the administered compound. An "excipient" refers to an inert substance added to a pharmaceutical composition to facilitate the administration of a compound. Non-limiting examples include calcium carbonate, calcium phosphate, sugar, starch, cellulose derivatives (including microcrystalline cellulose), gelatin, vegetable oils, polyethylene glycols, diluents, granulators, lubricants, binders, and disintegrants.

The compound of the present invention has good ATR kinase inhibitory activity, as well as inhibitory activity against tumor cell proliferation, and has potentials for application in the treatment of diseases associated with cell proliferation.

DETAILED DESCRIPTION OF THE INVENTION

Embodiments of the invention will be described in detail below in connection with examples, but it will be understood by those skilled in the art that the following examples are intended to illustrate the present invention only and should not be construed as limitation to the scope of the present invention. Those in the examples with unspecified conditions are carried out according to conventional conditions or the conditions suggested by the instrument manufacturer. The reagents or equipment used without a specified manufacturer are conventional products that are commercially available.

The structures of the compounds were determined by NMR or mass spectrometry. NMR was measured using a BRUKER 400M NMR spectrometer, with deuterated dimethylsulfoxide (DMSO-$d_6$) or deuterated chloroform (CDCl$_3$) as a measurement solvent and tetramethylsilane (TMS) as an internal standard, and the chemical shifts (δ) were given in units of $10^{-6}$ (ppm). Mass spectra were obtained using a Waters ACQUITY Arc/ACQUITY QDa or Thermo U3000-ISQ EC LC-MS spectrometer.

High performance liquid chromatography analysis was performed using a Thermo U3000 high pressure liquid chromatograph. The high performance liquid preparative chromatography was carried out using a Hambone DAC-50 or Shimadzu LC-20AP preparative chromatograph.

Reactions are monitored using thin-layer chromatography or LC-MS chromatography. The following solvent systems were used in thin layer chromatography: dichloromethane and methanol, petroleum ether and ethyl acetate, with the volume ratio of the solvents adjusted according to the polarity of the compound or by adding a small amount of triethylamine and the like. LC-MS spectrometry was performed using a Waters ACQUITY Arc/ACQUITY QDa or Thermo U3000-ISQ EC LC-MS spectrometer.

200-300 mesh silica gel were normally the carrier in column chromatography. The systems of eluents include: a system of dichloromethane and methanol, a system of petroleum ether and ethyl acetate, with the volume ratio of solvents adjusted according to the different polarity of the compounds or by adding a small amount of trimethylamine and the like.

In the following examples, unless otherwise stated, the reaction temperature is at room temperature (20° C. to 30° C.), and the solvents are dried and purified according to standard methods.

In the conventional synthesis method as well as in the examples of the present invention, the designation of the following abbreviation is shown below:

| Abbreviation | Designation |
| --- | --- |
| Pd(dppf)Cl$_2$ | [1,1'-bis(diphenylphosphino)ferrocene]palladium chloride |
| Pd(XantPhos)Cl$_2$ | 4,5-bis(diphenylphosphino)-9,9-dimethylxanthene palladium chloride |

Example 1: (R)-3-methyl-4-(1'-(methylsulfonyl)-1H, 1'H-[4,6'-dipyrrolo[2,3-b]pyridin]-4'-yl)morpholine (Compound 1)

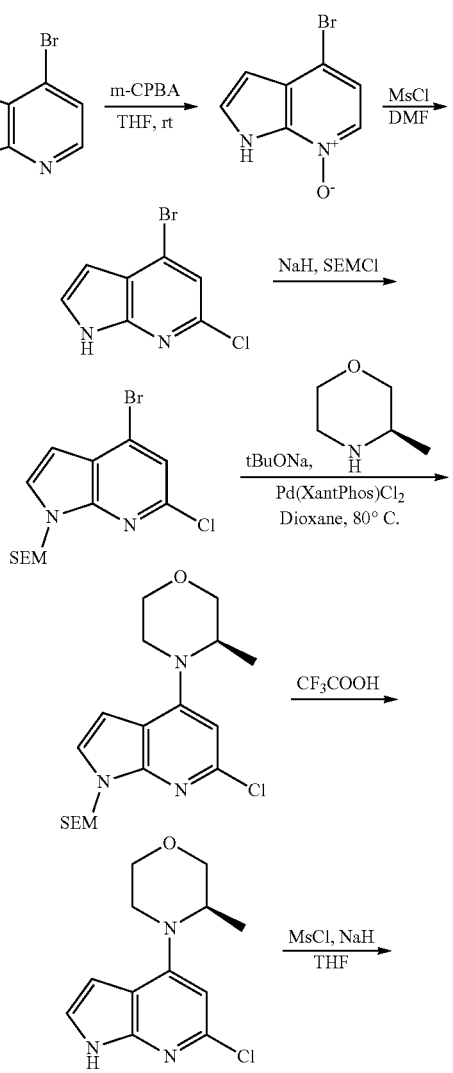

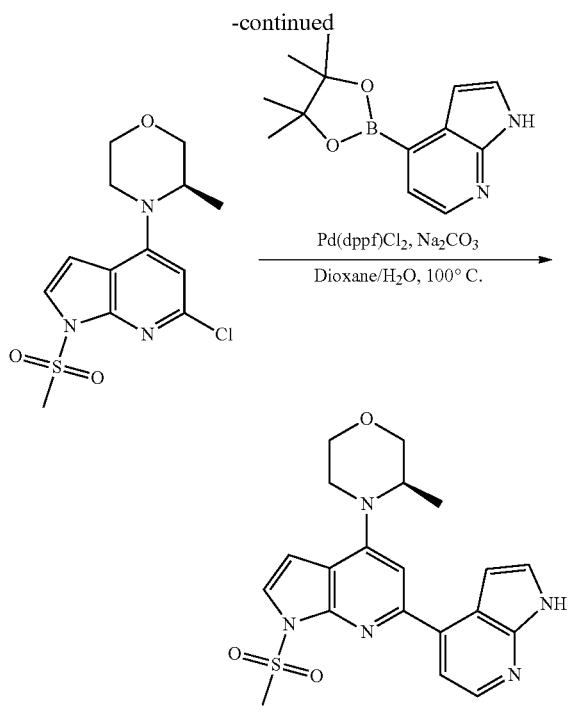

Step 1: 4-bromo-1H-pyrrolo[2,3-b]pyridine-7-oxide 4-bromo-1H-pyrrolo[2,3-b]pyridine (10.0 g, 50.8 mmol) was dissolved in tetrahydrofuran (200 mL) and cooled to 0° C., and m-chloroperoxybenzoic acid (17.5 g, 101.5 mmol) was added. Subsequently, the mixture was stirred and reacted for 4 h at room temperature, to precipitate a solid. The solid was collected by filtration, dissolved and purified by silica gel column chromatography, to obtain the title compound (7.8 g, 72% yield).

LC-MS (ESI) m/z 213.0, 215.0 $[M+H]^+$.

Step 2: 4-bromo-6-chloro-1H-pyrrolo[2,3-b]pyridine 4-bromo-1H-pyrrolo[2,3-b]pyridine-7-oxide (5.0 g, 23.5 mmol) was dissolved in N,N-dimethylformamide (250 mL) and heated to 50° C. Methanesulfonyl chloride (13.5 g, 118.0 mmol) was added and then heated to 75° C. The mixture was stirred and reacted for 1 h. The reaction solution was cooled to room temperature, concentrated under reduced pressure and purified by preparative HPLC, to obtain the title compound (2.2 g, 41% yield).

LC-MS (ESI) m/z 230.9, 232.9 $[M+H]^+$.

Step 3: 4-bromo-6-chloro-1-(2-(trimethylsilyl)ethoxymethyl)-1H-pyrrolo[2,3-b]pyridine 4-bromo-6-chloro-1H-pyrrolo[2,3-b]pyridine (1.1 g, 4.8 mmol) was dissolved in tetrahydrofuran (35 mL), and 60% sodium hydride (400 mg, 10.0 mmol) was added slowly at room temperature. The mixture was stirred and reacted for 5 min. Subsequently, 2-(trimethylsilyl)ethoxymethyl chloride (2.5 g, 15.0 mmol) was added, and the reaction was continued with stirring at room temperature until the starting materials were completely converted. The reaction was quenched with a small amount of water, dichloromethane (100 mL) was then added, followed by washing with water. The organic phase was dried over anhydrous sodium sulfate, and the filtrate was concentrated under reduced pressure and purified by silica gel column chromatography, to obtain the title compound (1.5 g, 87% yield).

LC-MS (ESI) m/z 361.0, 363.0 $[M+H]^+$.

Step 4: (R)-4-(6-chloro-1-(2-(trimethylsilyl)ethoxymethyl)-1H-pyrrolo[2,3-b]pyridin-4-yl)-3-methylmorpholine 4-bromo-6-chloro-1-(2-(trimethylsilyl)ethoxymethyl)-1H-pyrrolo[2,3-b]pyridine (1.0 g, 2.8 mmol) and (R)-3-methylmorpholine (280 mg, 2.8 mmol) were dissolved in 1,4-dioxane (20 mL). After degassing with nitrogen and under nitrogen protection, $Pd(XantPhos)Cl_2$ (210 mg, 0.28 mmol) and sodium tert-butoxide (270 mg, 2.8 mmol) were added and then heated to 80° C. Under nitrogen protection, the mixture was stirred and reacted for 6 h. The reaction solution was cooled to room temperature, dichloromethane (100 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (437 mg, 41% yield).

LC-MS (ESI) m/z 382.2 $[M+H]^+$.

Step 5: (R)-4-(6-chloro-1H-pyrrolo[2,3-b]pyridin-4-yl)-3-methylmorpholine

To a reaction flask, (R)-4-(6-chloro-1-(2-(trimethylsilyl)ethoxymethyl)-1H-pyrrolo[2,3-b]pyridin-4-yl)-3-methylmorpholine (110 mg, 0.29 mmol) and trifluoroacetic acid (1 mL) were added. The mixture was stirred and reacted at room temperature until the starting materials were completely converted. The reaction solution was concentrated under reduced pressure, and tetrahydrofuran (5 mL) and 1 M aqueous sodium hydroxide (2 mL) were added. The resulting mixture was stirred for 30 min at room temperature, and ethyl acetate (50 mL) was then added, followed by washing with water. After separation of the solution, the organic phase was dried over anhydrous sodium sulfate and filtered, and the filtrate was concentrated under reduced pressure, to obtain a crude product of the title compound, which was used directly for the next step without further purification.

LC-MS (ESI) m/z 252.1 $[M+H]^+$.

Step 6 (R)-4-(6-chloro-1-(methylsulfonyl)-1H-pyrrolo[2,3-b]pyridin-4-yl)-3-methylmorpholine The crude product of (R)-4-(6-chloro-1H-pyrrolo[2,3-b]pyridin-4-yl)-3-methylmorpholine from the previous step was completely dissolved in tetrahydrofuran (6 mL), and 60% sodium hydride (48 mg, 1.2 mmol) was added slowly at room temperature. The mixture was stirred and reacted for 5 min, and methanesulfonyl chloride (172 mg, 1.5 mmol) was then added dropwise. The reaction was quenched with a small amount of water, and ethyl acetate (40 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (76 mg, yield 80%).

LC-MS (ESI) m/z 330.1 $[M+H]^+$.

Step 7: (R)-3-methyl-4-(1'-(methylsulfonyl)-1H,1'H-[4,6'-dipyrrolo[2,3-b]pyridine]-4'-yl)morpholine To a reaction flask, (R)-4-(6-chloro-1-(methylsulfonyl)-1H-pyrrolo[2,3-b]pyridin-4-yl)-3-methylmorpholine (50 mg, 0.15 mmol), 4-(4,4,5,5-tetramethyl-1,3,2-dioxaborolan-2-yl)-1H-pyrrolo[2,3-b]pyridine (73.5 mg, 0.3 mmol), Pd(dppf)Cl₂ (22 mg, 0.03 mmol) and sodium carbonate (47.5 mg, 0.45 mmol) were added, followed by the addition of 1,4-dioxane (2.5 mL) and water (0.5 mL). After degassing with nitrogen and under nitrogen protection, the mixture was heated to 100° C., stirred and reacted for 3 h. The reaction solution was cooled to room temperature, and dichloromethane (20 mL) was then added, followed by washing with water. After separation of the solution, the organic phase was dried over anhydrous sodium sulfate and filtered, and the filtrate was concentrated under reduced pressure and purified by preparative HPLC, to obtain Compound 1 (51 mg, yield 82%).

LC-MS (ESI) m/z 412.2 [M+H]⁺.

¹H NMR (400 MHZ, DMSO-d₆) δ 11.77 (s, 1H), 8.32 (d, J=5.0 Hz, 1H), 7.67 (d, J=5.1 Hz, 1H), 7.61 (d, J=4.1 Hz, 1H), 7.57 (dd, J=3.5, 2.5 Hz, 1H), 7.31 (s, 1H), 7.27 (dd, J=3.4, 1.9 Hz, 1H), 6.98 (d, J=4.2 Hz, 1H), 4.42-4.34 (m, 1H), 4.03-3.95 (m, 1H), 3.84 (dd, J=11.3, 2.7 Hz, 1H), 3.79 (s, 3H), 3.73 (d, J=11.3 Hz, 1H), 3.69-3.59 (m, 2H), 3.51 (td, J=12.3, 3.5 Hz, 1H), 1.18 (d, J=6.7 Hz, 3H).

¹³C NMR (100 MHz, DMSO-d₆) δ 153.11, 152.00, 150.79, 149.64, 143.44, 139.42, 127.84, 123.59, 118.25, 114.68, 111.58, 105.64, 104.16, 101.94, 71.45, 67.08, 51.42, 43.70, 42.51, 13.89.

By using a coupling reaction similar to the Step 7 of Example 1, and replacing 4-(4,4,5,5-tetramethyl-1,3,2-dioxaborolan-2-yl)-1H-pyrrolo[2,3-b]pyridine with other aryl (pinacolato) borates or aryl boronic acids, Compounds 2 to 11 can be synthesized from the intermediate (R)-4-(6-chloro-1-(methylsulfonyl)-1H-pyrrolo[2,3-b]pyridin-4-yl)-3-methylmorpholine. Aryl(pinacolato) borates are commercially available or prepared from aryl halides with bis(pinacolato) borates by using the Miyaura boronization reaction. Aryl boronic acids are commercially available or prepared by reacting aryl halides with butyl lithium and borates.

Example 2: (R)-4-(6-(1H-indol-4-yl)-1-(methylsulfonyl)-1H-pyrrolo[2,3-b]pyridin-4-yl)-3-methylmorpholine (Compound 2)

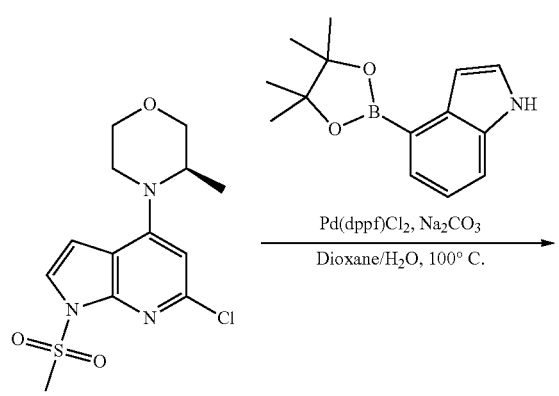

In accordance with the reaction as shown above, Compound 2 (54 mg, yield 87%) was obtained. LC-MS (ESI) m/z 411.2 [M+H]⁺.

¹H NMR (400 MHZ, DMSO-d₆) δ 11.26 (s, 1H), 7.57 (dd, J=7.4, 0.9 Hz, 1H), 7.55 (d, J=4.1 Hz, 1H), 7.48 (d, J=8.1 Hz, 1H), 7.44 (t, J=2.8 Hz, 1H), 7.24-7.18 (m, 2H), 7.16 (s, 1H), 6.94 (d, J=4.2 Hz, 1H), 4.36-4.28 (m, 1H), 4.02-3.94 (m, 1H), 3.87-3.78 (m, 4H), 3.72 (d, J=11.4 Hz, 1H), 3.65 (td, J=11.2, 3.3 Hz, 1H), 3.55 (d, J=12.1 Hz, 1H), 3.48 (td, J=11.8, 3.4 Hz, 1H), 1.17 (d, J=6.6 Hz, 3H).

Example 3: (R)-3-methyl-4-(1-(methylsulfonyl)-6-(1H-pyrrolo[2,3-c]pyridin-4-yl)-1H-pyrrolo[2,3-b]pyridin-4-yl)morpholine (Compound 3)

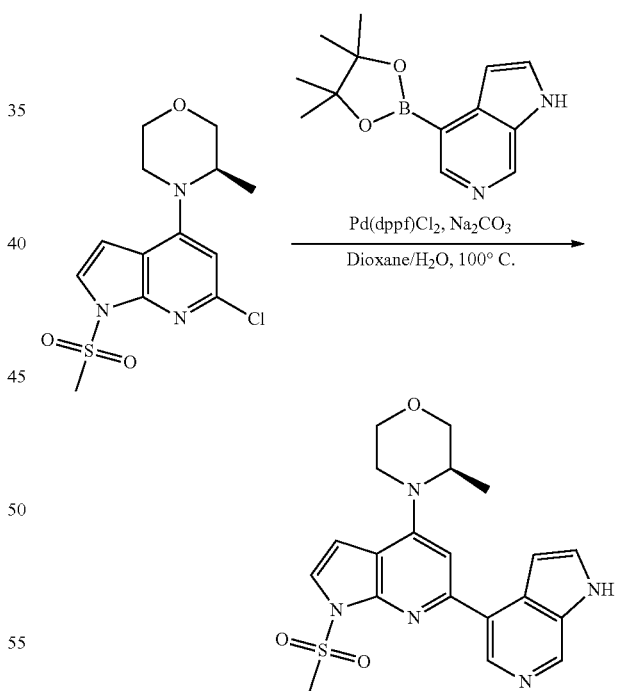

In accordance with the reaction as shown above, Compound 3 (102 mg, yield 82%) was obtained.

LC-MS (ESI) m/z 412.3 [M+H]⁺.

¹H NMR (400 MHZ, DMSO-d₆) δ 11.76 (s, 1H), 8.79 (s, 1H), 8.71 (s, 1H), 7.71 (t, J=2.8 Hz, 1H), 7.56 (d, J=4.2 Hz, 1H), 7.32-7.27 (m, 1H), 7.25 (s, 1H), 6.96 (d, J=4.2 Hz, 1H), 4.41-4.33 (m, 1H), 3.94-4.02 (m, 1H), 3.83 (dd, J=11.6, 2.8 Hz, 1H), 3.79 (s, 3H), 3.73 (d, J=11.5 Hz, 1H), 3.69-3.59 (m, 2H), 3.50 (td, J=12.4, 3.4 Hz, 1H), 1.19 (d, J=6.6 Hz, 3H).

Example 4: (R)-3-methyl-4-(1'-(methylsulfonyl)-1H,1'H-[5,6'-dipyrrolo[2,3-b]pyridin]-4'-yl)morpholine (Compound 4)

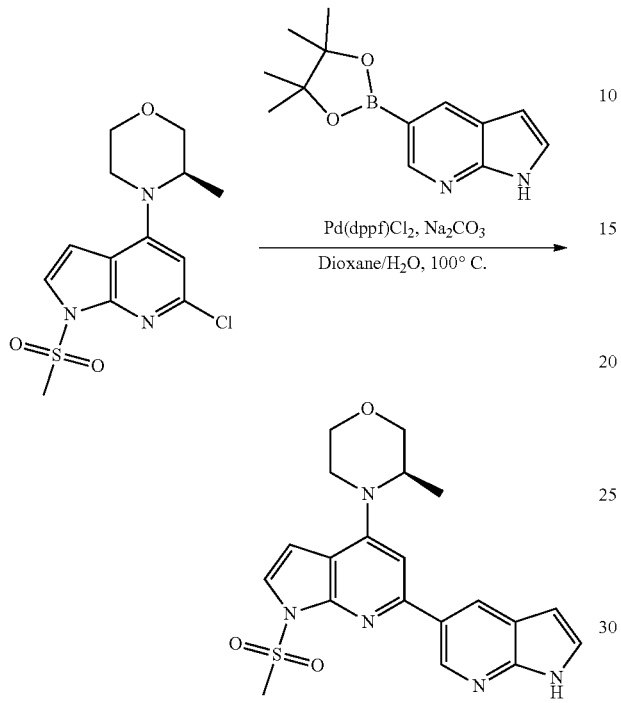

In accordance with the reaction as shown above, Compound 4 (50 mg, yield 80%) was obtained.

LC-MS (ESI) m/z 412.2 [M+H]⁺.

$^1$H NMR (400 MHZ, DMSO-$d_6$) δ 11.79 (s, 1H), 9.02 (d, J=2.1 Hz, 1H), 8.66 (d, J=2.2 Hz, 1H), 7.55-7.48 (m, 2H), 7.25 (s, 1H), 6.91 (d, J=4.2 Hz, 1H), 6.56 (dd, J=3.4, 1.8 Hz, 1H), 4.43-4.35 (m, 1H), 3.98 (dd, J=10.7, 3.0 Hz, 1H), 3.87-3.79 (m, 4H), 3.73 (d, J=11.6 Hz, 1H), 3.69-3.60 (m, 2H), 3.51 (td, J=12.8, 3.6 Hz, 1H), 1.18 (d, J=6.6 Hz, 3H).

Example 5: (R)-3-methyl-4-(1'-(methylsulfonyl)-1H,1'H-[3,6'-dipyrrolo[2,3-b]pyridin]-4'-yl)morpholine (Compound 5)

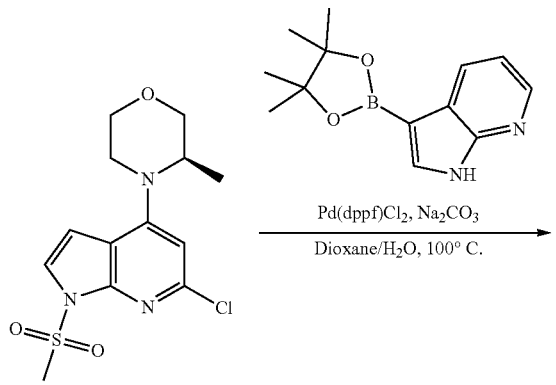

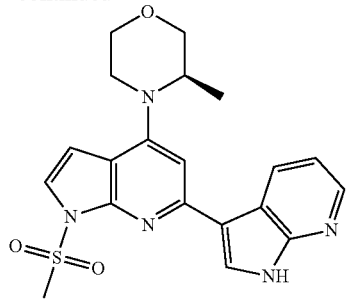

In accordance with the reaction as shown above, Compound 5 (53 mg, yield 85%) was obtained.

LC-MS (ESI) m/z 412.2 [M+H]⁺.

$^1$H NMR (400 MHZ, DMSO-$d_6$) δ 12.01 (d, J=2.1 Hz, 1H), 8.99 (dd, J=7.9, 1.7 Hz, 1H), 8.37 (d, J=2.8 Hz, 1H), 8.27 (dd, J=4.7, 1.7 Hz, 1H), 7.45 (d, J=4.1 Hz, 1H), 7.21-7.14 (m, 2H), 6.87 (d, J=4.2 Hz, 1H), 4.38-4.29 (m, 1H), 3.98 (d, J=11.3 Hz, 1H), 3.83 (dd, J=11.3, 3.0 Hz, 1H), 3.77-3.69 (m, 4H), 3.65 (td, J=11.2, 3.2 Hz, 1H), 3.57-3.42 (m, 2H), 1.16 (d, J=6.6 Hz, 3H).

Example 6: (R)-3-methyl-4-(3-methyl-1'-(methylsulfonyl)-1H,1'H-[4,6'-dipyrrolo[2,3-b]pyridin]-4'-yl)morpholine (Compound 6)

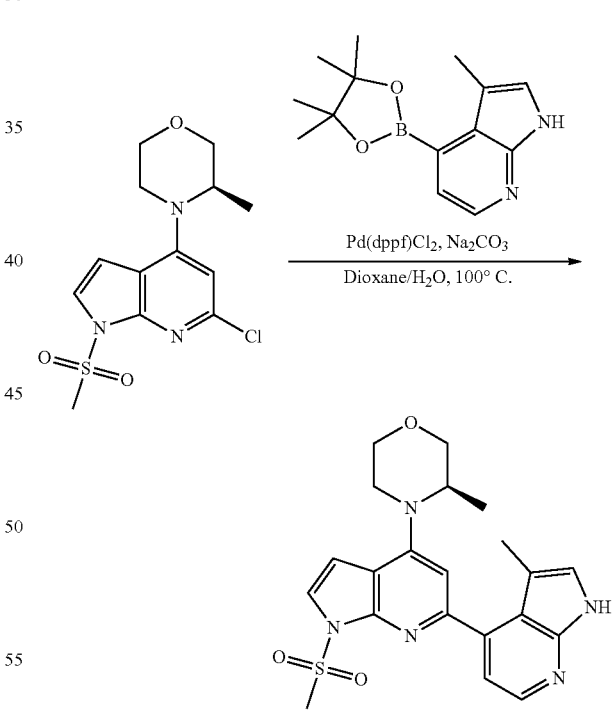

In accordance with the reaction as shown above, Compound 6 (33 mg, yield 34%) was obtained.

LC-MS (ESI) m/z 426.2 [M+H]⁺.

$^1$H NMR (400 MHZ, DMSO-$d_6$) δ 11.47 (s, 1H), 8.24 (d, J=4.8 Hz, 1H), 7.58 (d, J=4.2 Hz, 1H), 7.30-7.23 (m, 1H), 7.08 (d, J=4.8 Hz, 1H), 6.98 (d, J=4.2 Hz, 1H), 6.82 (s, 1H), 4.37-4.29 (m, 1H), 3.97-3.89 (m, 1H), 3.80 (dd, J=11.3, 2.8 Hz, 1H), 3.74-3.67 (m, 4H), 3.61 (td, J=11.3, 3.0 Hz, 1H), 3.55-3.41 (m, 2H), 1.94 (s, 3H), 1.16 (d, J=6.6 Hz, 3H).

Example 7: (R)-4-(6-(6-fluoro-1H-indol-4-yl)-1-(methylsulfonyl)-1H-pyrrolo[2,3-b]pyridin-4-yl)-3-methylmorpholine (Compound 7)

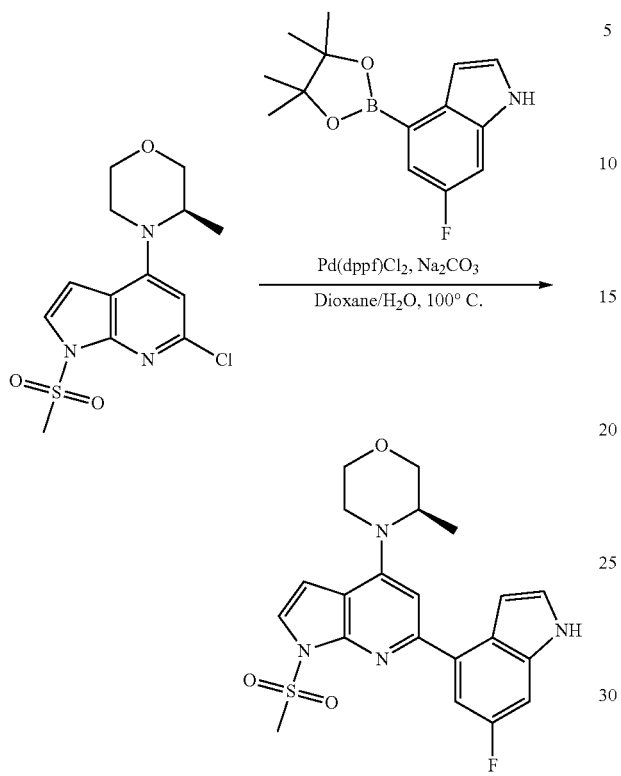

In accordance with the reaction as shown above, Compound 7 (56 mg, yield 86%) was obtained. LC-MS (ESI) m/z 429.2 [M+H]+.

1H NMR (400 MHZ, DMSO-d6) δ 11.32 (s, 1H), 7.57 (d, J=4.1 Hz, 1H), 7.47 (dd, J=11.2, 2.3 Hz, 1H), 7.45-7.43 (m, 1H), 7.26 (dd, J=9.5, 2.2 Hz, 1H), 7.23-7.20 (m, 1H), 7.18 (s, 1H), 6.95 (d, J=4.2 Hz, 1H), 4.40-4.32 (m, 1H), 4.02-3.94 (m, 1H), 3.83 (dd, J=11.4, 2.7 Hz, 1H), 3.79 (s, 3H), 3.72 (d, J=11.2 Hz, 1H), 3.69-3.57 (m, 2H), 3.49 (td, J=12.4, 3.5 Hz, 1H), 1.18 (d, J=6.7 Hz, 3H).

Example 8: (R)-4-(6-(7-fluoro-1H-indol-4-yl)-1-(methylsulfonyl)-1H-pyrrolo[2,3-b]pyridin-4-yl)-3-methylmorpholine (Compound 8)

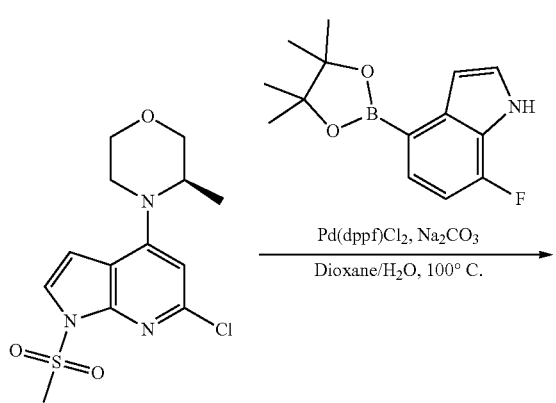

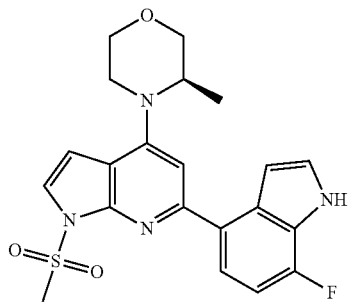

In accordance with the reaction as shown above, Compound 8 (35 mg, yield 54%) was obtained.

LC-MS (ESI) m/z 429.2 [M+H]+.

1H NMR (400 MHZ, DMSO-d6) δ 11.75 (s, 1H), 7.59-7.53 (m, 2H), 7.51 (t, J=2.7 Hz, 1H), 7.33-7.29 (m, 1H), 7.13 (s, 1H), 7.04 (dd, J=11.0, 8.2 Hz, 1H), 6.93 (d, J=4.2 Hz, 1H), 4.37-4.29 (m, 1H), 4.02-3.94 (m, 1H), 3.83 (dd, J=11.3, 2.9 Hz, 1H), 3.79 (s, 3H), 3.72 (d, J=10.6 Hz, 1H), 3.65 (td, J=11.3, 2.9 Hz, 1H), 3.56 (d, J=11.6 Hz, 1H), 3.48 (td, J=12.2, 3.5 Hz, 1H), 1.17 (d, J=6.6 Hz, 3H).

Example 9: (R)-3-methyl-4-(1-(methylsulfonyl)-6-(1H-pyrazol-5-yl)-1H-pyrrolo[2,3-b]pyridin-4-yl)morpholine (Compound 9)

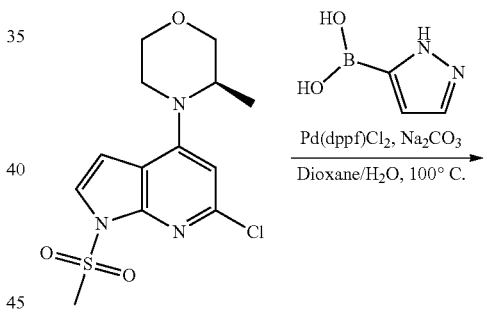

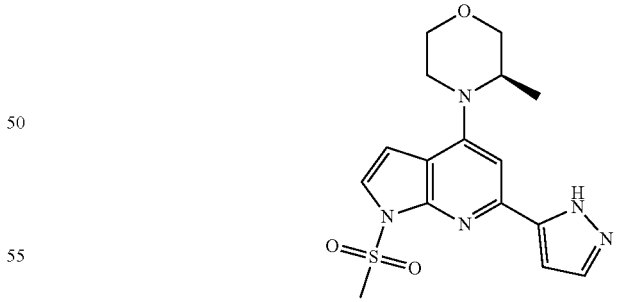

In accordance with the reaction as shown above, Compound 9 (45 mg, yield 82%) was obtained.

LC-MS (ESI) m/z 362.2 [M+H]+.

1H NMR (400 MHZ, DMSO-d6) δ 12.98 (s, 1H), 7.82 (s, 1H), 7.51 (d, J=4.1 Hz, 1H), 7.31 (s, 1H), 6.90 (d, J=4.2 Hz, 1H), 6.83 (s, 1H), 4.34-4.22 (m, 1H), 3.98 (d, J=10.8 Hz, 1H), 3.93-3.77 (m, 4H), 3.71 (d, J=11.2 Hz, 1H), 3.67-3.57 (m, 1H), 3.50-3.39 (m, 2H), 1.14 (d, J=6.5 Hz, 3H).

Example 10: (R)-3-methyl-4-(1-(methylsulfonyl)-6-(1H-pyrazol-4-yl)-1H-pyrrolo[2,3-b]pyridin-4-yl)morpholine (Compound 10)

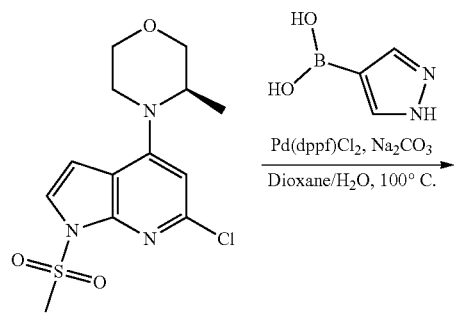

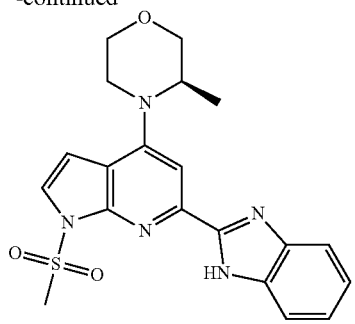

In accordance with the reaction as shown above, Compound 10 (43 mg, yield 78%) was obtained.

LC-MS (ESI) m/z 362.2 [M+H]$^+$.

$^1$H NMR (400 MHZ, DMSO-d$_6$) δ 13.03 (s, 1H), 8.35 (s, 1H), 8.08 (s, 1H), 7.44 (d, J=4.1 Hz, 1H), 6.98 (s, 1H), 6.84 (d, J=4.1 Hz, 1H), 4.35-4.27 (m, 1H), 3.96 (d, J=13.1 Hz, 1H), 3.85-3.77 (m, 4H), 3.71 (d, J=11.3 Hz, 1H), 3.62 (td, J=11.5, 3.3 Hz, 1H), 3.51 (d, J=12.1 Hz, 1H), 3.45 (dd, J=11.4, 3.4 Hz, 1H), 1.13 (d, J=6.6 Hz, 3H).

Example 11: (R)-4-(6-(1H-benzo[d]imidazol-2-yl)-1-(methylsulfonyl)-1H-pyrrolo[2,3-b]pyridin-4-yl)-3-methylmorpholine (Compound 11)

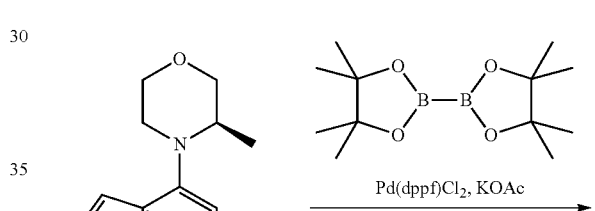

In accordance with the reaction as shown above, Compound 11 (23 mg, yield 40%) was obtained.

LC-MS (ESI) m/z 412.2 [M+H]$^+$.

$^1$H NMR (400 MHZ, DMSO-d$_6$) δ 12.68 (s, 1H), 7.73-7.68 (m, 2H), 7.66-7.61 (m, 2H), 7.30-7.19 (m, 2H), 6.99 (d, J=4.2 Hz, 1H), 4.39-4.31 (m, 1H), 4.06-3.96 (m, 4H), 3.84 (dd, J=11.5, 2.5 Hz, 1H), 3.74 (d, J=11.2 Hz, 1H), 3.65 (td, J=11.0, 3.8 Hz, 1H), 3.59-3.50 (m, 2H), 1.18 (d, J=6.6 Hz, 3H).

Example 12: (R)-3-methyl-4-(1-(methylsulfonyl)-6-(7H-pyrrolo[2,3-d]pyrimidin-4-yl)-1H-pyrrolo[2,3-b]pyridin-4-yl)-morpholine (Compound 12)

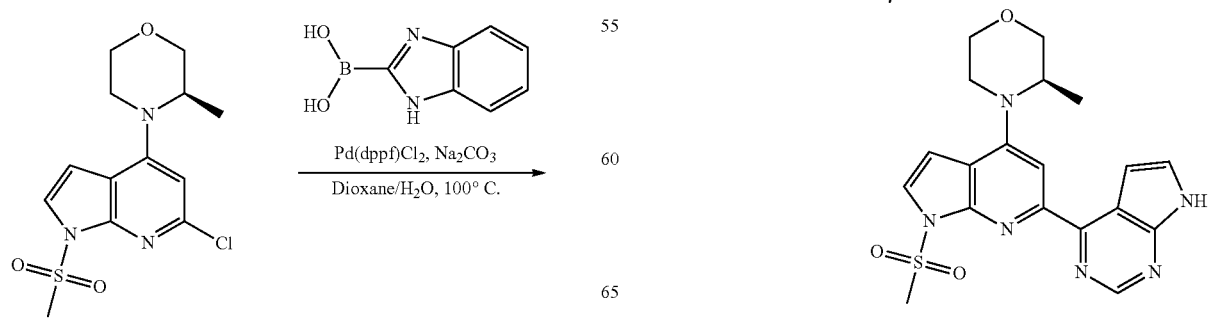

Step 1: (R)-3-methyl-4-(1-(methylsulfonyl)-6-(4,4,5,5-tetramethyl-1,3,2-dioxaborolan-2-yl)-1H-pyrrolo[2,3-b]pyridin-4-yl)morpholine To a reaction flask, (R)-4-(6-chloro-1-(methylsulfonyl)-1H-pyrrolo[2,3-b]pyridin-4-yl)-3-methylmorpholine (200 mg, 0.61 mmol), bis(pinacolato) borate (230 mg, 0.91 mmol), Pd(dppf)Cl₂ (88 mg, 0.12 mmol) and potassium acetate (101 mg, 1.03 mmol) were added, followed by the addition of 1,4-dioxane (4 mL). After degassing with nitrogen and under nitrogen protection, the mixture was heated to 110° C., stirred and reacted for 1.5 h. The reaction solution was cooled to room temperature, and ethyl acetate (20 mL) was then added. The resulting mixture was filtered with diatomite, and the filtrate was concentrated under reduced pressure, to obtain the crude product of the title compound (300 mg), which was used directly for the next step without further purification.

Step 2: (R)-3-methyl-4-(1-(methylsulfonyl)-6-(7H-pyrrolo[2,3-d]pyrimidin-4-yl)-1H-pyrrolo[2,3-b]pyridin-4-yl)-morpholine To a reaction flask, (R)-3-methyl-4-(1-(methylsulfonyl)-6-(4,4,5,5-tetramethyl-1,3,2-dioxaborolan-2-yl)-1H-pyrrolo[2,3-b]pyridin-4-yl)morpholine (200 mg of the crude product, counted as 0.40 mmol), 4-bromo-7H-pyrrolo[2,3-d]pyrimidine (48 mg, 0.24 mmol), Pd(dppf) C₁₂ (51 mg, 0.07 mmol) and sodium carbonate (153 mg, 1.44 mmol) were added, followed by the addition of 1,4-dioxane (5 mL) and water (1 mL). After degassing with nitrogen and under nitrogen protection, the mixture was heated to 85° C., stirred and reacted for 1 h. The reaction solution was cooled to room temperature, and dichloromethane (25 mL) was added, followed by washing with water. After separation of the solution, the organic phase was dried over anhydrous sodium sulfate and filtered, and the filtrate was concentrated under reduced pressure and purified by preparative HPLC, to obtain Compound 12 (40 mg, yield 40%).

LC-MS (ESI) m/z 413.2 [M+H]⁺.

¹H NMR (400 MHz, DMSO-d₆) & 12.19 (s, 1H), 8.85 (s, 1H), 8.01 (s, 1H), 7.72-7.63 (m, 3H), 7.02 (d, J=4.2 Hz, 1H), 4.40-4.32 (m, 1H), 4.02 (d, J=11.0 Hz, 1H), 3.85 (dd, J=11.5, 2.8 Hz, 1H), 3.79-3.70 (m, 4H), 3.65 (td, J=10.7, 4.0 Hz, 1H), 3.59-3.50 (m, 2H), 1.18 (d, J=6.6 Hz, 3H).

Example 13: (R)-4-(6-(3H-imidazo[4,5-b]pyridin-7-yl)-1-(methylsulfonyl)-1H-pyrrolo[2,3-b]pyridin-4-yl)-3-methylmorpholine (Compound 13)

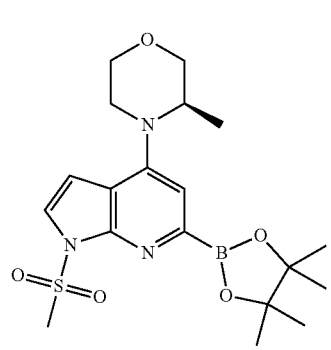

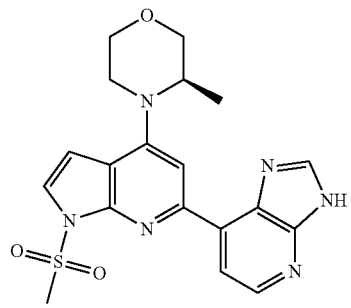

In accordance with the reaction as shown above (similar to the Step 2 of Example 12), Compound 13 (20 mg, yield 35%) was obtained.

LC-MS (ESI) m/z 413.1 [M+H]⁺.

¹H NMR (400 MHZ, CDCl₃) δ 12.00 (s, 1H), 8.66 (d, J=5.1 Hz, 1H), 8.41 (s, 1H), 7.65 (d, J=5.2 Hz, 1H), 7.51 (d, J=4.1 Hz, 1H), 7.29 (s, 1H), 6.74 (d, J=4.1 Hz, 1H), 4.31-4.23 (m, 1H), 4.15-4.08 (m, 1H), 3.97 (dd, J=11.4, 3.0 Hz, 1H), 3.85 (d, J=11.0 Hz, 1H), 3.80 (td, J=11.4, 2.9 Hz, 1H), 3.68 (td, J=11.7, 3.5 Hz, 1H), 3.53 (d, J=12.1 Hz, 1H), 3.40 (s, 3H), 1.34 (d, J=6.7 Hz, 3H).

Example 14: (R)-4-(1'-(isopropylsulfonyl)-1H,1'H-[4,6'-dipyrrolo[2,3-b]pyridin]-4'-yl)-3-methylmorpholine (Compound 14)

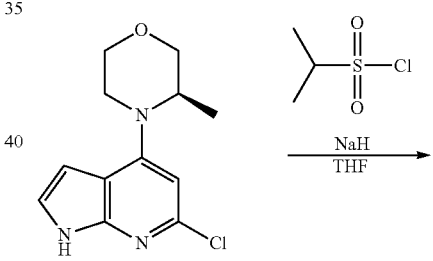

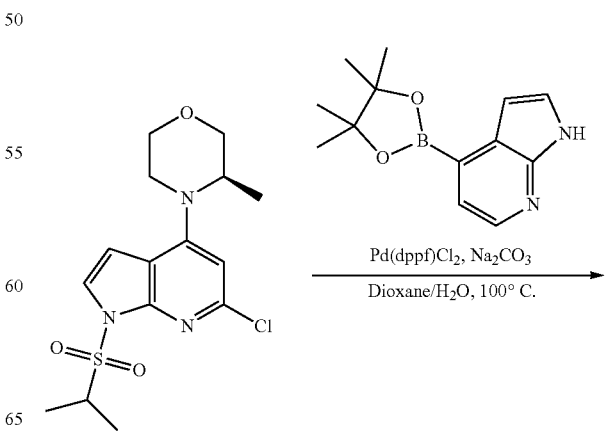

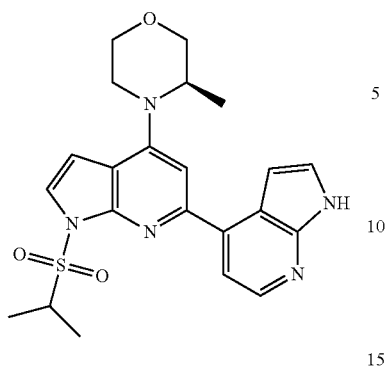

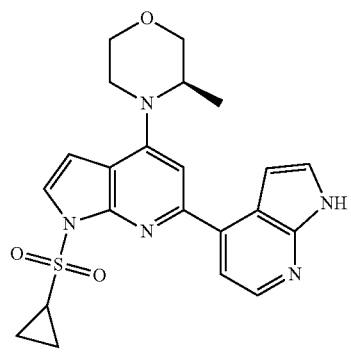

By conducting a reaction similar to the Steps 6 and 7 of Example 1, and replacing methanesulfonyl chloride in the Step 6 of Example 1 with isopropylsulfonyl chloride, Compound 14 (111 mg, the yields of the two steps were 92% and 45%, respectively) was obtained from the intermediate (R)-4-(6-chloro-1H-pyrrolo[2,3-b]pyridin-4-yl)-3-methylmorpholine by the two-step reaction as shown above.

LC-MS (ESI) m/z 440.2 [M+H]+.

$^1$H NMR (400 MHZ, DMSO-d$_6$) δ 11.74 (s, 1H), 8.31 (d, J=5.0 Hz, 1H), 7.68 (d, J=5.1 Hz, 1H), 7.61-7.56 (m, 2H), 7.36 (dd, J=3.5, 2.0 Hz, 1H), 7.33 (s, 1H), 7.00 (d, J=4.2 Hz, 1H), 4.45-4.35 (m, 2H), 3.99 (dd, J=11.7, 2.5 Hz, 1H), 3.83 (dd, J=11.4, 2.8 Hz, 1H), 3.73 (d, J=11.3 Hz, 1H), 3.69-3.60 (m, 2H), 3.51 (td, J=12.7, 3.4 Hz, 1H), 1.29 (d, J=6.9 Hz, 3H), 1.23 (d, J=6.8 Hz, 3H), 1.19 (d, J=6.6 Hz, 3H).

Example 15: (R)-4-(1'-(cyclopropylsulfonyl)-1H,1'H-[4,6'-dipyrrolo[2,3-b]pyridin]-4'-yl)-3-methylmorpholine (Compound 15)

By conducting a reaction similar to the Steps 6 and 7 of Example 1, and replacing methanesulfonyl chloride in the Step 6 of Example 1 with cyclopropylsulfonyl chloride, Compound 15 (109 mg, the yields of the two steps were 90% and 50%, respectively) was obtained from the intermediate (R)-4-(6-chloro-1H-pyrrolo[2,3-b]pyridin-4-yl)-3-methylmorpholine by the two-step reaction as shown above.

LC-MS (ESI) m/z 438.2 [M+H]+.

$^1$H NMR (400 MHZ, DMSO-d$_6$) δ 11.75 (s, 1H), 8.32 (d, J=5.0 Hz, 1H), 7.68 (d, J=5.1 Hz, 1H), 7.60-7.55 (m, 2H), 7.35 (dd, J=3.5, 1.9 Hz, 1H), 7.32 (s, 1H), 6.96 (d, J=4.2 Hz, 1H), 4.41-4.33 (m, 1H), 4.02-3.96 (m, 1H), 3.84 (dd, J=11.4, 2.8 Hz, 1H), 3.73 (d, J=11.1 Hz, 1H), 3.70-3.59 (m, 2H), 3.51 (td, J=12.5, 3.7 Hz, 1H), 3.47-3.39 (m, 1H), 1.43-1.29 (m, 2H), 1.19 (d, J=6.6 Hz, 3H), 1.14-1.06 (m, 2H).

Example 16: (R)—N,N-dimethyl-4'-(3-methylmorpholinyl)-1H,1'H-[4,6'-dipyrrolo[2,3-b]pyridine]-1'-sulfamide (Compound 16)

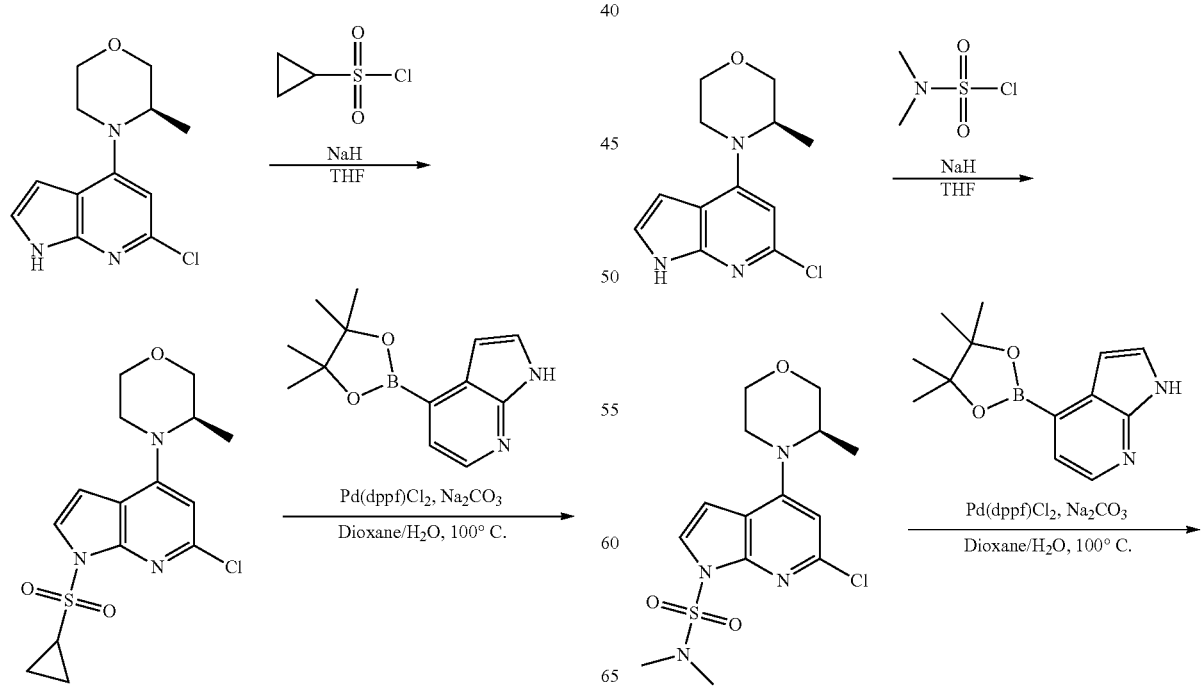

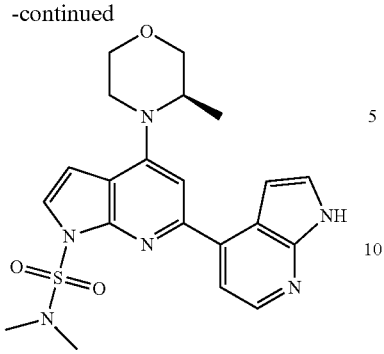

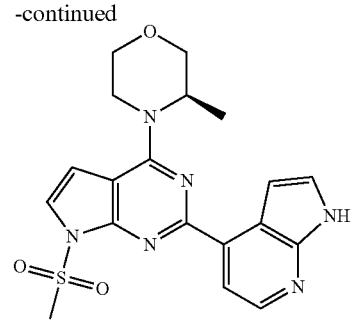

By conducting a reaction similar to the Steps 6 and 7 of Example 1, and replacing methanesulfonyl chloride in the Step 6 of Example 1 with dimethylsulfamoyl chloride, and Compound 16 (148 mg, the yields of the two steps were 91% and 60%, respectively) was obtained from the intermediate (R)-4-(6-chloro-1H-pyrrolo[2,3-b]pyridin-4-yl)-3-methylmorpholine by the two-step reaction as shown above.

LC-MS (ESI) m/z 441.2 [M+H]$^+$.

$^1$H NMR (400 MHz, DMSO-d$_6$) δ 11.74 (s, 1H), 8.31 (d, J=5.0 Hz, 1H), 7.61 (d, J=5.1 Hz, 1H), 7.59-7.55 (m, 2H), 7.28 (dd, J=3.4, 1.9 Hz, 1H), 7.25 (s, 1H), 6.91 (d, J=4.2 Hz, 1H), 4.39-4.31 (m, 1H), 4.02-3.95 (m, 1H), 3.84 (dd, J=11.4, 2.7 Hz, 1H), 3.72 (d, J=11.2 Hz, 1H), 3.69-3.56 (m, 2H), 3.50 (td, J=12.0, 3.4 Hz, 1H), 2.89 (s, 6H), 1.18 (d, J=6.6 Hz, 3H).

Example 17: (R)-3-methyl-4-(7-(methylsulfonyl)-2-(1H-pyrrolo[2,3-b]pyridin-4-yl)-7H-pyrrolo[2,3-d]pyrimidin-4-yl)morpholine (Compound 17)

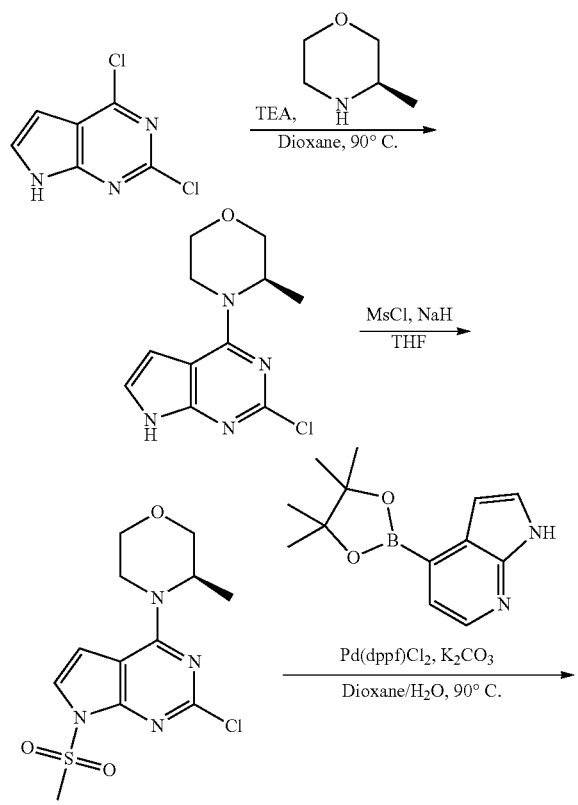

Step 1: (R)-4-(2-chloro-7H-pyrrolo[2,3-d]pyrimidin-4-yl)-3-methylmorpholine 2,4-dichloro-7H-pyrrolo[2,3-d]pyrimidine (1.00 g, 5.3 mmol) and (R)-3-methylmorpholine (2.70 g, 26.7 mmol) were dissolved in 1,4-dioxane (25 mL), and trimethylamine (3.80 g, 37.6 mmol) was added slowly. Subsequently, the mixture was heated to 90° C., stirred and reacted for 8 h. The reaction solution was cooled to room temperature, and dichloromethane (100 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (1.02 g, yield 76%).

LC-MS (ESI) m/z 253.1 [M+H]$^+$.

Step 2: (R)-4-(2-chloro-7-(methylsulfonyl)-7H-pyrrolo[2,3-d]pyrimidin-4-yl)-3-methylmorpholine (R)-4-(2-chloro-7H-pyrrolo[2,3-d]pyrimidin-4-yl)-3-methylmorpholine (152 mg, 0.6 mmol) was dissolved in tetrahydrofuran (7.5 mL), and 60% sodium hydride (48 mg, 1.2 mmol) was added slowly at room temperature. The mixture was stirred and reacted for 5 min, and methanesulfonyl chloride (137 mg, 1.2 mmol) was then added dropwise. The mixture was continued to be stirred and reacted at room temperature until the starting materials were completely converted. The reaction was quenched with a small amount of water, and dichloromethane (100 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (149 mg, yield 75%).

LC-MS (ESI) m/z 331.1 [M+H]$^+$.

Step 3: (R)-3-methyl-4-(7-(methylsulfonyl)-2-(1H-pyrrolo[2,3-b]pyridin-4-yl)-7H-pyrrolo[2,3-d]pyrimidin-4-yl)morpholine To a reaction flask, (R)-4-(2-chloro-7-(methylsulfonyl)-7H-pyrrolo[2,3-d]pyrimidin-4-yl)-3-methylmorpholine (180 mg, 0.54 mmol), 4-(4,4,5,5-tetramethyl-1,3,2-dioxaborolan-2-yl)-1H-pyrrolo[2,3-b]pyridine (264 mg, 1.08 mmol), Pd(dppf)Cl$_2$ (80 mg, 0.11 mmol) and potassium carbonate (299 mg, 2.16 mmol) were added, followed by the addition of 1,4-dioxane (17.5 mL) and water (3.5 mL). After degassing with nitrogen and under nitrogen protection, the mixture was heated to 90° C., stirred and reacted for 1 h. The reaction solution was cooled to room temperature, and dichloromethane (100 mL) was then added, followed by washing with water. After separation of the solution, the organic phase was dried over anhydrous sodium sulfate and filtered, and the filtrate was concentrated under reduced pressure and purified by preparative HPLC, to obtain Compound 17 (130 mg, yield 58%).

LC-MS (ESI) m/z 413.1 [M+H]+.

1H NMR (400 MHZ, DMSO-$d_6$) δ 11.79 (s, 1H), 8.35 (d, J=5.0 Hz, 1H), 8.04 (d, J=5.0 Hz, 1H), 7.63-7.57 (m, 2H), 7.48 (dd, J=3.2, 1.9 Hz, 1H), 7.02 (d, J=4.1 Hz, 1H), 4.92-4.80 (m, 1H), 4.62-4.50 (m, 1H), 4.04 (dd, J=11.1, 3.0 Hz, 1H), 3.85-3.71 (m, 5H), 3.60 (td, J=12.2, 3.2 Hz, 1H), 3.55-3.45 (m, 1H), 1.36 (d, J=6.8 Hz, 3H).

13C NMR (100 MHZ, DMSO-$d_6$) δ 158.60, 157.15, 153.14, 151.17, 143.19, 137.50, 128.22, 123.07, 118.76, 115.52, 105.90, 104.00, 102.74, 71.17, 67.13, 48.81, 48.79, 42.64, 15.25.

By using a coupling reaction similar to the step 3 of Example 17, and replacing 4-(4,4,5,5-tetramethyl-1,3,2-dioxaborolan-2-yl)-1/I-pyrrolo[2,3-b]pyridine with other aryl (pinacolato) borates or aryl boronic acids, Compounds 18 to 20 and Compound 27 can be synthesized from the intermediate (R)-4-(2-chloro-7-(methylsulfonyl)-7H-pyrrolo[2,3-d]pyrimidin-4-yl)-3-methylmorpholine.

Example 18: (R)-4-(2-(1H-indol-4-yl)-7-(methylsulfonyl)-7H-pyrrolo[2,3-d]pyrimidin-4-yl)-3-methylmorpholine (Compound 18)

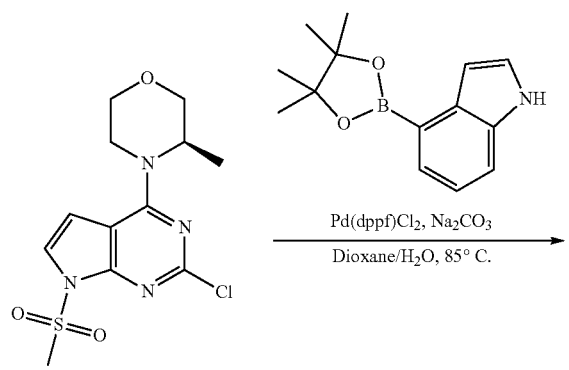

In accordance with the reaction as shown above, Compound 18 was obtained (52 mg, yield 42%).

LC-MS (ESI) m/z 412.2 [M+H]+.

1H NMR (400 MHZ, DMSO-$d_6$) δ 11.26 (s, 1H), 8.15 (d, J=7.5 Hz, 1H), 7.62-7.42 (m, 4H), 7.21 (t, J=7.7 Hz, 1H), 6.97 (d, J=4.1 Hz, 1H), 4.92-4.77 (m, 1H), 4.61-4.46 (m, 1H), 4.09-3.99 (m, 1H), 3.85-3.70 (m, 5H), 3.65-3.55 (m, 1H), 3.53-3.42 (m, 1H), 1.35 (d, J=6.7 Hz, 3H).

Example 19: (R)-3-methyl-4-(7-(methylsulfonyl)-2-(1H-pyrrolo[2,3-c]pyridin-4-yl)-7H-pyrrolo[2,3-d]pyrimidin-4-yl)morpholine (Compound 19)

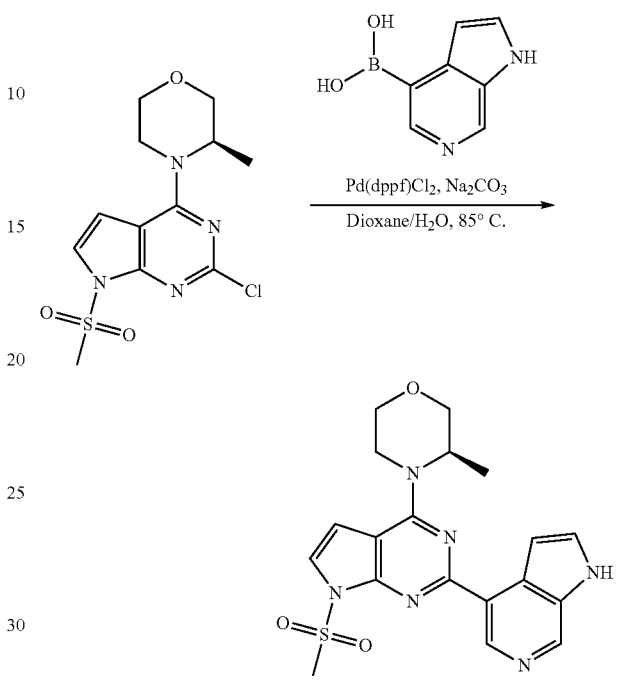

In accordance with the reaction as shown above, Compound 19 was obtained (81 mg, yield 65%).

LC-MS (ESI) m/z 413.2 [M+H]+.

1H NMR (400 MHZ, DMSO-$d_6$) δ 11.79 (s, 1H), 9.17 (s, 1H), 8.83 (s, 1H), 7.74 (t, J=2.6 Hz, 1H), 7.56-7.51 (m, 2H), 6.99 (d, J=4.1 Hz, 1H), 4.91-4.80 (m, 1H), 4.61-4.48 (m, 1H), 4.04 (dd, J=10.8, 2.9 Hz, 1H), 3.85-3.71 (m, 5H), 3.60 (td, J=11.8, 2.8 Hz, 1H), 3.55-3.45 (m, 1H), 1.36 (d, J=6.7 Hz, 3H).

Example 20: (R)-4-(2-(6-fluoro-1H-indol-4-yl)-7-(methylsulfonyl)-7H-pyrrolo[2,3-d]pyrimidin-4-yl)-3-methylmorpholine (Compound 20)

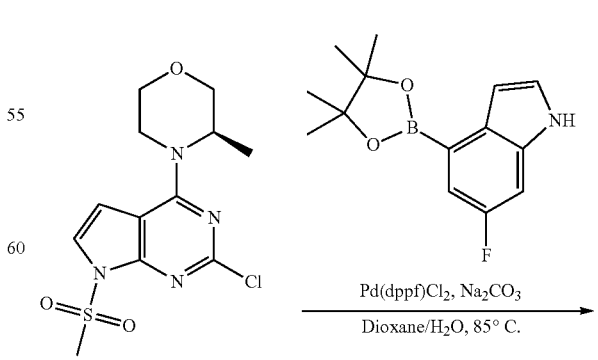

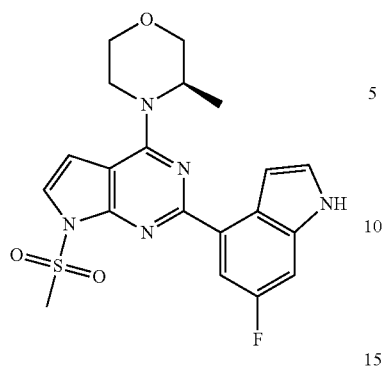

In accordance with the reaction as shown above, Compound 20 was obtained (35 mg, yield 34%).

LC-MS (ESI) m/z 430.2 [M+H]$^+$.

$^1$H NMR (400 MHZ, DMSO-d$_6$) δ 11.33 (s, 1H), 7.92 (dd, J=11.5, 2.5 Hz, 1H), 7.59 (br s, 1H), 7.55 (d, J=4.0 Hz, 1H), 7.48 (t, J=2.8 Hz, 1H), 7.32 (dd, J=9.2, 2.5 Hz, 1H), 6.99 (d, J=4.2 Hz, 1H), 4.90-4.76 (m, 1H), 4.59-4.46 (m, 1H), 4.08-4.00 (m, 1H), 3.85-3.71 (m, 5H), 3.64-3.55 (m, 1H), 3.53-3.43 (m, 1H), 1.35 (d, J=6.8 Hz, 3H).

Example 21: (R)-2-((4-(3-methylmorpholinyl)-2-(1H-pyrrolo[2,3-b]pyridin-4-yl)-7H-pyrrolo[2,3-d]pyrimidin-7-yl)sulfonyl)ethanol (Compound 21)

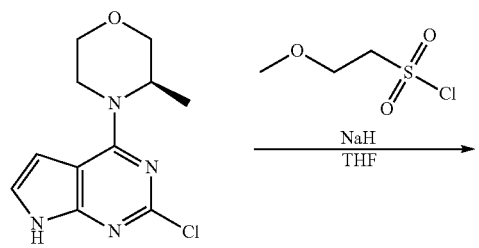

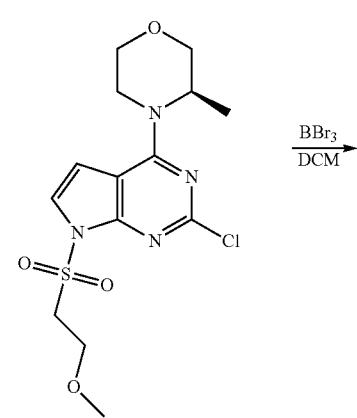

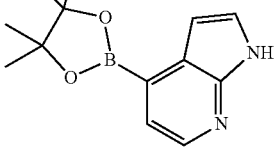

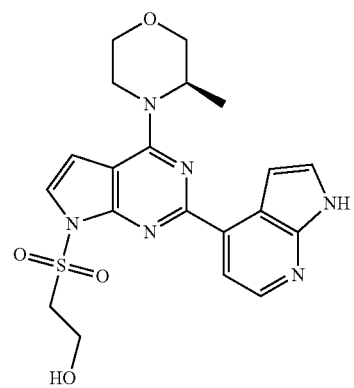

Step 1: (R)-4-(2-chloro-7-((2-methoxyethyl)sulfonyl)-7H-pyrrolo[2,3-d]pyrimidin-4-yl)-3-methylmorpholine (R)-4-(2-chloro-7H-pyrrolo[2,3-d]pyrimidin-4-yl)-3-methylmorpholine (200 mg, 0.79 mmol) was dissolved in tetrahydrofuran (5 mL), and 60% sodium hydride (63 mg, 1.58 mmol) was added slowly at room temperature. The mixture was stirred and reacted for 5 min, and 2-methoxyethylsulfonyl chloride (251 mg, 1.58 mmol) was then added dropwise. The mixture was continued to be stirred and reacted at room temperature until the starting materials were completely converted. The reaction was quenched with a small amount of water, and ethyl acetate (50 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (273 mg, yield 92%).

LC-MS (ESI) m/z 375.1 [M+H]$^+$.

Step 2: (R)-2-((2-chloro-4-(3-methylmorpholinyl)-7H-pyrrolo[2,3-d]pyrimidin-7-yl)sulfonyl)ethanol (R)-4-(2-chloro-7-((2-methoxyethyl)sulfonyl)-7H-pyrrolo[2,3-d]pyrimidin-4-yl)-3-methylmorpholine (270 mg, 0.72 mmol) was dissolved in dichloromethane (20 mL). After cooling to 0° C., boron tribromide (1.21 g, 4.83 mmol) was added, and the mixture was continued to be stirred and reacted for 1 h at room temperature. The reaction was quenched by the addition of water (20 mL), concentrated under reduced pressure to remove the dichloromethane, and then extracted with ethyl acetate (50 mL). After separation of the solution, the organic phase was dried over anhydrous sodium sulfate and filtered, and the filtrate was concentrated under reduced pressure and purified by silica gel column chromatography, to obtain the title compound (223 mg, yield 86%).

LC-MS (ESI) m/z 361.1 [M+H]⁺.

Step 3: (R)-2-((4-(3-methylmorpholinyl)-2-(1H-pyrrolo[2,3-b]pyridin-4-yl)-7H-pyrrolo[2,3-d]pyrimidin-7-yl)sulfonyl)ethanol To a reaction flask, (R)-2-((2-chloro-4-(3-methylmorpholinyl)-7H-pyrrolo[2,3-d]pyrimidin-7-yl)sulfonyl)ethanol (100 mg, 0.28 mmol), 4-(4,4,5,5-tetramethyl-1,3,2-dioxaborolan-2-yl)-1H-pyrrolo[2,3-b]pyridine (135 mg, 0.55 mmol), Pd(dppf)Cl$_2$ (40 mg, 0.055 mmol) and potassium acetate (27 mg, 0.28 mmol) were added, followed by the addition of 1,4-dioxane (4 mL). After degassing with nitrogen and under nitrogen protection, the mixture was heated to 85° C., stirred and reacted for 4 h. The reaction solution was cooled to room temperature, and ethyl acetate (50 mL) was then added, followed by washing with water (20 mL). After separation of the solution, the organic phase was dried over anhydrous sodium sulfate and filtered, and the filtrate was concentrated under reduced pressure and purified by preparative HPLC, to obtain Compound 21 (49 mg, yield 40%).

LC-MS (ESI) m/z 443.2 [M+H]⁺.

¹H NMR (400 MHZ, DMSO-d$_6$) δ 11.77 (s, 1H), 8.34 (d, J=5.0 Hz, 1H), 8.04 (d, J=5.0 Hz, 1H), 7.60 (t, J=3.0 Hz, 1H), 7.54 (d, J=4.1 Hz, 2H), 7.51 (dd, J=3.4, 2.0 Hz, 1H), 6.99 (d, J=4.1 Hz, 1H), 4.94-4.80 (m, 2H), 4.62-4.48 (m, 1H), 4.13 (t, J=5.9 Hz, 2H), 4.04 (dd, J=11.3, 3.5 Hz, 1H), 3.81 (d, J=11.5 Hz, 1H), 3.78-3.68 (m, 3H), 3.60 (td, J=11.6, 2.7 Hz, 1H), 3.55-3.45 (m, 1H), 1.36 (d, J=6.7 Hz, 3H).

Example 22: (R)-3-methyl-4-(9-(methylsulfonyl)-2-(1H-pyrrolo[2,3-b]pyridin-4-yl)-9H-purin-6-yl)morpholine (Compound 22)

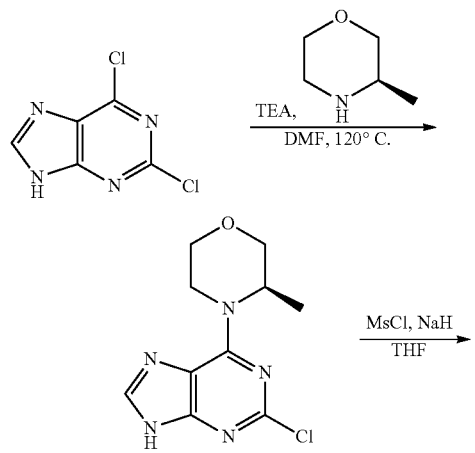

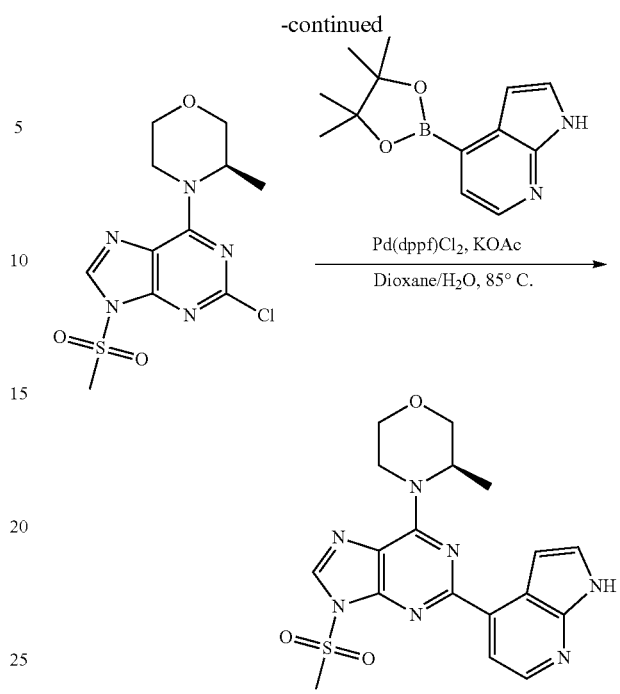

Step 1: (R)-4-(2-chloro-9H-purin-6-yl)-3-methylmorpholine 2,6-dichloro-9H-purine (1.0 g, 5.3 mmol) was dissolved in N,N-dimethylformamide (15 mL), and (R)-3-methylmorpholine (2.1 g, 21 mmol) and triethylamine (5.4 g, 53 mmol) were added slowly. Subsequently, the mixture was heated to 120° C., stirred and reacted for 1 h. The reaction solution was cooled and concentrated under reduced pressure. The residue was purified by silica gel column chromatography, to obtain the title compound (1.2 g, yield 89%).

LC-MS (ESI) m/z 254.1 [M+H]⁺.

Step 2: (R)-4-(2-chloro-9-(methylsulfonyl)-9H-purin-6-yl)-3-methylmorpholine (R)-4-(2-chloro-9H-purin-6-yl)-3-methylmorpholine (800 mg, 3.15 mmol) was dissolved in tetrahydrofuran (5 mL), and 60% sodium hydride (505 mg, 12.6 mmol) was added slowly at room temperature. The mixture was stirred and reacted for 5 min, and methanesulfonyl chloride (1.44 g, 12.6 mmol) was then added dropwise. The mixture was continued to be stirred and reacted for 3 h at room temperature. The reaction was quenched with a small amount of water, and ethyl acetate (50 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (785 mg, yield 75%).

LC-MS (ESI) m/z 332.1 [M+H]⁺.

Step 3: (R)-3-methyl-4-(9-(methylsulfonyl)-2-(1H-pyrrolo[2,3-b]pyridin-4-yl)-9H-purin-6-yl)morpholine To a reaction flask, (R)-4-(2-chloro-9-(methylsulfonyl)-9H-purin-6-yl)-3-methylmorpholine (100 mg, 0.30 mmol), 4-(4,4,5,5-tetramethyl-1,3,2-dioxaborolan-2-yl)-1H-pyrrolo

[2,3-b]pyridine (183 mg, 0.75 mmol), Pd(dppf)Cl₂ (44 mg, 0.060 mmol) and potassium acetate (118 mg, 1.20 mmol) were added, followed by the addition of 1,4-dioxane (4 mL) and water (0.25 mL). After degassing with nitrogen and under nitrogen protection, the mixture was heated to 85° C., stirred and reacted for 1 h. The reaction solution was cooled to room temperature, and ethyl acetate (20 mL) was then added, followed by washing with water. After separation of the solution, the organic phase was dried over anhydrous sodium sulfate and filtered, and the filtrate was concentrated under reduced pressure and purified by preparative HPLC, to obtain Compound 22 (31 mg, yield 25%).

LC-MS (ESI) m/z 414.2 [M+H]⁺.

¹H NMR (400 MHZ, DMSO-d₆) δ 11.83 (s, 1H), 8.55 (s, 1H), 8.36 (d, J=5.0 Hz, 1H), 8.04 (d, J=5.0 Hz, 1H), 7.63 (t, J=3.0 Hz, 1H), 7.39 (dd, J=3.4, 2.0 Hz, 1H), 5.56-5.38 (br, 1H), 5.18-5.06 (br, 1H), 4.05 (d, J=8.6 Hz, 1H), 3.88 (s, 3H), 3.84 (d, J=11.2 Hz, 1H), 3.75 (dd, J=11.5, 3.0 Hz, 1H), 3.65-3.47 (m, 2H), 1.40 (d, J=6.8 Hz, 3H).

Example 23: (R)-3-methyl-4-(1-(methylsulfonyl)-6-(1H-pyrrolo[2,3-b]pyridin-4-yl)-1H-pyrazolo[3,4-d]pyrimidin-4-yl)morpholine (Compound 23)

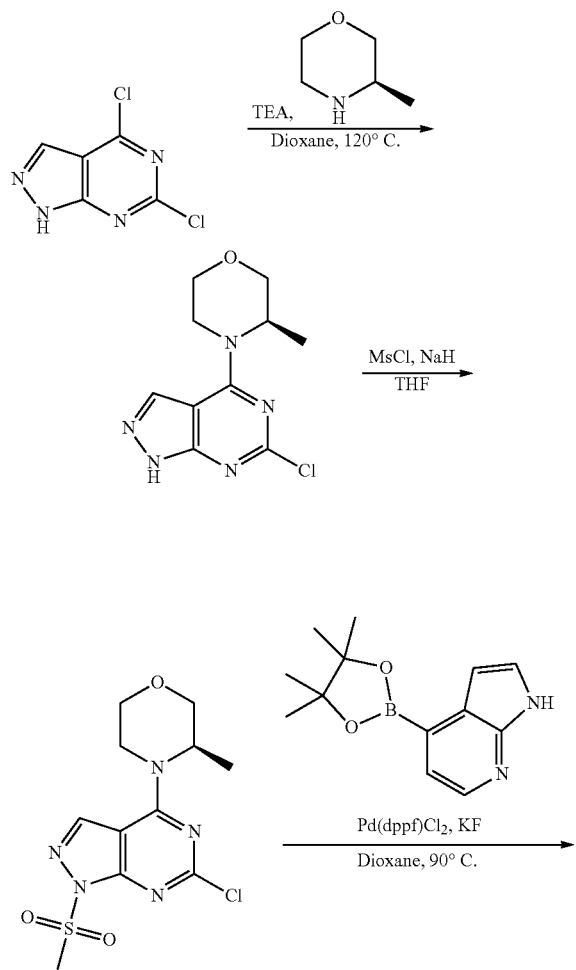

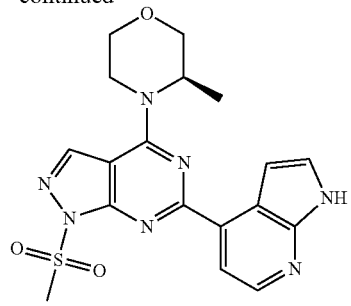

Step 1: (R)-4-(6-chloro-1H-pyrazolo[3,4-d]pyrimidin-4-yl)-3-methylmorpholine 4,6-dichloro-1H-pyrazolo[3,4-d]pyrimidine (0.40 g, 2.1 mmol) was dissolved in 1,4-dioxane (2 mL), and (R)-3-methylmorpholine (0.86 g, 8.5 mmol) and triethylamine (2.14 g, 21.1 mmol) were added slowly. Subsequently, the mixture was heated to 120° C., stirred and reacted for 2 h. The reaction solution was cooled and concentrated under reduced pressure. The residue was purified by silica gel column chromatography, to obtain the title compound (0.50 g, yield 93%). LC-MS (ESI) m/z 254.1 [M+H]⁺.

Step 2: (R)-4-(6-chloro-1-(methylsulfonyl)-1H-pyrazolo[3,4-d]pyrimidin-4-yl)-3-methylmorpholine (R)-4-(6-chloro-1H-pyrazolo[3,4-d]pyrimidin-4-yl)-3-methylmorpholine (650 mg, 2.56 mmol) was dissolved in tetrahydrofuran (4 mL), and 60% sodium hydride (205 mg, 5.13 mmol) was added slowly at room temperature. The mixture was stirred and reacted for 5 min, and methanesulfonyl chloride (587 mg, 5.12 mmol) was then added dropwise. The mixture was continued to be stirred and reacted for 1 h at room temperature. The reaction was quenched with a small amount of water, and ethyl acetate (30 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (765 mg, yield 90%).

LC-MS (ESI) m/z 332.1 [M+H]⁺.

Step 3: (R)-3-methyl-4-(1-(methylsulfonyl)-6-(1H-pyrrolo[2,3-b]pyridin-4-yl)-1H-pyrazolo[3,4-d]pyrimidin-4-yl)morpholine To a reaction flask, (R)-4-(6-chloro-1-(methylsulfonyl)-1H-pyrazolo[3,4-d]pyrimidin-4-yl)-3-methylmorpholine (100 mg, 0.30 mmol), 4-(4,4,5,5-tetramethyl-1,3,2-dioxaborolan-2-yl)-1H-pyrrolo[2,3-b]pyridine (147 mg, 0.60 mmol), Pd(dppf)Cl₂ (44 mg, 0.060 mmol) and potassium fluoride (70 mg, 1.20 mmol) were added, followed by the addition of 1,4-dioxane (5 mL). After degassing with nitrogen and under nitrogen protection, the mixture was heated to 90° C., stirred and reacted for 1 h. The reaction solution was cooled to room temperature, and ethyl acetate (20 mL) was then added, followed by washing with water. After separation of the solution, the organic phase was dried over anhydrous sodium sulfate and filtered, and the filtrate was concentrated under reduced pressure and purified by preparative HPLC, to obtain Compound 23 (19 mg, yield 15%). LC-MS (ESI) m/z 414.1 [M+H]$^+$.

$^1$H NMR (400 MHZ, DMSO-d$_6$) δ 11.84 (s, 1H), 8.70 (s, 1H), 8.37 (d, J=5.0 Hz, 1H), 8.10 (d, J=5.0 Hz, 1H), 7.66-7.62 (m, 1H), 7.55-7.51 (m, 1H), 4.72-7.42 (br, 2H), 4.07 (d, J=8.4 Hz, 1H), 3.84 (d, J=12.0 Hz, 1H), 3.77 (d, J=12.0 Hz, 1H), 3.70 (s, 3H), 3.67-3.48 (m, 2H), 1.40 (d, J=6.7 Hz, 3H).

Example 24: (R)-3-methyl-4-(3-(methylsulfonyl)-5-(1H-pyrrolo[2,3-b]pyridin-4-yl)-3H-imidazo[4,5-b]pyridin-7-yl)morpholine (Compound 24)

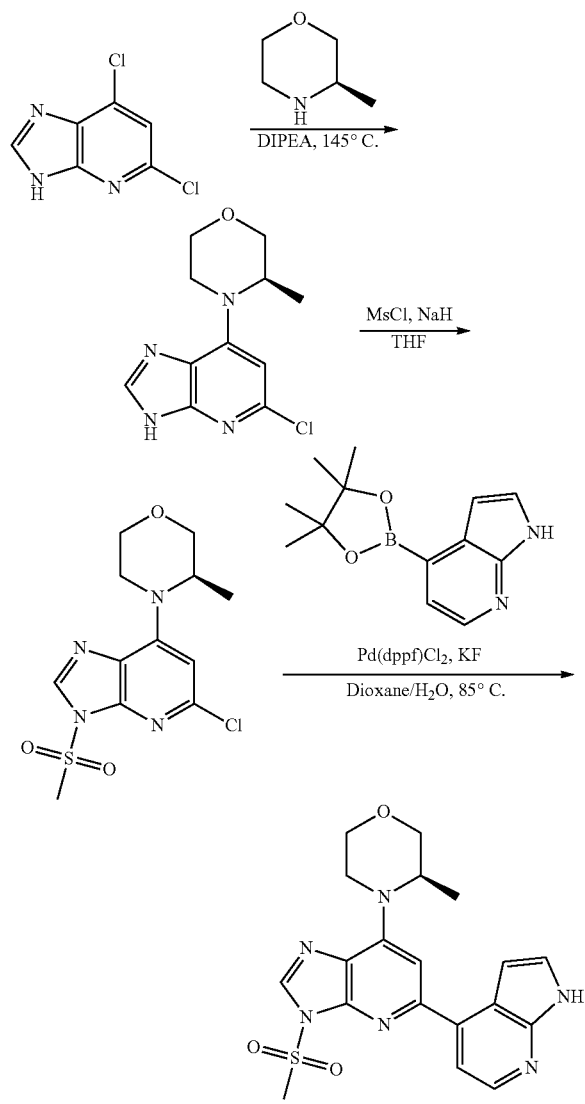

Step 1: (R)-4-(5-chloro-3H-imidazo[4,5-b]pyridin-7-yl)-3-methylmorpholine 5,7-dichloro-3H-imidazo[4,5-b]pyridine (500 mg, 2.66 mmol) was dissolved in N,N-diisopropylethylamine (9 mL, 51.7 mmol), and (R)-3-methylmorpholine (3 mL, 26.4 mmol) was added at room temperature. The mixture was heated to 145° C., stirred and reacted for 8 days. The reaction solution was cooled to room temperature, and ethyl acetate (50 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (605 mg, yield 90%).

LC-MS (ESI) m/z 253.1 [M+H]$^+$.

Step 2: (R)-4-(5-chloro-3-(methylsulfonyl)-3H-imidazo[4,5-b]pyridin-7-yl)-3-methylmorpholine (R)-4-(5-chloro-3H-imidazo[4,5-b]pyridin-7-yl)-3-methylmorpholine (350 mg, 1.39 mmol) was dissolved in tetrahydrofuran (20 mL), and 60% sodium hydride (180 mg, 4.50 mmol) was added slowly at room temperature. The mixture was stirred and reacted for 5 min, and methanesulfonyl chloride (518 mg, 4.52 mmol) was then added dropwise. The mixture was continued to be stirred and reacted at room temperature until the starting materials were completely converted. The reaction was quenched with a small amount of water, and dichloromethane (100 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (357 mg, yield 78%).

LC-MS (ESI) m/z 331.1 [M+H]$^+$.

Step 3: (R)-3-methyl-4-(3-(methylsulfonyl)-5-(1H-pyrrolo[2,3-b]pyridin-4-yl)-3H-imidazo[4,5-b]pyridin-7-yl)morpholine To a reaction flask, (R)-4-(5-chloro-3-(methylsulfonyl)-3H-imidazo[4,5-b]pyridin-7-yl)-3-methylmorpholine (20 mg, 0.06 mmol), 4-(4,4,5,5-tetramethyl-1,3,2-dioxaborolan-2-yl)-1H-pyrrolo[2,3-b]pyridine (30 mg, 0.12 mmol), Pd(dppf)Cl$_2$ (9 mg, 0.012 mmol) and potassium fluoride (20 mg, 0.344 mmol) were added, followed by the addition of 1,4-dioxane (2 mL) and water (0.1 mL). After degassing with nitrogen and under nitrogen protection, the mixture was heated to 85° C., stirred and reacted for 2 h. The reaction solution was cooled to room temperature, and dichloromethane (50 mL) was then added, followed by washing with water. After separation of the solution, the organic phase was dried over anhydrous sodium sulfate and filtered, and the filtrate was concentrated under reduced pressure and purified by preparative HPLC, to obtain Compound 24 (11 mg, yield 44%).

LC-MS (ESI) m/z 413.1 [M+H]$^+$.

$^1$H NMR (400 MHZ, DMSO-d$_6$) δ 11.79 (s, 1H), 8.51 (s, 1H), 8.32 (d, J=5.0 Hz, 1H), 7.66 (d, J=5.0 Hz, 1H), 7.58 (dd, J=3.4, 2.5 Hz, 1H), 7.30 (s, 1H), 7.17 (dd, J=3.4, 1.9 Hz, 1H), 5.25-5.14 (m, 1H), 4.48-4.33 (m, 1H), 4.02 (dd, J=11.5, 3.5 Hz, 1H), 3.87 (s, 3H), 3.79 (d, J=2.2 Hz, 2H), 3.64 (td, J=11.7, 2.7 Hz, 1H), 3.45 (td, J=12.7, 3.6 Hz, 1H), 1.26 (d, J=6.7 Hz, 3H).

Example 25: (R)-3-methyl-4-(1-(methylsulfonyl)-6-(1H-pyrrolo[2,3-c]pyridin-4-yl)-1H-imidazo[4,5-c]pyridin-4-yl)morpholine (Compound 25)

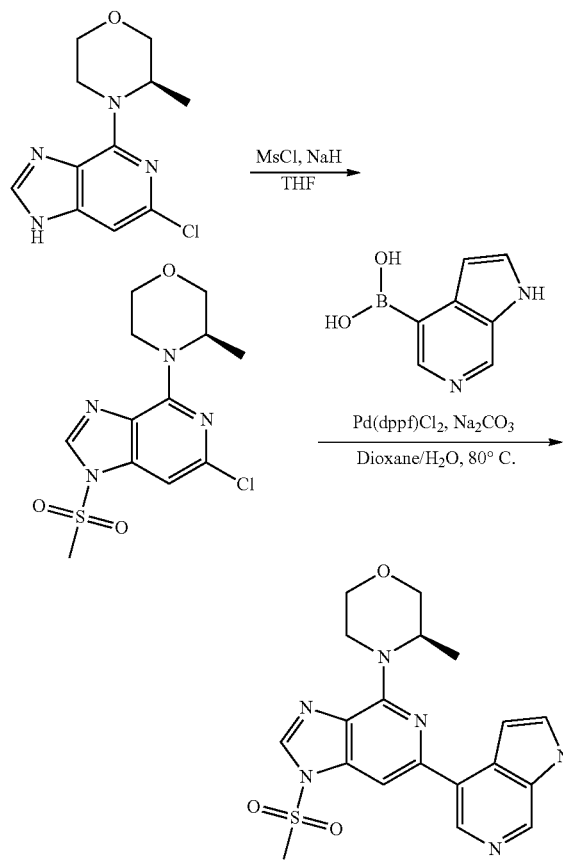

(R)-4-(6-chloro-1H-imidazo[4,5-c]pyridin-4-yl)-3-methylmorpholine was prepared according to the synthetic route described in literature (*ACS Med. Chem. Lett.* 2015, 6, 42-46).

Step 1 (R)-4-(6-chloro-1-(methylsulfonyl)-1H-imidazo[4,5-c]pyridin-4-yl)-3-methylmorpholine (R)-4-(6-chloro-1H-imidazo[4,5-c]pyridin-4-yl)-3-methylmorpholine (150 mg, 0.59 mmol) was dissolved in tetrahydrofuran (10 mL), and 60% sodium hydride (48 mg, 1.20 mmol) was added slowly at room temperature. The mixture was stirred and reacted for 5 min, and methanesulfonyl chloride (136 mg, 1.19 mmol) was then added dropwise. The mixture was continued to be stirred and reacted at room temperature until the starting materials were completely converted. The reaction was quenched with a small amount of water, and ethyl acetate (200 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (150 mg, yield 76%).

LC-MS (ESI) m/z 331.1 [M+H]$^+$.

Step 2 (R)-3-methyl-4-(1-(methylsulfonyl)-6-(1H-pyrrolo[2,3-c]pyridin-4-yl)-1H-imidazo[4,5-c]pyridin-4-yl)morpholine To a reaction flask, (R)-4-(6-chloro-1-(methylsulfonyl)-1H-imidazo[4,5-c]pyridin-4-yl)-3-methylmorpholine (50 mg, 0.15 mmol), (1H-pyrrolo[2,3-c]pyridin-4-yl)boric acid (49 mg, 0.30 mmol), Pd(dppf)Cl$_2$ (11 mg, 0.015 mmol) and sodium carbonate (32 mg, 0.30 mmol) were added, followed by the addition of 1,4-dioxane (1.5 mL) and water (0.5 mL). After degassing with nitrogen and under nitrogen protection, the mixture was heated to 80° C., stirred and reacted for 2 h. The reaction solution was cooled to room temperature, and ethyl acetate (50 mL) was then added, followed by washing with water. After separation of the solution, the organic phase was dried over anhydrous sodium sulfate and filtered, and the filtrate was concentrated under reduced pressure and purified by preparative HPLC, to obtain Compound 25 (20 mg, yield 32%).

LC-MS (ESI) m/z 413.1 [M+H]$^+$.

$^1$H NMR (400 MHZ, DMSO-d$_6$) δ 11.79 (s, 1H), 8.78 (s, 1H), 8.66 (s, 1H), 8.49 (s, 1H), 7.73 (t, J=2.7 Hz, 1H), 7.64 (s, 1H), 6.94-6.89 (m, 1H), 5.48-5.38 (m, 1H), 4.89 (d, J=13.4 Hz, 1H), 4.01 (dd, J=11.1, 2.7 Hz, 1H), 3.83-3.72 (m, 5H), 3.60 (td, J=11.7, 2.6 Hz, 1H), 3.47-3.38 (m, 1H), 1.31 (d, J=6.7 Hz, 3H).

Example 26: (R)-3-methyl-4-(1-(methylsulfonyl)-6-(1H-pyrrolo[2,3-b]pyridin-4-yl)-1H-pyrrolo[3,2-c]pyridin-4-yl)morpholine (Compound 26)

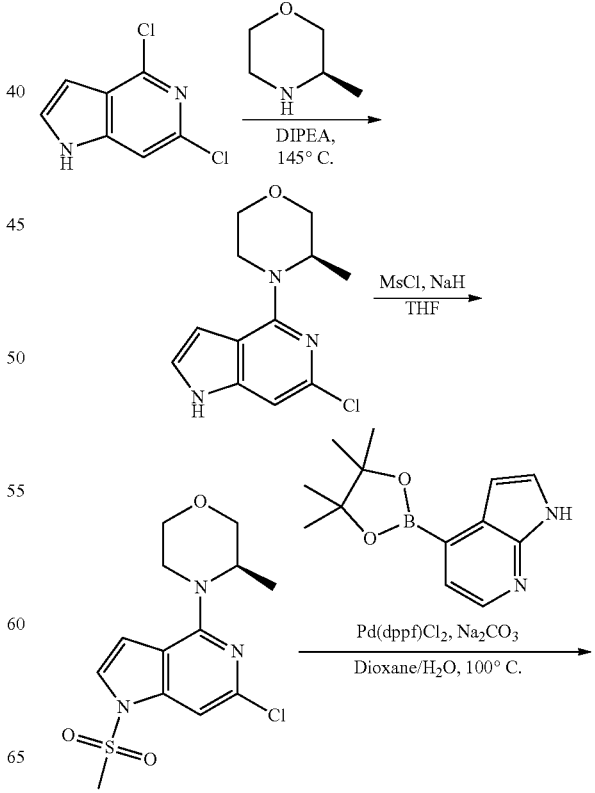

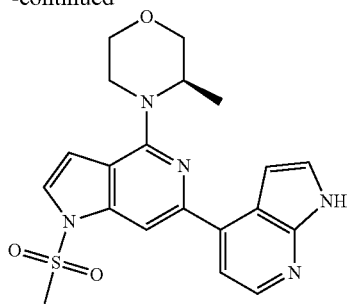

Step 1: (R)-4-(6-chloro-1H-pyrrolo[3,2-c]pyridin-4-yl)-3-methylmorpholine 4,6-dichloro-1H-pyrrolo[3,2-c]pyridine (500 mg, 2.67 mmol) was dissolved in N,N-diisopropyl ethylamine (9 mL, 51.7 mmol), and (R)-3-methylmorpholine (3 mL, 26.4 mmol) was added at room temperature. The mixture was heated to 145° C., stirred and reacted for 8 days. The reaction solution was cooled to room temperature, and ethyl acetate (50 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (603 mg, yield 90%).

LC-MS (ESI) m/z 252.1 [M+H]$^+$.

Step 2: (R)-4-(6-chloro-1-(methylsulfonyl)-1H-pyrrolo[3,2-c]pyridin-4-yl)-3-methylmorpholine (R)-4-(6-chloro-1H-pyrrolo[3,2-c]pyridin-4-yl)-3-methylmorpholine (550 mg, 2.19 mmol) was dissolved in tetrahydrofuran (20 mL), and 60% sodium hydride (367 mg, 9.18 mmol) was added slowly at room temperature. The mixture was stirred and reacted for 5 min, and methanesulfonyl chloride (740 mg, 6.46 mmol) was then added dropwise. The mixture was continued to be stirred and reacted at room temperature until the starting materials were completely converted. The reaction was quenched with a small amount of water, and dichloromethane (100 mL) was then added, followed by washing with water. After separation of the solution, the organic phase was dried over anhydrous sodium sulfate and filtered, and the filtrate was concentrated under reduced pressure and purified by silica gel column chromatography, to obtain the title compound (591 mg, yield 82%).

LC-MS (ESI) m/z 330.1 [M+H]$^+$.

Step 3: (R)-3-methyl-4-(1-(methylsulfonyl)-6-(1H-pyrrolo[2,3-b]pyridin-4-yl)-1H-pyrrolo[3,2-c]pyridin-4-yl)morpholine To a reaction flask, (R)-4-(6-chloro-1-(methylsulfonyl)-1H-pyrrolo[3,2-c]pyridin-4-yl)-3-methylmorpholine (20 mg, 0.06 mmol), 4-(4,4,5,5-tetramethyl-1,3,2-dioxaborolan-2-yl)-1H-pyrrolo[2,3-b]pyridine (30 mg, 0.12 mmol), Pd(dppf)Cl$_2$ (9 mg, 0.012 mmol) and sodium carbonate (20 mg, 0.19 mmol) were added, followed by the addition of 1,4-dioxane (1 mL) and water (0.2 mL). After degassing with nitrogen and under nitrogen protection, the mixture was heated to 100° C., stirred and reacted for 2 h. The reaction solution was cooled to room temperature, and dichloromethane (20 mL) was then added, followed by washing with water. After separation of the solution, the organic phase was dried over anhydrous sodium sulfate and filtered, and the filtrate was concentrated under reduced pressure and purified by preparative HPLC, to obtain Compound 26 (10 mg, yield 40%).

LC-MS (ESI) m/z 412.2 [M+H]$^+$.

$^1$H NMR (400 MHZ, DMSO-d$_6$) δ 11.79 (s, 1H), 8.31 (d, J=5.0 Hz, 1H), 7.93 (s, 1H), 7.64-7.61 (m, 2H), 7.59 (t, J=3.0 Hz, 1H), 7.08 (d, J=3.8 Hz, 1H), 6.90 (dd, J=3.5, 1.9 Hz, 1H), 4.66-4.58 (m, 1H), 4.08 (d, J=12.8 Hz, 1H), 4.02-3.96 (m, 1H), 3.80 (dd, J=11.4, 2.9 Hz, 1H), 3.73 (d, J=10.8 Hz, 1H), 3.63 (td, J=11.3, 2.6 Hz, 1H), 3.58 (s, 3H), 3.49 (td, J=12.5, 3.4 Hz, 1H), 1.26 (d, J=6.7 Hz, 3H).

Example 27: (R)-4-(2-(1H-benzo[d]imidazol-2-yl)-7-(methylsulfonyl)-7H-pyrrolo[2,3-d]pyrimidin-4-yl)-3-methylmorpholine (Compound 27)

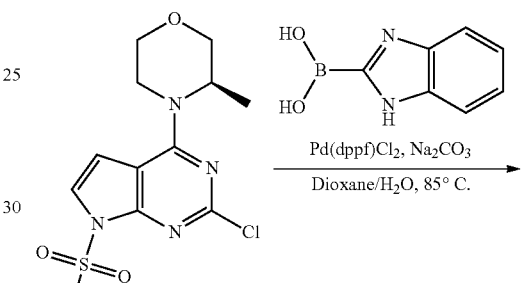

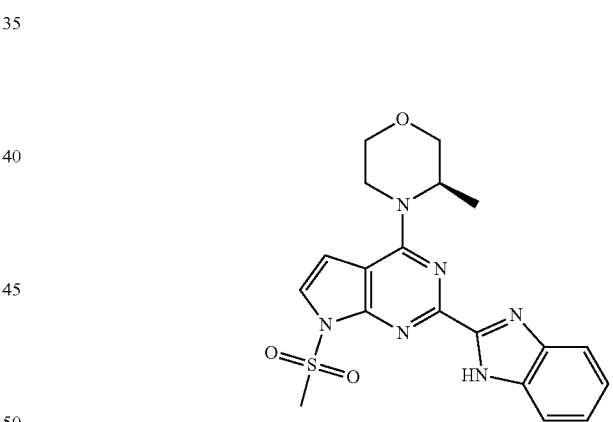

In accordance with the reaction as shown above (similar to the Step 3 of Example 17), Compound 27 (30 mg, yield 35%) was obtained.

LC-MS (ESI) m/z 413.2 [M+H]$^+$.

$^1$H NMR (400 MHZ, DMSO-d$_6$) δ 9.19 (s, 1H), 8.65 (d, J=8.0 Hz, 1H), 7.78 (d, J=7.9 Hz, 1H), 7.52 (d, J=4.1 Hz, 1H), 7.45-7.39 (m, 1H), 7.38-7.32 (m, 1H), 7.03 (d, J=4.1 Hz, 1H), 4.91-4.75 (br, 1H), 4.65-4.49 (br, 1H), 4.02 (dd, J=11.2, 3.0 Hz, 1H), 3.80 (d, J=11.5 Hz, 1H), 3.77-3.70 (m, 4H), 3.59 (td, J=11.6, 2.5 Hz, 1H), 3.54-3.45 (m, 1H), 1.37 (d, J=6.8 Hz, 3H).

Example 28: (R)—N-methyl-1-(4-(3-methylmorpholinyl)-7-(methylsulfonyl)-7H-pyrrolo[2,3-d]pyrimidin-2-yl)-1H-benzo[d]imidazol-2-amine (Compound 28)

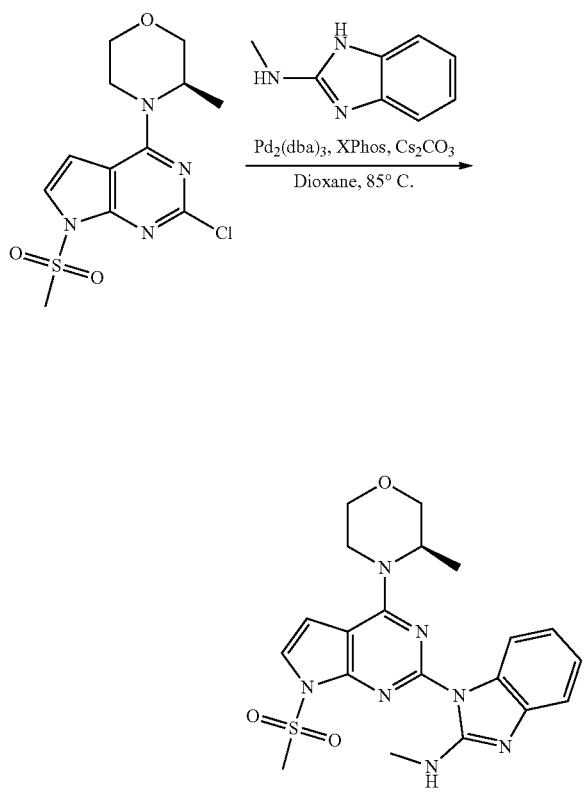

To a reaction flask, (R)-4-(2-chloro-7-(methylsulfonyl)-7H-pyrrolo[2,3-d]pyrimidin-4-yl)-3-methylmorpholine (100 mg, 0.30 mmol), N-methyl-1H-benzo[d]imidazol-2-amine (89 mg, 0.60 mmol), tris(dibenzylideneacetone)dipalladium (28 mg, 0.031 mmol), 2-dicyclohexylphosphino-2',4',6'-triisopropylbiphenyl (29 mg, 0.061 mmol) and cesium carbonate (296 mg, 0.91 mmol) were added, followed by the addition of 1,4-dioxane (2 mL). After degassing with nitrogen and under nitrogen protection, the mixture was heated to 85° C., stirred and reacted for 1 h. The reaction solution was cooled to room temperature, and dichloromethane (80 mL) was then added, followed by washing with water. After separation of the solution, the organic phase was dried over anhydrous sodium sulfate and filtered, and the filtrate was concentrated under reduced pressure and purified by preparative HPLC, to obtain Compound 28 (28 mg, yield 21%).

LC-MS (ESI) m/z 442.2 [M+H]$^+$.

$^1$H NMR (400 MHZ, DMSO-d$_6$) δ 8.56 (q, J=4.5 Hz, 1H), 8.24 (d, J=7.9 Hz, 1H), 7.51 (d, J=4.1 Hz, 1H), 7.28 (d, J=7.7 Hz, 1H), 7.14-7.08 (m, 1H), 7.05 (d, J=4.1 Hz, 1H), 7.04-6.98 (m, 1H), 4.78-4.68 (m, 1H), 4.41-4.31 (m, 1H), 4.10-4.01 (m, 1H), 3.86-3.72 (m, 2H), 3.65 (s, 3H), 3.63-3.51 (m, 2H), 3.08 (d, J=4.8 Hz, 3H), 1.39 (d, J=6.8 Hz, 3H).

Example 29: (R)-3-methyl-4-(2-(6-methyl-1H-indol-4-yl)-7-(methylsulfonyl)-7H-pyrrolo[2,3-d]pyrimidin-4-yl)morpholine (Compound 29)

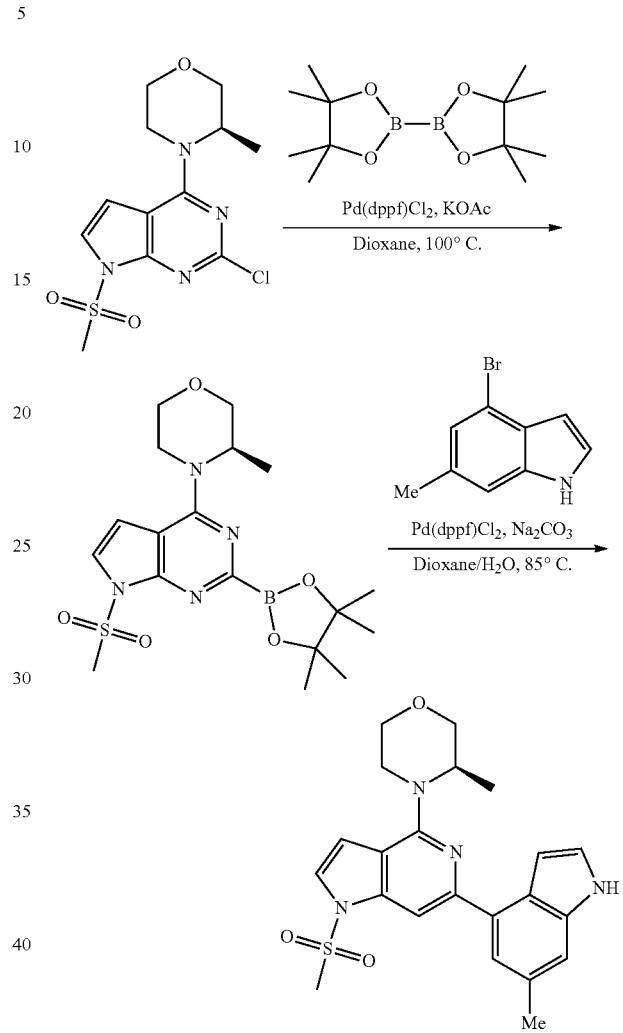

Step 1: (R)-3-methyl-4-(7-(methylsulfonyl)-2-(4,4,5,5-tetramethyl-1,3,2-dioxaborolan-2-yl)-7H-pyrrolo[2,3-d]pyrimidin-4-yl)morpholine To a reaction flask, (R)-4-(2-chloro-7-(methylsulfonyl)-7H-pyrrolo[2,3-d]pyrimidin-4-yl)-3-methylmorpholine (200 mg, 0.60 mmol), bis(pinacolato) borate (384 mg, 1.51 mmol), Pd(dppf)Cl$_2$ (88 mg, 0.12 mmol) and potassium acetate (245 mg, 2.50 mmol) were added, followed by the addition of 1,4-dioxane (2 mL). After degassing with nitrogen and under nitrogen protection, the mixture was heated to 100° C., stirred and reacted for 2 h. The reaction solution was cooled to room temperature, and ethyl acetate (80 mL) was then added. The resultant mixture was filtered over diatomite, and the filtrate was concentrated under reduced pressure, to obtain a crude product of the title compound (252 mg), which was used directly for the next step without further purification.

Step 2: (R)-3-methyl-4-(2-(6-methyl-1H-indol-4-yl)-7-(methylsulfonyl)-7H-pyrrolo[2,3-d]pyrimidin-4-yl)morpholine To a reaction flask, (R)-3-methyl-4-(7-(methylsulfonyl)-2-(4,4,5,5-tetramethyl-1,3,2-dioxaborolan-2-yl)-7H-pyrrolo[2,3-d]pyrimidin-4-yl)morpholine (126 mg of crude product, counted as 0.30 mmol), 4-bromo-6-methyl-1H-indole (25 mg, 0.12 mmol), Pd(dppf)Cl₂ (17.3 mg, 0.024 mmol) and sodium carbonate (50 mg, 0.47 mmol) were added, followed by the addition of 1,4-dioxane (5 mL) and water (1 mL). After degassing with nitrogen and under nitrogen protection, the mixture was heated to 85° C., stirred and reacted for 2 h. The reaction solution was cooled to room temperature, and dichloromethane (40 mL) was then added, followed by washing with water. After separation of the solution, the organic phase was dried over anhydrous sodium sulfate and filtered, and the filtrate was concentrated under reduced pressure and purified by preparative HPLC, to obtain Compound 29 (26 mg, yield 51%).

LC-MS (ESI) m/z 426.2 [M+H]⁺.

¹H NMR (400 MHZ, DMSO-d₆) δ 11.08 (s, 1H), 7.96 (d, J=1.5 Hz, 1H), 7.51 (d, J=4.1 Hz, 1H), 7.50-7.47 (m, 1H), 7.36 (t, J=2.7 Hz, 1H), 7.32 (d, J=1.5 Hz, 1H), 6.96 (d, J=4.1 Hz, 1H), 4.88-4.78 (m, 1H), 4.60-4.50 (m, 1H), 4.05 (dd, J=11.2, 3.5 Hz, 1H), 3.86-3.71 (m, 5H), 3.60 (td, J=11.7, 2.9 Hz, 1H), 3.52-3.41 (m, 1H), 2.48 (s, 3H), 1.35 (d, J=6.8 Hz, 3H).

Example 30: (R)-4-(4-(3-methylmorpholinyl)-7-(methylsulfonyl)-7H-pyrrolo[2,3-d]pyrimidin-2-yl)-1H-indol-6-carbonitrile (Compound 30)

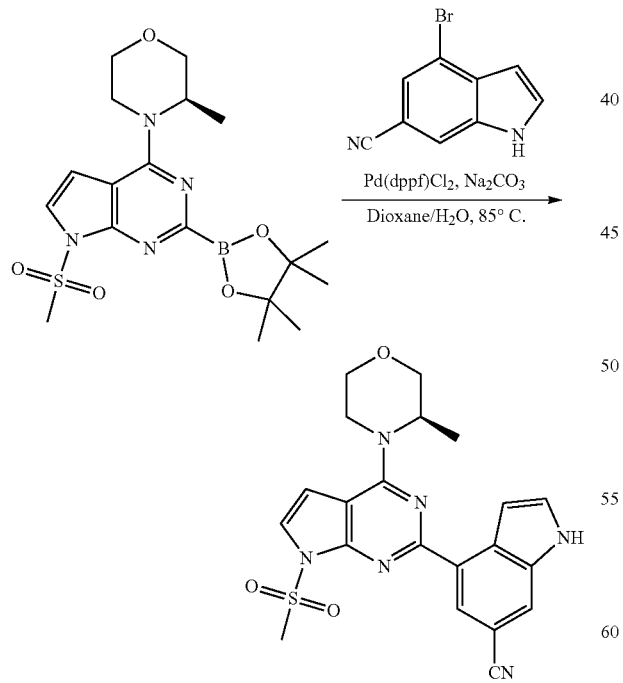

In accordance with the reaction as shown above (similar to the Step 2 of Example 29), Compound 30 (30 mg, yield 46%) was obtained.

LC-MS (ESI) m/z 437.1 [M+H]⁺.

¹H NMR (400 MHZ, DMSO-d₆) δ 11.87 (s, 1H), 8.36 (d, J=1.5 Hz, 1H), 8.02 (t, J=1.2 Hz, 1H), 7.80 (t, J=2.8 Hz, 1H), 7.75-7.71 (m, 1H), 7.57 (d, J=4.1 Hz, 1H), 7.01 (d, J=4.2 Hz, 1H), 4.90-4.78 (m, 1H), 4.62-4.48 (m, 1H), 4.11-4.01 (m, 1H), 3.86-3.70 (m, 5H), 3.60 (td, J=11.5, 11.1, 2.5 Hz, 1H), 3.54-3.44 (m, 1H), 1.36 (d, J=6.7 Hz, 3H).

Example 31: (R)-4-(2-(6-chloro-1H-indol-4-yl)-7-(methylsulfonyl)-7H-pyrrolo[2,3-d]pyrimidin-4-yl)-3-methylmorpholine (Compound 31)

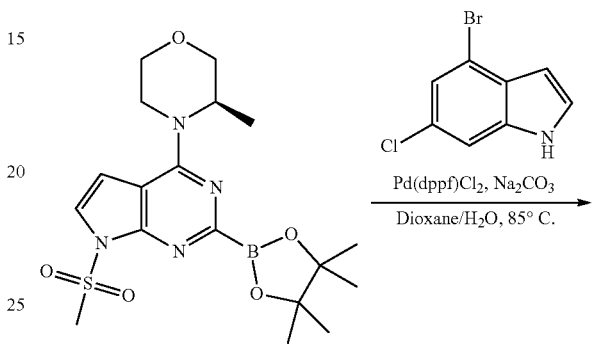

In accordance with the reaction as shown above (similar to the Step 2 of Example 29), Compound 31 (18 mg, yield 27%) was obtained.

LC-MS (ESI) m/z 446.1 [M+H]⁺.

¹H NMR (400 MHZ, DMSO-d₆) δ 11.41 (s, 1H), 8.08 (d, J=2.0 Hz, 1H), 7.59 (t, J=2.5 Hz, 1H), 7.57 (d, J=1.6 Hz, 1H), 7.55 (d, J=4.1 Hz, 1H), 7.52 (t, J=2.8 Hz, 1H), 6.99 (d, J=4.1 Hz, 1H), 4.88-4.76 (m, 1H), 4.58-4.46 (m, 1H), 4.05 (dd, J=11.0, 2.8 Hz, 1H), 3.86-3.70 (m, 5H), 3.60 (td, J=11.8, 2.4 Hz, 1H), 3.54-3.43 (m, 1H), 1.36 (d, J=6.8 Hz, 3H).

Example 32: (R)-4-(2-(6-methoxy-1H-indol-4-yl)-7-(methylsulfonyl)-7H-pyrrolo[2,3-d]pyrimidin-4-yl)-3-methylmorpholine (Compound 32)

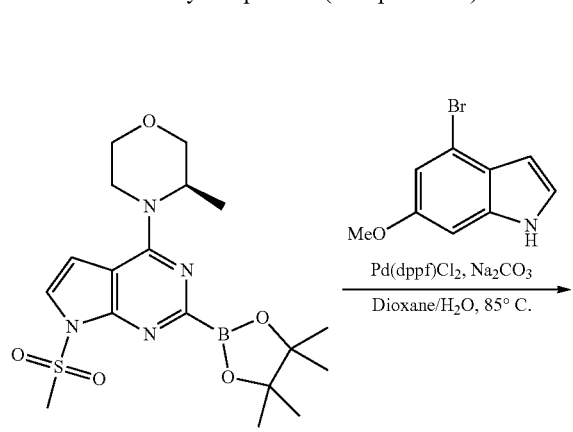

In accordance with the reaction as shown above (similar to the Step 2 of Example 29), Compound 32 (30 mg, yield 25%) was obtained.

LC-MS (ESI) m/z 442.2 [M+H]+.

1H NMR (400 MHZ, DMSO-d6) δ 11.04 (s, 1H), 7.78 (d, J=2.4 Hz, 1H), 7.52 (d, J=4.1 Hz, 1H), 7.49-7.45 (m, 1H), 7.31 (t, J=2.7 Hz, 1H), 7.06 (dd, J=2.3, 0.9 Hz, 1H), 6.97 (d, J=4.2 Hz, 1H), 4.89-4.77 (m, 1H), 4.57-4.45 (m, 1H), 4.04 (dd, J=11.0, 3.0 Hz, 1H), 3.83 (s, 3H), 3.81-3.71 (m, 5H), 3.60 (td, J=11.6, 2.8 Hz, 1H), 3.53-3.43 (m, 1H), 1.35 (d, J=6.7 Hz, 3H).

Example 33: (R)-4-(7-(ethylsulfonyl)-2-(1H-pyrrolo[2,3-b]pyridin-4-yl)-7H-pyrrolo[2,3-d]pyrimidin-4-yl)-3-methylmorpholine (Compound 33)

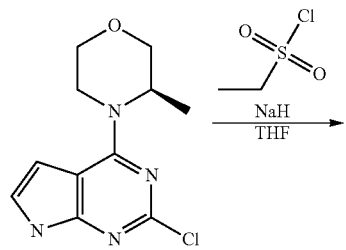

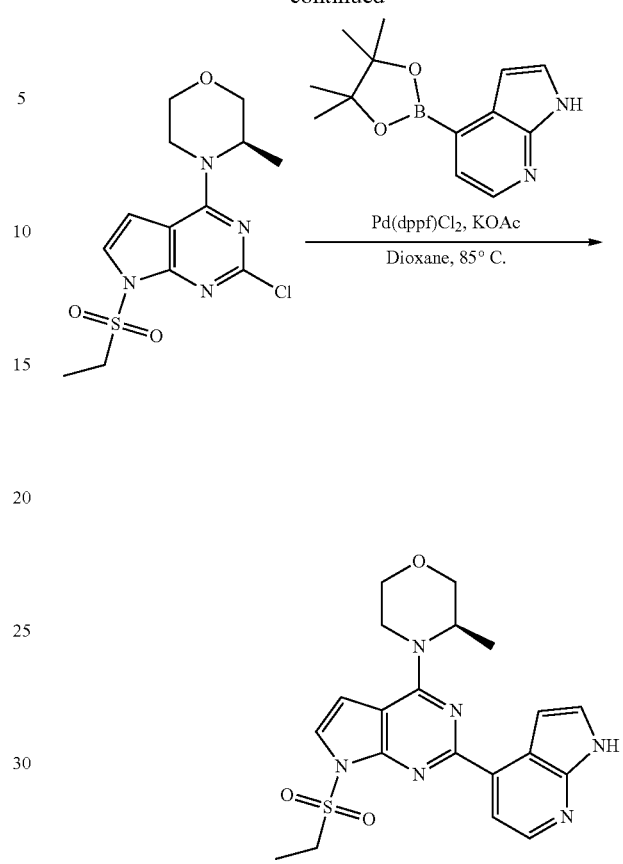

In accordance with the reaction as shown above (similar to the steps 2 and 3 of Example 17), Compound 33 (195 mg, the yields of the two steps were 92% and 79%, respectively) was obtained.

LC-MS (ESI) m/z 427.2 [M+H]+.

1H NMR (400 MHZ, DMSO-d6) δ 11.78 (s, 1H), 8.34 (d, J=5.0 Hz, 1H), 8.04 (d, J=5.0 Hz, 1H), 7.63-7.57 (m, 2H), 7.50 (dd, J=3.4, 2.0 Hz, 1H), 7.03 (d, J=4.1 Hz, 1H), 4.92-4.80 (m, 1H), 4.62-4.50 (m, 1H), 4.09-3.95 (m, 3H), 3.85-3.71 (m, 2H), 3.61 (td, J=11.6, 2.7 Hz, 1H), 3.55-3.45 (m, 1H), 1.37 (d, J=6.8 Hz, 3H), 1.12 (t, J=7.3 Hz, 3H).

Example 34: (R)—N,N-dimethyl-4-(3-methylmorpholinyl)-2-(1H-pyrrolo[2,3-b]pyridin-4-yl)-7H-pyrrolo[2,3-d]pyrimidine-7-sulfamide (Compound 34)

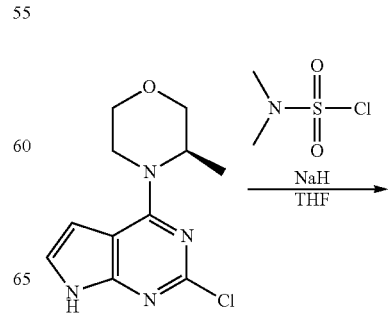

63

-continued

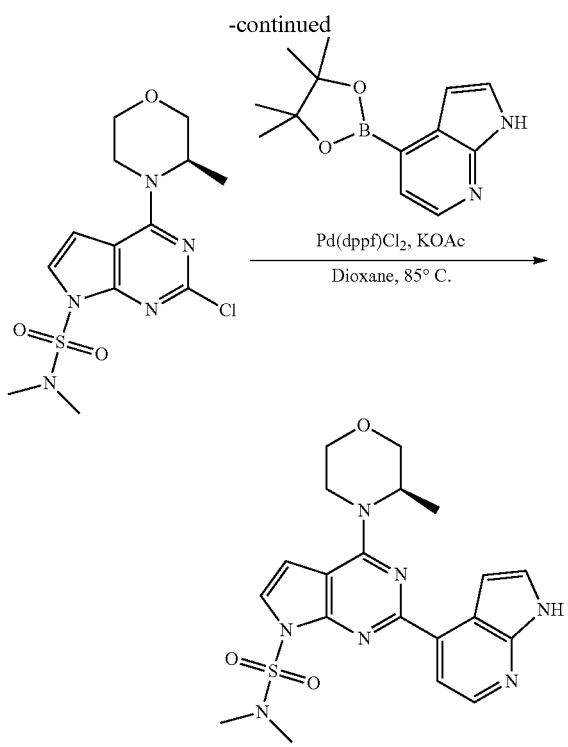

Pd(dppf)Cl₂, KOAc
Dioxane, 85° C.

64

In accordance with the reaction as shown above (similar to the steps 2 and 3 of Example 17), Compound 34 (40 mg, the yields of the two steps were 13% and 32%, respectively) was obtained.

LC-MS (ESI) m/z 442.2 [M+H]⁺.

$^1$H NMR (400 MHZ, DMSO-d$_6$) δ 11.74 (s, 1H), 8.33 (d, J=5.0 Hz, 1H), 7.99 (d, J=5.0 Hz, 1H), 7.62-7.56 (m, 2H), 7.53 (dd, J=3.4, 2.0 Hz, 1H), 6.96 (d, J=4.1 Hz, 1H), 4.90-4.80 (m, 1H), 4.60-4.50 (m, 1H), 4.08-4.00 (m, 1H), 3.84-3.71 (m, 2H), 3.65-3.56 (m, 1H), 3.55-3.45 (m, 1H), 2.92 (s, 6H), 1.37 (d, J=6.7 Hz, 3H).

Comparative Examples

10 Compounds 1' to 7' having the structures shown in Table 1 were synthesized as Comparative Example compounds, respectively.

TABLE 1

| Compound of Comparative Examples | Compound structure | Characterization data |
|---|---|---|
| Compound 1' | (morpholine-substituted imidazo-pyridine linked to 7-azaindole, N-methyl) | LC-MS (ESI) m/z 349.2 [M + H]⁺.<br>$^1$H NMR (400 MHz, DMSO-d$_6$) δ 11.69 (s, 1H), 8.73 (s, 1H), 8.65 (s, 1H), 8.12 (s, 1H), 7.70-7.65 (m, 1H), 7.49 (s, 1H), 7.05 (d, J = 2.9 Hz, 1H), 5.58-5.48 (m, 1H), 4.88 (d, J = 14.0 Hz, 1H), 3.99 (dd, J = 11.1, 2.7 Hz, 1H), 3.86 (s, 3H), 3.76 (d, J = 2.2 Hz, 2H), 3.60 (td, J = 11.8, 2.7 Hz, 1H), 3.42-3.33 (m, 1H), 1.26 (d, J = 6.7 Hz, 3H). |
| Compound 2' | (morpholine-substituted pyrrolo-pyridine linked to 7-azaindole, N-methyl) | LC-MS (ESI) m/z 348.2 [M + H]⁺.<br>$^1$H NMR (400 MHz, DMSO-d$_6$) δ 11.70 (s, 1H), 8.29 (d, J = 5.0 Hz, 1H), 7.63 (d, J = 5.0 Hz, 1H), 7.53 (t, J = 2.7 Hz, 1H), 7.40 (d, J = 3.5 Hz, 1H), 7.14 (t, J = 2.5 Hz, 1H), 7.08 (s, 1H), 6.61 (d, J = 3.6 Hz, 1H), 4.42-4.34 (m, 1H), 3.98 (d, J = 12.3 Hz, 1H), 3.89-3.82 (m, 4H), 3.73 (d, J = 11.1 Hz, 1H), 3.67 (td, J = 11.1, 3.2 Hz, 1H), 3.55-3.41 (m, 2H), 1.12 (d, J = 6.6 Hz, 3H). |

TABLE 1-continued

Comparative Example compounds

| Compound of Comparative Examples | Compound structure | Characterization data |
| --- | --- | --- |
| Compound 3' | 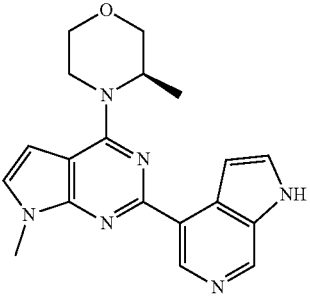 [SMILES: C[C@@H]1COCCN1c1nc(-c2cncc3[nH]ccc23)nc2c1ccn2C] | LC-MS (ESI) m/z 349.2 [M + H]$^+$.<br>$^1$H NMR (400 MHz, DMSO-d$_6$) δ 11.70 (s, 1H), 9.16 (s, 1H), 8.78 (s, 1H), 7.69 (t, J = 2.6 Hz, 1H), 7.50-7.45 (m, 1H), 7.32 (d, J = 3.5 Hz, 1H), 6.67 (d, J = 3.6 Hz, 1H), 4.91-4.80 (m, 1H), 4.53 (d, J = 13.1 Hz, 1H), 4.03 (dd, J = 11.4, 3.6 Hz, 1H), 3.86 (s, 3H), 3.80 (d, J = 11.5 Hz, 1H), 3.74 (dd, J = 11.4, 2.8 Hz, 1H), 3.60 (td, J = 11.8, 2.8 Hz, 1H), 3.51-3.42 (m, 1H), 1.33 (d, J = 6.7 Hz, 3H). |
| Compound 4' | 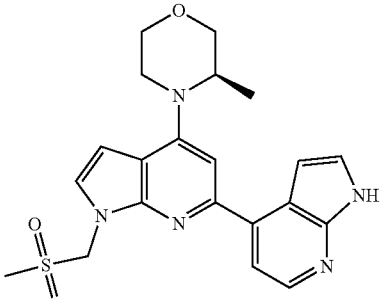 | LC-MS (ESI) m/z 426.2 [M + H]$^+$.<br>$^1$H NMR (400 MHz, DMSO-d$_6$) δ 11.74 (s, 1H), 8.30 (d, J = 5.0 Hz, 1H), 7.65 (d, J = 5.1 Hz, 1H), 7.55 (t, J = 3.0 Hz, 1H), 7.50 (d, J = 3.8 Hz, 1H), 7.15 (s, 1H), 7.10 (dd, J = 3.5, 1.9 Hz, 1H), 6.81 (d, J = 3.8 Hz, 1H), 5.81 (d, J = 2.3 Hz, 2H), 4.43-4.35 (m, 1H), 4.00 (dd, J = 11.6, 3.5 Hz, 1H), 3.85 (dd, J = 11.5, 2.8 Hz, 1H), 3.74 (d, J = 11.3 Hz, 1H), 3.71-3.57 (m, 2H), 3.49 (td, J = 12.0, 3.3 Hz, 1H), 3.00 (s, 3H), 1.18 (d, J = 6.6 Hz, 3H). |
| Compound 5' | 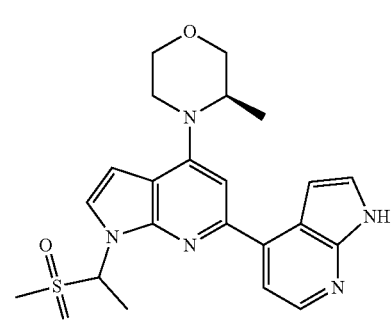 | LC-MS (ESI) m/z 440.2 [M + H]$^+$.<br>$^1$H NMR (400 MHz, DMSO-d$_6$) δ 11.76 (s, 1H), 8.30 (d, J = 5.0 Hz, 1H), 7.68-7.65 (m, 1H), 7.60-7.55 (m, 2H), 7.16 & 7.15 (s, 1H), 7.06 & 7.04 (dd, J = 3.4, 1.9 Hz, 1H), 6.85 (d, J = 3.9 Hz, 1H), 6.36-6.28 (m, 1H), 4.45-4.35 (m, 1H), 4.03-3.96 (m, 1H), 3.88-3.80 (m, 1H), 3.74 (d, J = 11.2 Hz, 1H), 3.70-3.57 (m, 2H), 3.55-3.46 (m, 1H), 2.79 & 2.73 (s, 3H), 1.93 & 1.92 (d, J = 7.2 Hz, 3H), 1.19 & 1.17 (d, J = 6.7 Hz, 3H). |
| Compound 6' | 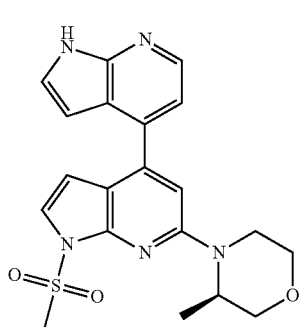 [SMILES: C[C@@H]1COCCN1c1cc(-c2ccnc3[nH]ccc23)c2ccn(S(C)(=O)=O)c2n1] | LC-MS (ESI) m/z 412.1 [M + H]$^+$.<br>$^1$H NMR (400 MHz, DMSO-d$_6$) δ 11.92 (s, 1H), 8.36 (d, J = 4.9 Hz, 1H), 7.59 (dd, J = 3.5, 2.5 Hz, 1H), 7.40 (d, J = 4.0 Hz, 1H), 7.26 (d, J = 4.9 Hz, 1H), 6.98 (s, 1H), 6.46 (d, J = 4.0 Hz, 1H), 6.42 (dd, J = 3.5, 1.9 Hz, 1H), 4.47-4.39 (m, 1H), 3.99 (dd, J = 12.0, 3.3 Hz, 2H), 3.78 (d, J = 12.1 Hz, 1H), 3.75 (s, 3H), 3.69 (dd, J = 11.4, 2.8 Hz, 1H), 3.60-3.50 (m, 1H), 3.19 (td, J = 13.1, 4.0 Hz, 1H), 1.22 (d, J = 6.6 Hz, 3H). |

TABLE 1-continued

Comparative Example compounds

| Compound of Comparative Examples | Compound structure | Characterization data |
|---|---|---|
| Compound 7' | 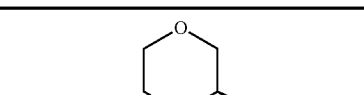 | LC-MS (ESI) m/z 441.2 [M + H]$^+$.<br>$^1$H NMR (400 MHz, Chloroform-d) δ 9.06 (br s, 1H), 8.93 (s, 1H), 8.62 & 8.61 (s, 1H), 8.07 & 8.05 (s, 1H), 7.73 (s, 1H), 7.40 (s, 1H), 7.15 (s, 1H), 5.78-5.70 (m, 1H), 5.57-5.49 (m, 1H), 4.97 (t, J = 14.2 Hz, 1H), 4.05 (d, J = 11.1 Hz, 1H), 3.88 (dd, J = 11.4, 3.0 Hz, 1H), 3.82 (d, J = 11.3 Hz, 1H), 3.71 (t, J = 11.6 Hz, 1H), 3.60-3.48 (m, 1H), 2.81 & 2.80 (s, 3H), 2.12 & 2.11 (d, J = 7.0 Hz, 3H), 1.40 (d, J = 6.7 Hz, 3H). |

Compound 1' was a known compound and prepared according to the synthetic route described in the literature (*ACS Med. Chem. Lett.* 2015, 6, 42-46).

Compound 2' was prepared according to the following synthetic route:

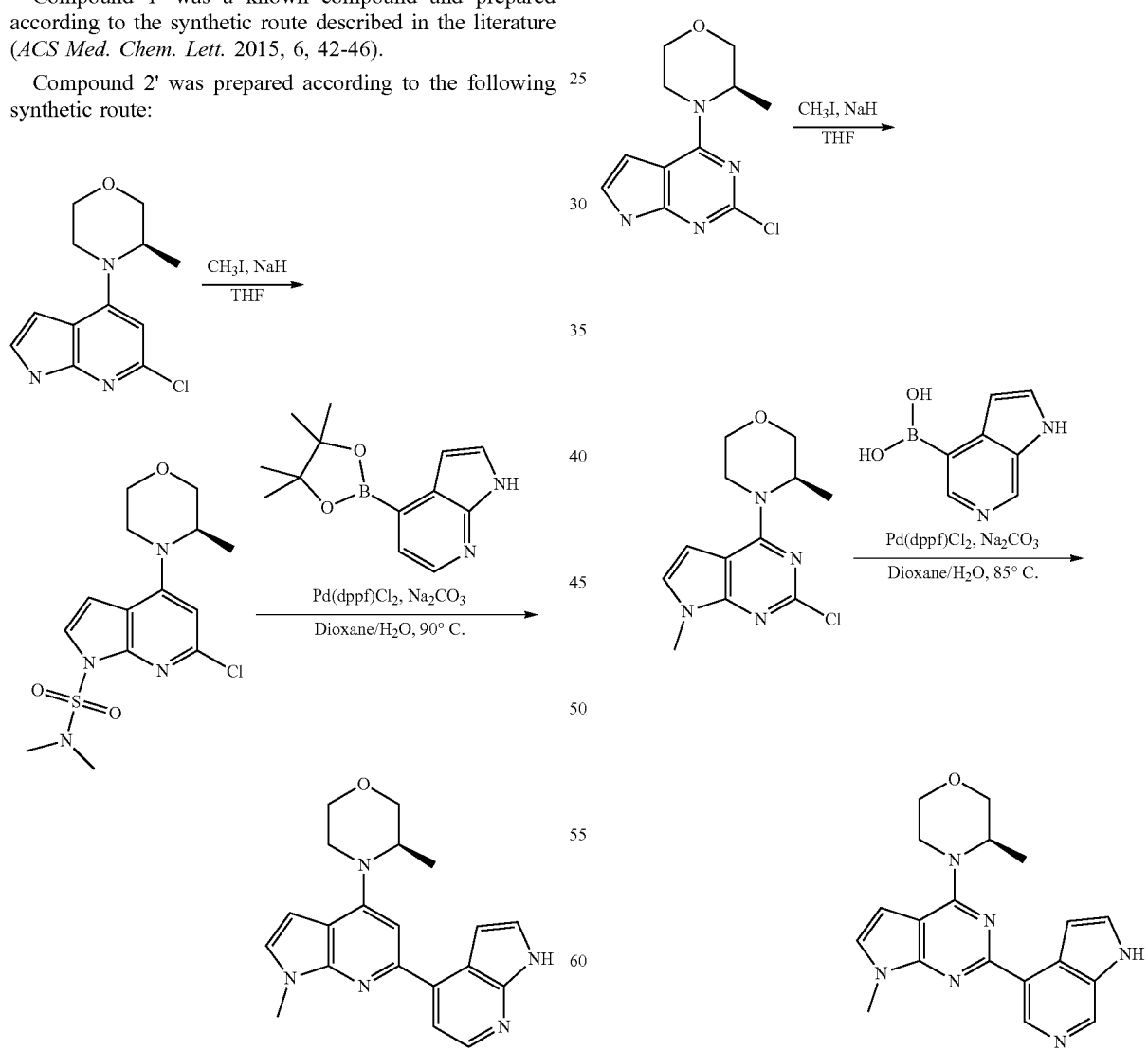

Compound 3' was prepared according to the following synthetic route:

Compound 4' was prepared according to the following synthetic route:

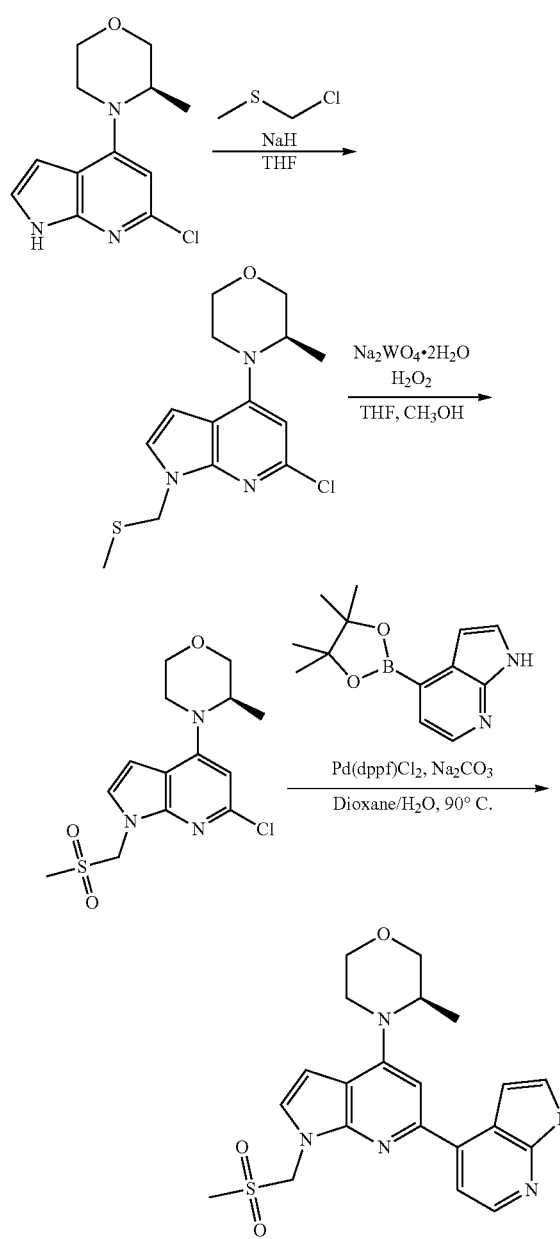
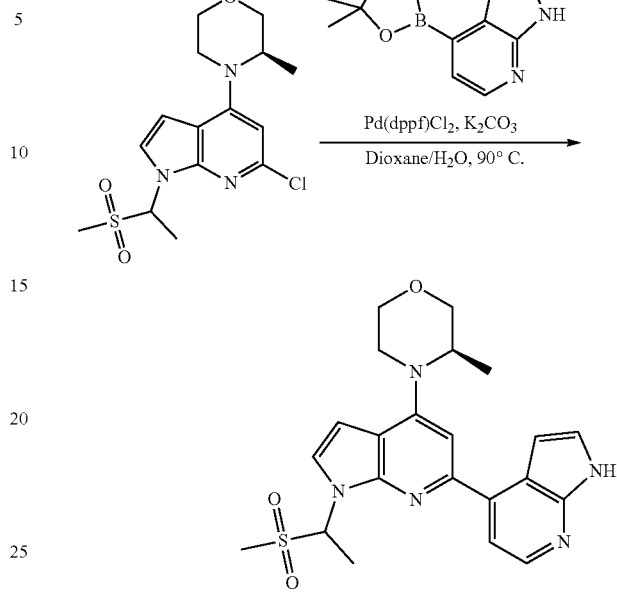
Compound 6' was prepared according to the following synthetic route:
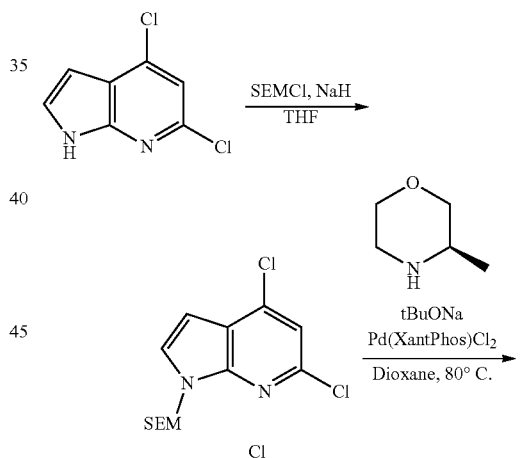
Compound 5' was prepared according to the following synthetic route:
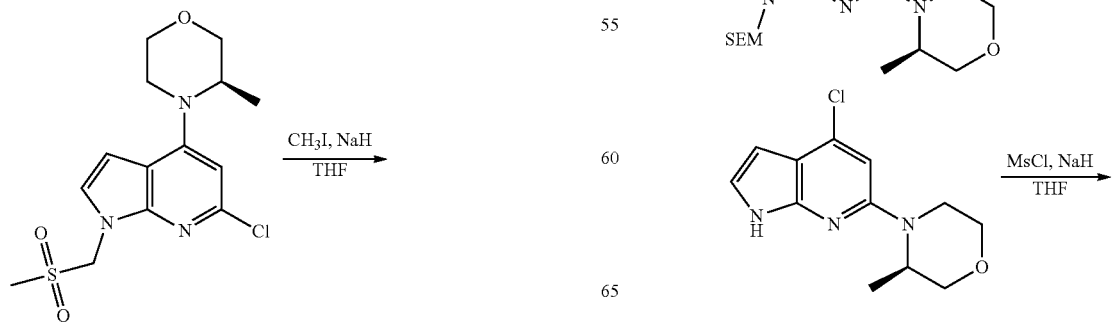

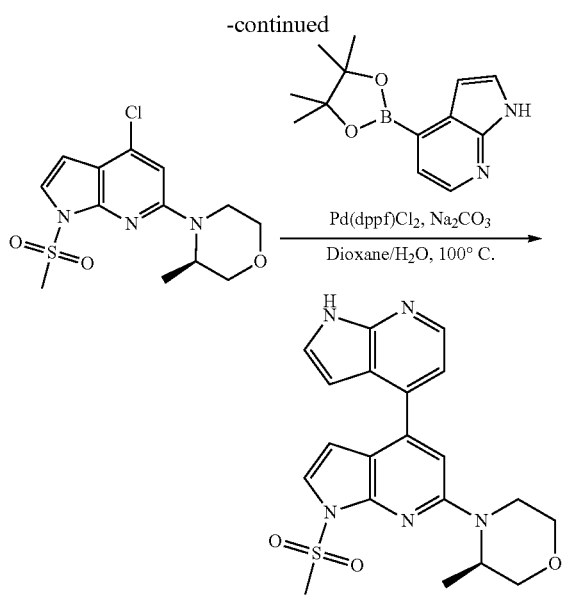

Compound 7' was a known compound and prepared according to the synthetic route described in the literature (*ACS Med. Chem. Lett.* 2015, 6, 42-46). Compound 7' was a mixture of two diastereoisomers (in a ratio of about 1:1). The following two diastereoisomers were obtained by HPLC chiral resolution and characterized by NMR as follows:

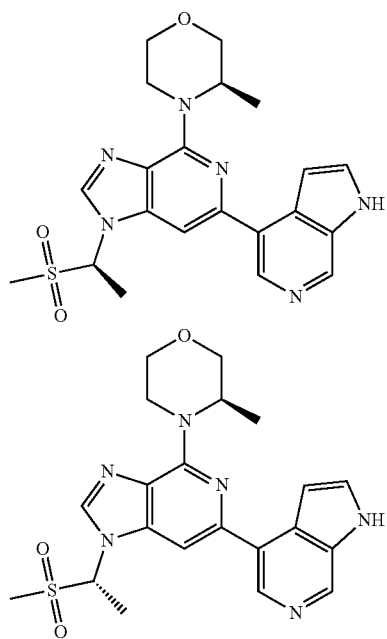

Diastereoisomer 1: $^1$H NMR (400 MHZ, Chloroform-d) δ 8.84 (s, 1H), 8.80 (br s, 1H), 8.72 (s, 1H), 8.04 (s, 1H), 7.50 (d, J=3.1 Hz, 1H), 7.23 (s, 1H), 7.09 (d, J=3.1 Hz, 1H), 5.62-5.55 (m, 1H), 5.51 (q, J=7.1 Hz, 1H), 5.05 (d, J=13.4 Hz, 1H), 4.07 (dd, J=11.2, 3.4 Hz, 1H), 3.91 (dd, J=11.4, 3.1 Hz, 1H), 3.84 (d, J=11.3 Hz, 1H), 3.74 (td, J=11.7, 2.8 Hz, 1H), 3.59 (td, J=12.9, 3.5 Hz, 1H), 2.72 (s, 3H), 2.11 (d, J=7.1 Hz, 3H), 1.44 (d, J=6.8 Hz, 3H).

Diastereoisomer 2: $^1$H NMR (400 MHZ, Chloroform-d) δ 8.97 (br s, 1H), 8.84 (s, 1H), 8.72 (s, 1H), 8.05 (s, 1H), 7.50 (d, J=3.2 Hz, 1H), 7.23 (s, 1H), 7.09 (d, J=3.1 Hz, 1H), 5.64-5.56 (m, 1H), 5.52 (q, J=7.0 Hz, 1H), 5.02 (d, J=13.5 Hz, 1H), 4.07 (dd, J=11.2, 3.5 Hz, 1H), 3.91 (dd, J=11.4, 3.1 Hz, 1H), 3.84 (d, J=11.3 Hz, 1H), 3.75 (td, J=11.8, 2.8 Hz, 1H), 3.58 (td, J=12.9, 3.6 Hz, 1H), 2.69 (s, 3H), 2.11 (d, J=7.1 Hz, 3H), 1.44 (d, J=6.8 Hz, 3H).

Biological Test Examples

In conventional biological tests as well as the following test examples, the meanings of the following abbreviations are shown below:

| Abbreviation | Designation |
|---|---|
| ATP | Adenosine triphosphate |
| HEPES | 4-hydroxyethylpiperazine ethanesulfonic acid |
| Brij-35 | Polyoxyethylene lauryl ether |
| EDTA | Ethylenediamine tetraacetic acid |
| DMSO | Dimethyl sulfoxide |

Test Example 1: In Vitro ATR Kinase Inhibition Assay

Experimental method: The inhibitory activity of the compounds on ATR kinase in vitro was determined by Mobility Shift Assay at an ATP concentration of $K_m$ using Caliper EZ Reader as a mobility shift assaying technology based on microfluidic chip technology.

Experimental materials and instruments: ATR kinase (Eurofins, Cat. No. 14-953); 5-FAM-AK-17 (Gill Biochemistry, Cat. No. 524315); 1× kinase buffer (50 mM HEPES pH 7.5, 0.0015% Brij-35, 1 M $MnCl_2$); termination buffer (100 mM HEPES pH 7.5, 0.015% Brij-35, 0.2% Coating Reagent #3, 50 mM EDTA); Caliper EZ Reader (Caliper Life Sciences).

Experimental procedure: (1) The compounds to be tested were dissolved in DMSO and serially diluted 4× for a total of 10 concentrations; (2) 0.06 μL of the compounds at different concentrations were pipetted into a 384-well plate using an Echo pipetting system; (3) a 2× kinase solution with a concentration of 10 nM ATR kinase was prepared from the ATR kinase and the 1× kinase buffer; and a 2× substrate solution with a concentration of 6 μM 5-FAM-AK-17 and 4 μM ATP was prepared from 5-FAM-AK-17, ATP and the 1× kinase buffer; (4) 10 μL of the 2× kinase solution was added into the 384-well plate and incubated for 10 min at room temperature; 10 μL of the 2× substrate solution was then added and incubated for 4 h at 28° C.; (5) 30 μL of the termination buffer was added to terminate the reaction, and then the 384-well plate was put into the Caliper EZ Reader to read the conversion rate data.

Data processing: (1) The inhibition rate was calculated from the conversion rate: "max" is the conversion rate of a DMSO blank control group (with no compound added), "min" is the conversion rate of an enzyme-free control group (with no ATR kinase added), "conversion" is the conversion rate of a compound test group, and the inhibition rate=(max−conversion)/(max−min)×100%; (2) with curve fitting using the Excel add-on XLFit (version no. 5.4.0.8), the $IC_{50}$ value was calculated.

Experimental results: the inhibitory effects of the compounds of the Examples on the ATR kinase are shown in Table 2.

TABLE 2

| Compound of Examples of the present invention | ATR $IC_{50}$ (nM) |
|---|---|
| 1 | 5.5 |
| 2 | 4.2 |
| 3 | 10 |
| 4 | 208 |
| 5 | 534 |
| 6 | 188 |
| 7 | 3.2 |
| 8 | 78 |
| 9 | 311 |
| 10 | 843 |
| 11 | 823 |
| 12 | 130 |
| 13 | 196 |
| 14 | 35 |
| 15 | 12 |
| 16 | 17 |
| 17 | 1.6 |
| 18 | 2.3 |
| 19 | 1.6 |
| 20 | 1.6 |
| 21 | 4.4 |
| 22 | 10 |
| 23 | 15 |
| 24 | 15 |
| 25 | 9.4 |
| 26 | 8.6 |
| 27 | 1.6 |
| 28 | 4.1 |
| 29 | 2.3 |
| 30 | 9.4 |
| 31 | 4.4 |
| 32 | 5.3 |
| 33 | 5.0 |
| 34 | 7.1 |

From the above results, it can be seen that the compounds of the Examples have good inhibitory effect on ATR kinase.

The inhibitory effects of Compound 1' to Compound 6' of the Comparative Examples on ATR kinase are shown in Table 3.

TABLE 3

| Compound of Comparative Examples | ATR $IC_{50}$ (nM) |
|---|---|
| Compound 1' | 56 |
| Compound 2' | 63 |
| Compound 3' | 31 |
| Compound 4' | 20 |
| Compound 5' | 15 |
| Compound 6' | 268 |
| Compound 7' | 28 |

Test Example 2: Cell proliferation inhibition assay

Experimental method: A CellTiter-Glo cell viability assay kit was used to test the inhibitory effect of the compounds on the in vitro proliferation of human colon cancer LoVo cells.

Experimental materials: LoVo cells (ATCC, Cat. No. CCL-29); F-12K medium (Invitrogen, Cat. No. 21127-022); fetal bovine serum (Biological Industries, Cat. No. 04-002-1A); GlutaMAX (Gibco, Cat. No. 35050-061); 0.25% trypsin-EDTA (Invitrogen, Cat. No. 25200-072); CellTiter-Glo kit (Promega, Cat. No. G7558).

Experimental procedure: (1) F-12K medium, fetal bovine serum and GlutaMAX were formulated into a complete medium for culturing LoVo cells; (2) well-grown LoVo cells were taken, digested with trypsin and transferred to a centrifuge tube, and centrifuged; the supernatant was discarded, and cells were resuspended by adding a fresh medium and counted by a Vi-CELL XR cell counter; the density of the cell suspension was adjusted to 25,000 to 30,000 cells/mL, and the cell suspension was added at 100 μL/well in a 96-well cell culture plate, while a blank control group was set up with no cells added, and the cell culture plate was incubated in a carbon dioxide incubator overnight; (3) a DMSO solution of the compound to be tested was dispensed into the above 96-well cell culture plate using an HP D300 ultra-micro sampler, with 0.5 μL of the solution per well and 10 concentrations for each compound (3× dilution), while a DMSO control group with no compound added was set up, and the plate was continued to be incubated in a carbon dioxide incubator for 96 hours; (4) the cell culture plate was taken out and equilibrated to room temperature, with 100 μL of a CellTiter-Glo reagent added to each well, and then the plate was kept away from light, shaken for 10 minutes and then incubated for 10 minutes; (5) the cell culture plate was put into EnSpire for plate reading, and the luminescence value RLU was recorded.

Data processing: (1) The inhibition rate was calculated from the luminescence values: "$RLU_{DMSO}$" is the luminescence value of the DMSO control group without compound, "$RLU_{blank}$" is the luminescence value of the blank control group without cells, and "$RLU_{compound}$" is the luminescence value of the compound test group, and the inhibition rate= $[1-(RLU_{compound}-RLU_{blank})/(RLU_{DMSO}-RLU_{blank})] \times 100\%$; (2) with curve fitting using the Excel add-on XLFit, the $IC_{50}$ value was calculated.

Experimental results: the inhibitory effects of the compounds of the Examples on in vitro proliferation of LoVo cells are shown in Table 4.

TABLE 4

| Compound of Examples of the present invention | LoVo $IC_{50}$ (μM) | Max Inhibition (%) |
|---|---|---|
| 1 | 0.66 | 93 |
| 2 | 0.50 | 94 |
| 3 | 0.43 | 93 |
| 7 | 0.42 | 95 |
| 14 | 2.13 | 93 |
| 15 | 1.27 | 94 |
| 16 | 1.82 | 93 |
| 17 | 0.17 | 93 |
| 18 | 0.25 | 92 |
| 19 | 0.07 | 90 |
| 20 | 0.49 | 91 |
| 21 | 0.71 | 92 |
| 22 | 1.04 | 93 |
| 23 | 0.74 | 92 |
| 24 | 1.02 | 92 |
| 25 | 0.24 | 89 |
| 26 | 0.74 | 92 |
| 27 | 0.62 | 94 |
| 28 | 0.10 | 92 |
| 29 | 0.38 | 94 |
| 30 | 1.06 | 93 |
| 31 | 0.57 | 93 |
| 32 | 0.34 | 95 |
| 33 | 0.29 | 92 |
| 34 | 0.29 | 93 |

From the above results, it can be seen that the compounds of the Examples have good inhibitory 5 effect on proliferation of LoVo cells.

The inhibitory activity on ATR kinase and the inhibitory activity on LoVo cell proliferation of Example Compound 1 of the present invention were compared with those of Compounds 4' and Compound 5', as shown in Table 5.

TABLE 5

| Compound | ATR IC$_{50}$ (nM) | ATR IC$_{50}$ value | LoVo IC$_{50}$ (μM) | LoVo IC$_{50}$ value |
|---|---|---|---|---|
| Compound 4' | 20 | 20/5.5 = 3.64 | 2.34 | 2.34/0.66 = 3.55 |
| Compound 5' | 15 | 15/5.5 = 2.73 | 1.88 | 1.88/0.66 = 2.85 |
| Example Compound 1 of the present invention | 5.5 | / | 0.66 | / |

The foregoing are only particular embodiments of the present invention. It should be noted that, for a person of ordinary skill in the art, various improvement and modification can be made without departing from the principle of the present invention, and these improvement and modification are also intended to be within the protection scope of the present invention.

The invention claimed is:
1. A compound of formula I:

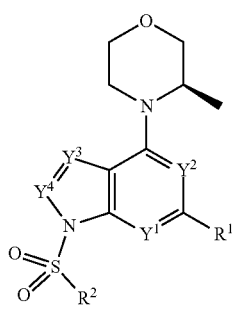

formula I or a pharmaceutically acceptable salt thereof, wherein:

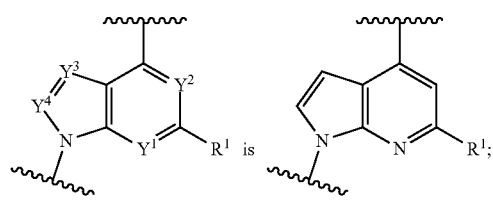

R$^1$ is:

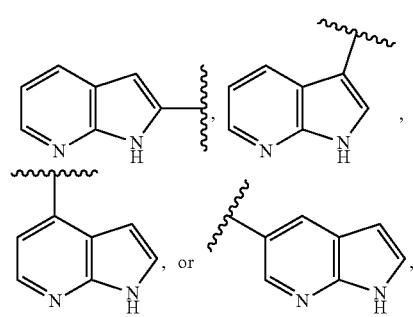

wherein the pyrrolo[2,3-b]pyridinyl is optionally substituted with one or more substituents independently selected from the group consisting of halogen, CN, CH$_3$, C(O) NH$_2$, NH$_2$, NHCH$_3$, N(CH$_3$)$_2$, OH, and OCH$_3$; and R$^2$ is CH$_3$.

2. The compound according to claim 1, or a pharmaceutically acceptable salt thereof, wherein R$^1$ is optionally substituted with one or more substituents independently selected from the group consisting of F, CN, and CH$_3$.

3. The compound according to claim 1, or a pharmaceutically acceptable salt thereof, wherein R$^1$ is:

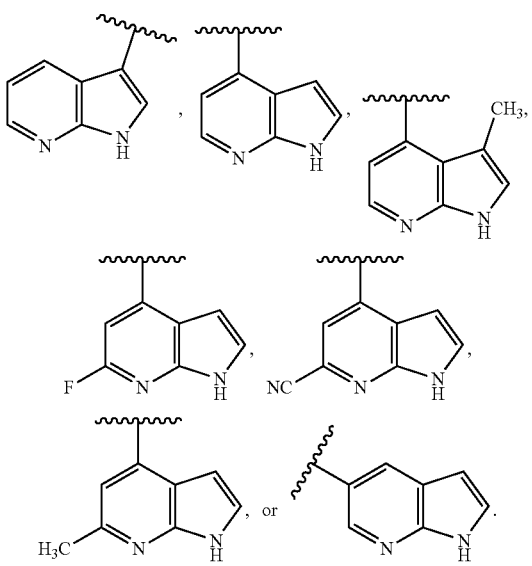

4. The compound according to claim 1, wherein the compound is selected from the group consisting of:

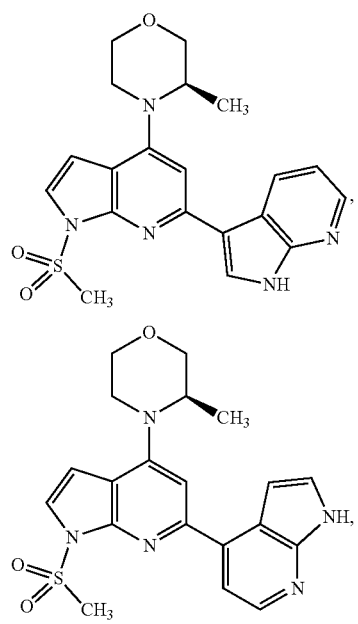

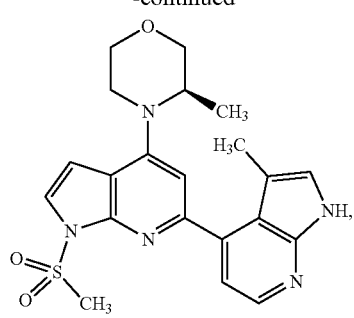
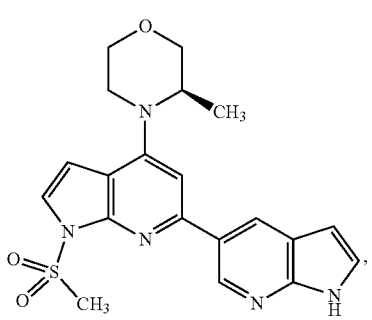
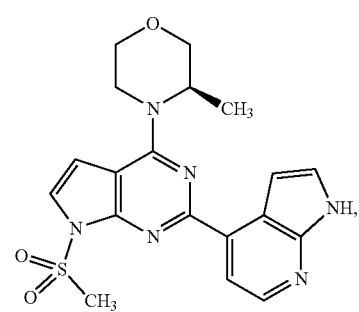
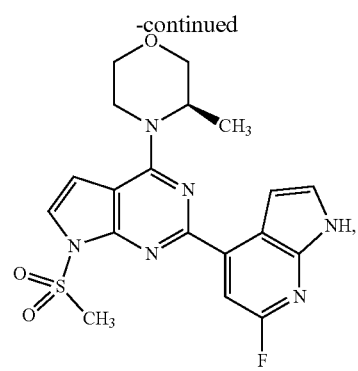
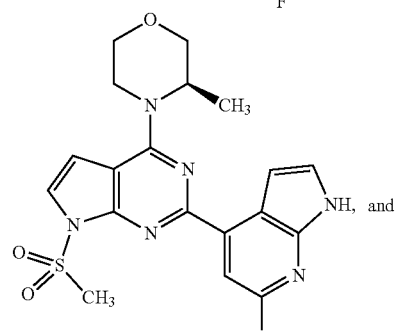
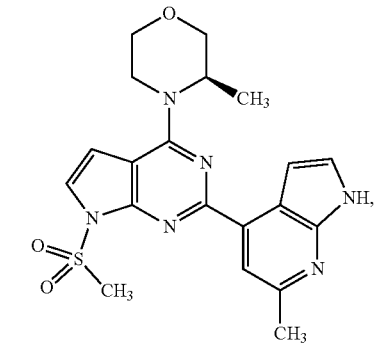
or a pharmaceutically acceptable salt thereof.
5. A pharmaceutical composition comprising a pharmaceutically acceptable carrier and the compound according to claim 1, or a pharmaceutically acceptable salt thereof.
* * * * *